(12) United States Patent
Komatsu et al.

(10) Patent No.: US 10,108,015 B2
(45) Date of Patent: Oct. 23, 2018

(54) LIGHT GUIDE DEVICE AND VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Masayuki Takagi, Matsumoto (JP); Toshiaki Miyao, Matsumoto (JP); Takahiro Totani, Suwa (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/500,683

(22) PCT Filed: Aug. 12, 2015

(86) PCT No.: PCT/JP2015/004040
§ 371 (c)(1),
(2) Date: Jan. 31, 2017

(87) PCT Pub. No.: WO2016/027442
PCT Pub. Date: Feb. 25, 2016

(65) Prior Publication Data
US 2017/0219830 A1  Aug. 3, 2017

(30) Foreign Application Priority Data

Aug. 18, 2014 (JP) .................................. 2014-165750
Jun. 12, 2015 (JP) .................................. 2015-119001

(51) Int. Cl.
*G02B 27/01* (2006.01)
*G02B 17/08* (2006.01)
(Continued)

(52) U.S. Cl.
CPC ....... *G02B 27/0172* (2013.01); *G02B 17/086* (2013.01); *G02B 27/0018* (2013.01); *G02B 27/144* (2013.01); *G02B 2027/013* (2013.01)

(58) Field of Classification Search
CPC .............. G02B 27/0172; G02B 17/086; G02B 27/0018; G02B 27/144; G02B 2027/013
(Continued)

(56) References Cited

U.S. PATENT DOCUMENTS 5,076,664 A  12/1991  Migozzi
5,369,415 A  11/1994  Richard et al.
(Continued)

FOREIGN PATENT DOCUMENTS

EP  2 360 509 A1  8/2011
JP  H03-15815 A  1/1991
(Continued)

OTHER PUBLICATIONS

Dec. 22, 2015 Search Report issued in International Patent Application No. PCT/JP2015/004040.
(Continued)

*Primary Examiner* — Grant Gagnon
(74) *Attorney, Agent, or Firm* — Oliff PLC

(57) ABSTRACT

A light guide device that does not cause non-uniformity in image light and external light and does not cause ghosts, and a virtual image display apparatus provided with the light guide device. The light guide device includes a parallel light guide, an incident section, and an emission section. Here, the light guide device is set such that image light rays are reflected without reflecting from a boundary surface between the parallel light guide and the reflection unit and head for an observer. Thus, the image light rays only pass through half mirrors, which are positioned in positions where the image light rays are emitted from the reflection
(Continued)

unit of the emission section or are positioned therearound. Accordingly, it is possible to prevent luminance non-uniformity or light reduction by reducing the number of times of the image light rays to be observed pass through the half mirrors.

18 Claims, 54 Drawing Sheets

(51) Int. Cl.
  *G02B 27/14* (2006.01)
  *G02B 27/00* (2006.01)
(58) Field of Classification Search
  USPC .......................................................... 359/630
  See application file for complete search history.

(56) References Cited

U.S. PATENT DOCUMENTS

| | | | |
|---|---|---|---|
| 8,665,178 B1 | 3/2014 | Wang | |
| RE45,148 E | 9/2014 | Mukawa et al. | |
| 2003/0165017 A1 | 9/2003 | Amitai | |
| 2005/0180687 A1 | 8/2005 | Amitai | |
| 2007/0064310 A1 | 3/2007 | Mukawa et al. | |
| 2007/0171329 A1 | 7/2007 | Freeman et al. | |
| 2008/0018555 A1* | 1/2008 | Kuo | G02B 17/006 345/8 |
| 2009/0015929 A1 | 1/2009 | DeJong et al. | |
| 2009/0190094 A1 | 7/2009 | Watanabe et al. | |
| 2010/0002991 A1 | 1/2010 | DeJong | |
| 2010/0111472 A1* | 5/2010 | DeJong | G02B 27/0081 385/31 |
| 2011/0013245 A1 | 1/2011 | Tanaka et al. | |
| 2012/0086623 A1* | 4/2012 | Takagi | G02B 6/0053 345/7 |
| 2012/0098734 A1* | 4/2012 | Totani | G02B 27/0172 345/7 |
| 2012/0206817 A1 | 8/2012 | Totani et al. | |
| 2013/0182317 A1* | 7/2013 | Takahashi | G02B 5/04 359/365 |
| 2014/0036361 A1* | 2/2014 | Woodgate | G02F 1/011 359/466 |

FOREIGN PATENT DOCUMENTS

| | | |
|---|---|---|
| JP | 2010-164988 A | 7/2010 |
| JP | 2012-088588 A | 5/2012 |
| JP | 2012-198260 A | 10/2012 |
| JP | 2012-198261 A | 10/2012 |
| JP | 2013-210633 A | 10/2013 |
| KR | 2006-0119711 A | 11/2006 |
| KR | 2009-0018454 A | 2/2009 |
| WO | 2007/062098 A2 | 5/2007 |
| WO | 2009/009268 A1 | 1/2009 |

OTHER PUBLICATIONS

Dec. 22, 2015 Written Opinion issued in International Patent Application No. PCT/JP2015/004040.

* cited by examiner

[Fig. 1A]
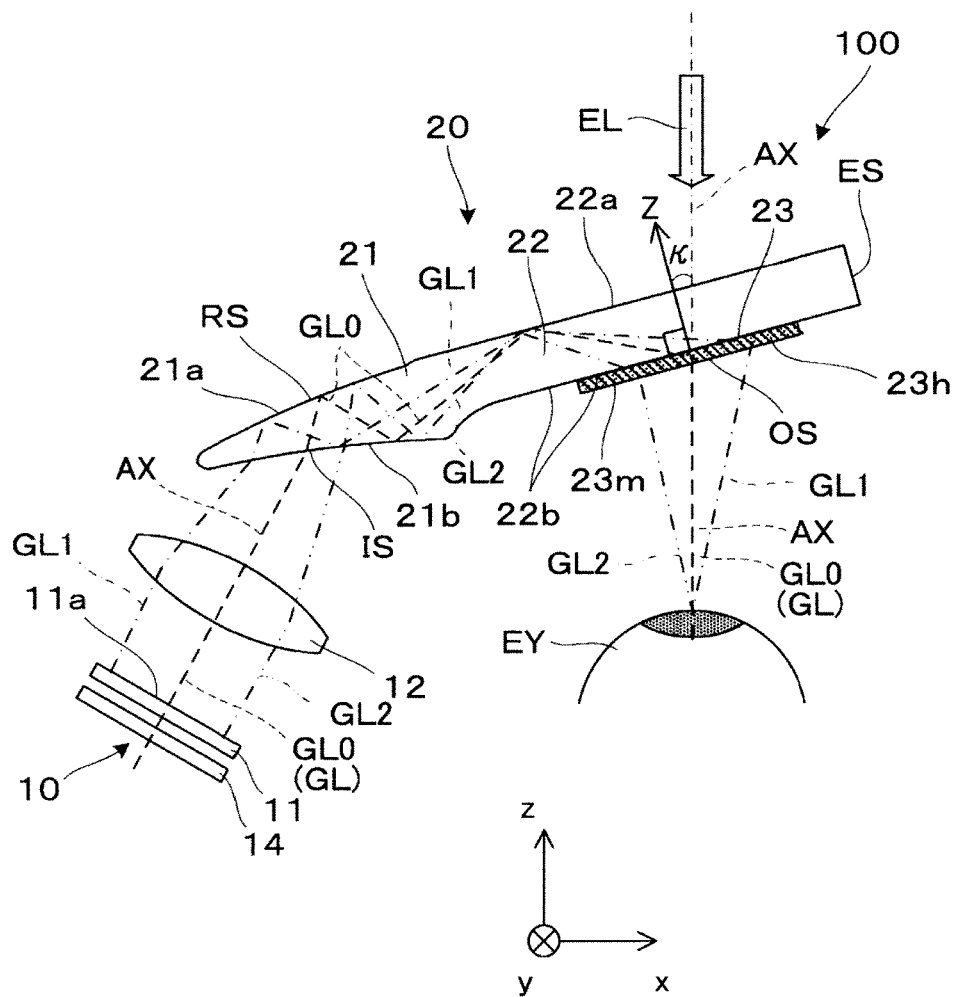

[Fig. 1B]
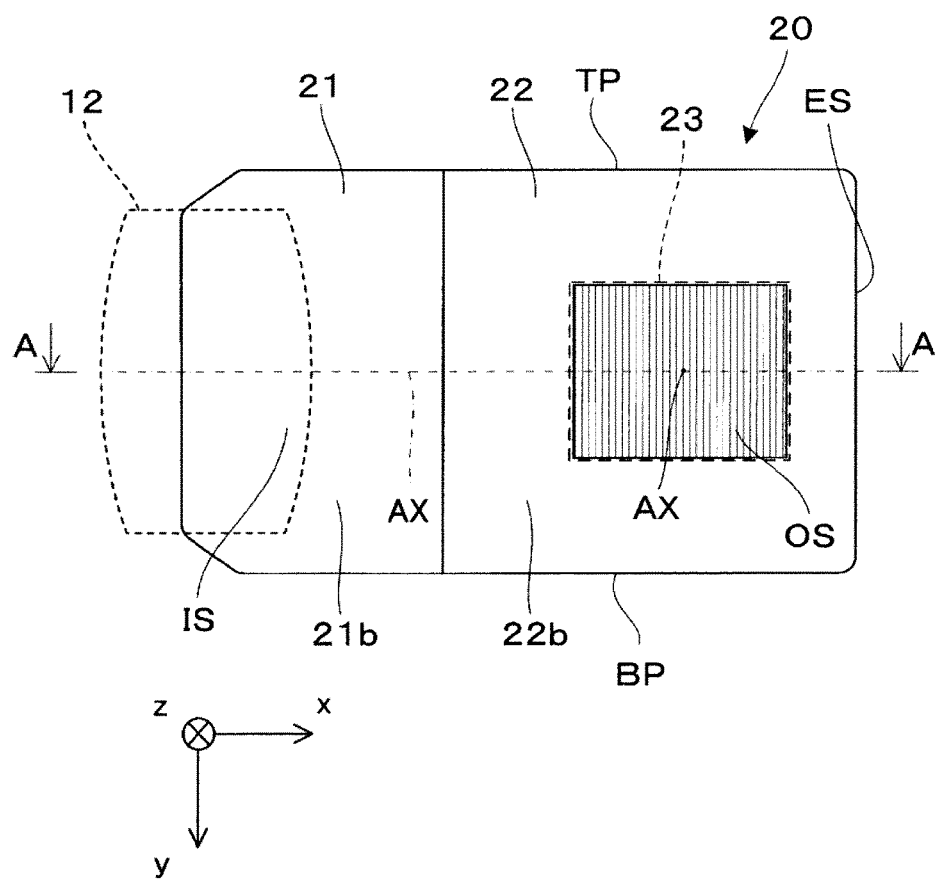

[Fig. 2]
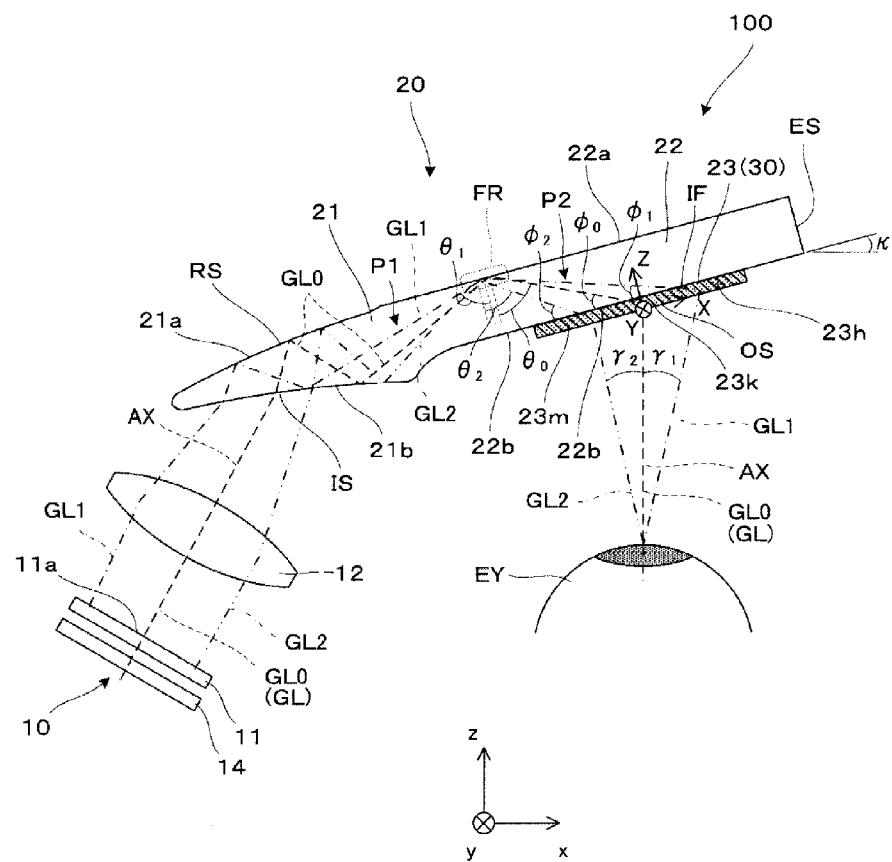

[Fig. 3]
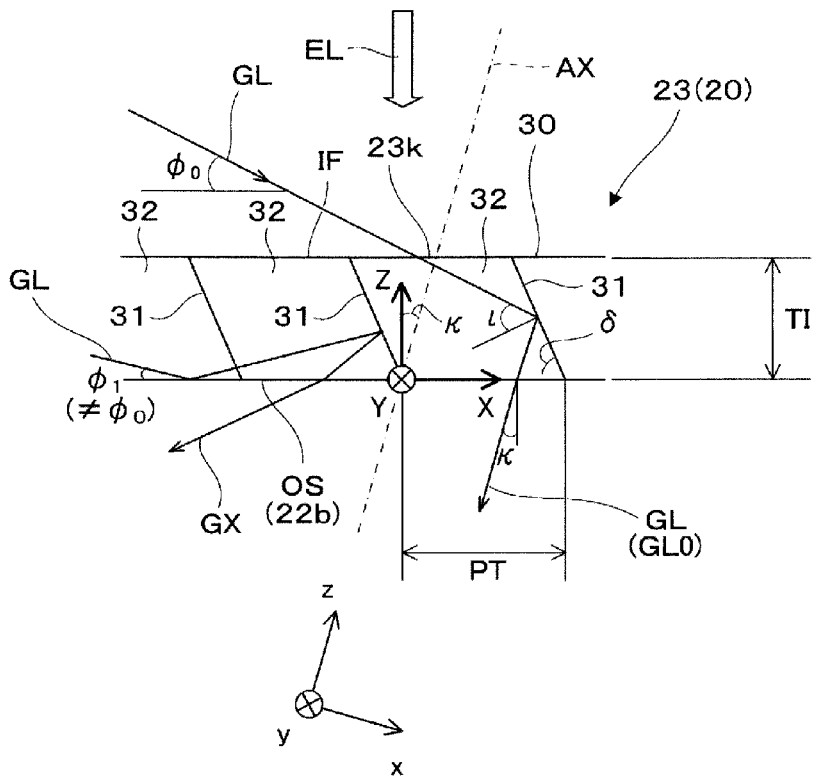
[Fig. 4]
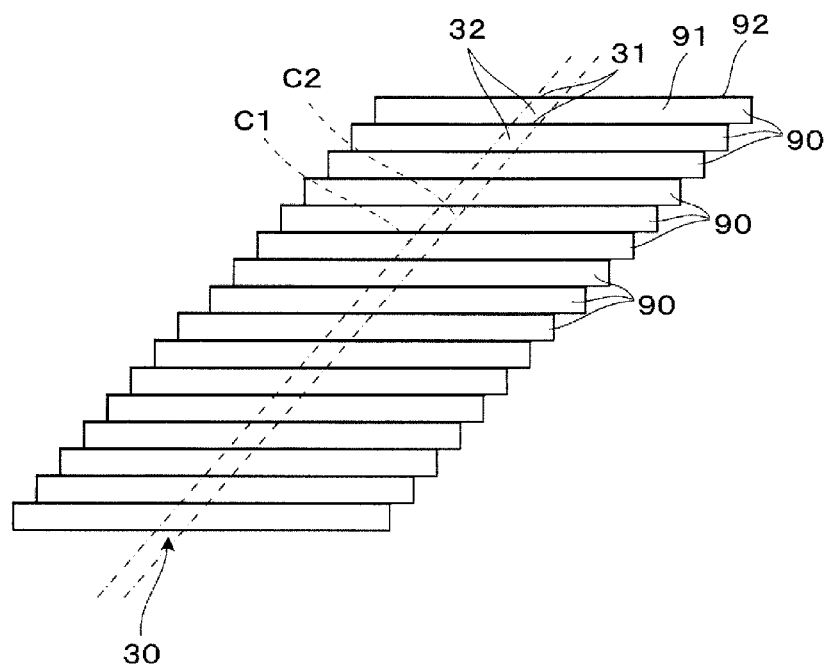

[Fig. 5A]
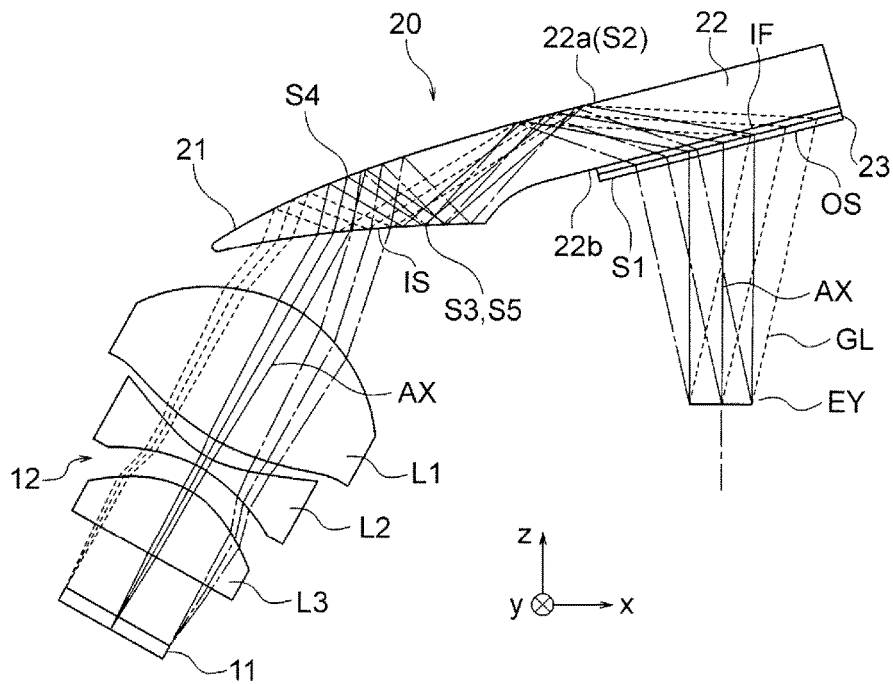
[Fig. 5B]
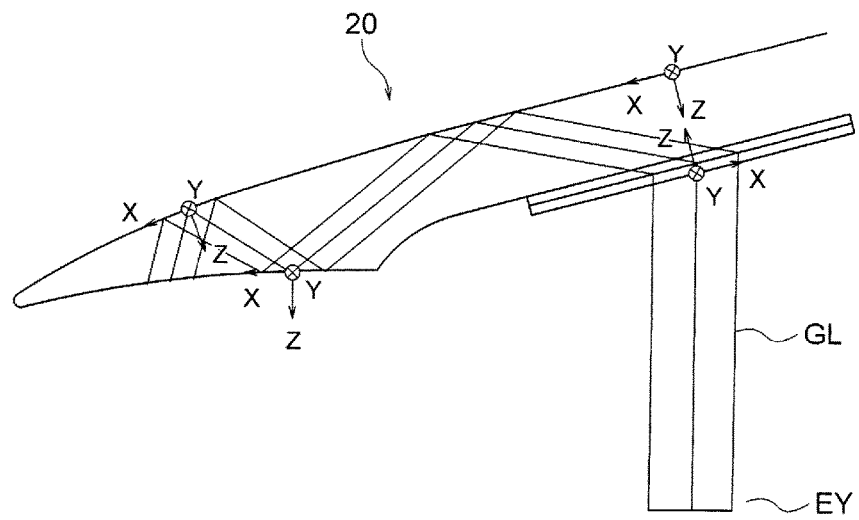

[Fig. 6A]
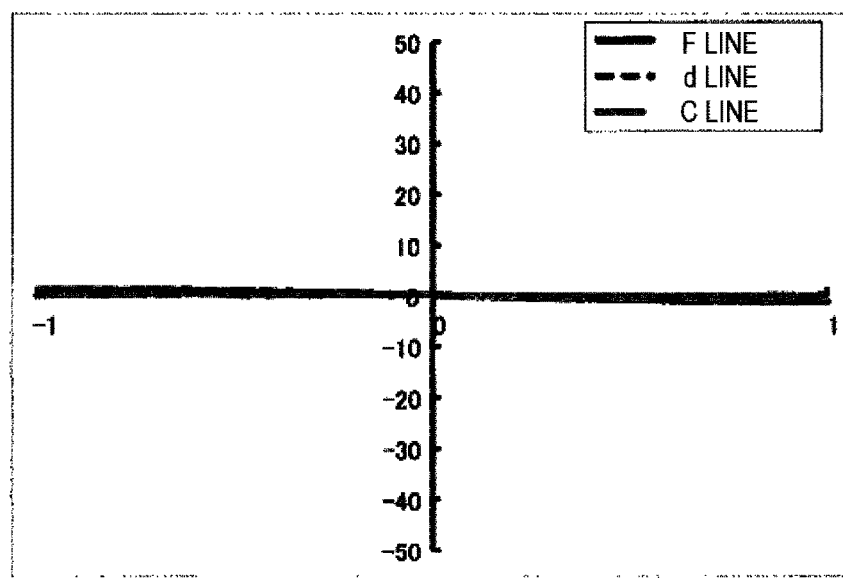
[Fig. 6B]
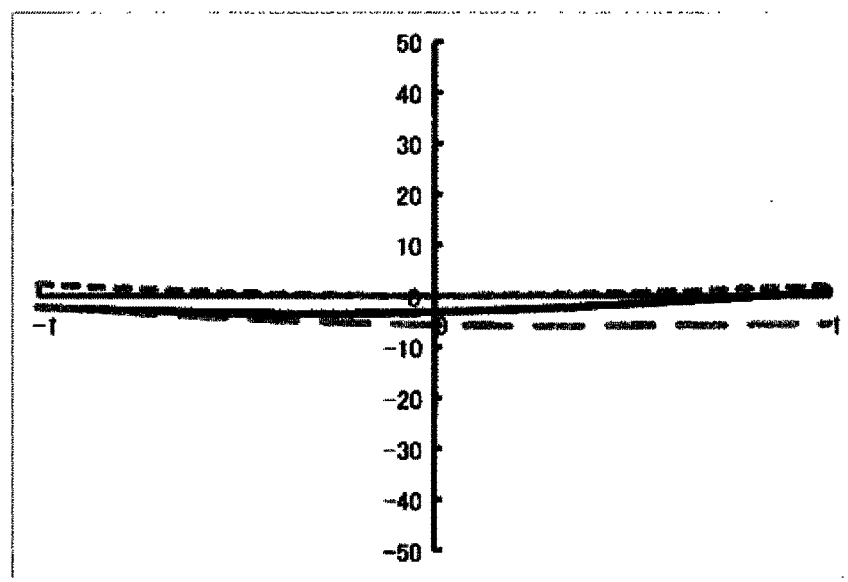

[Fig. 6C]
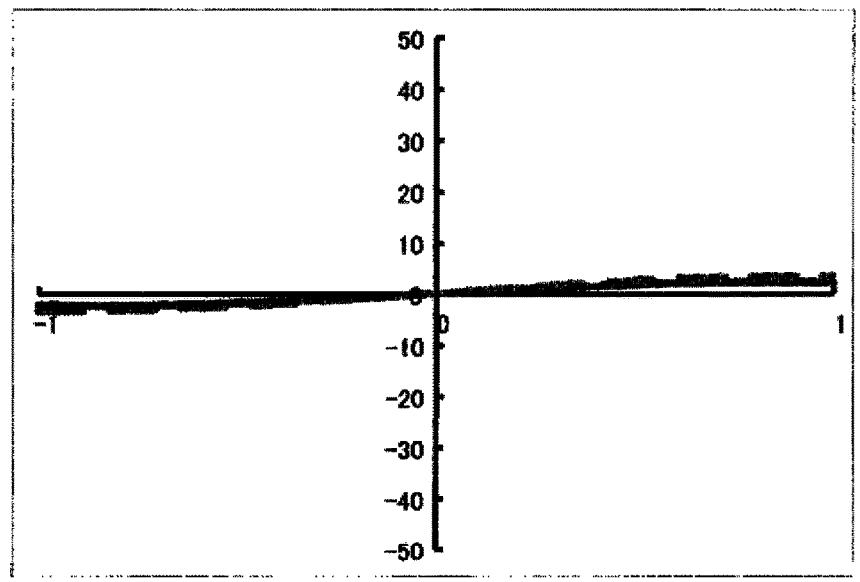
[Fig. 6D]
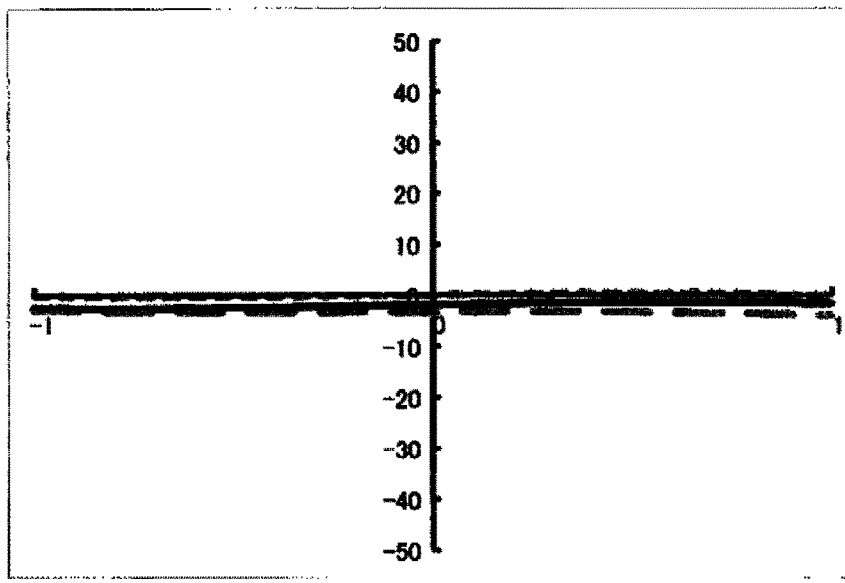

[Fig. 6E]
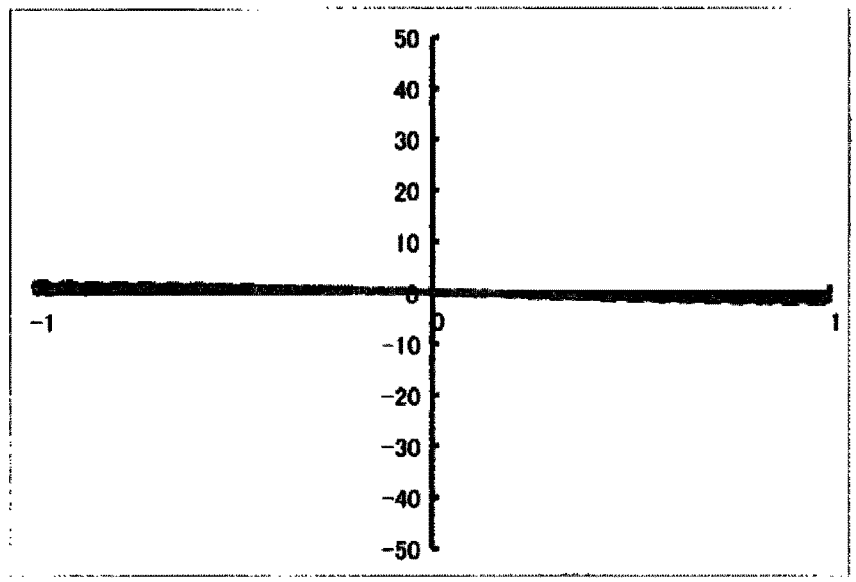
[Fig. 6F]
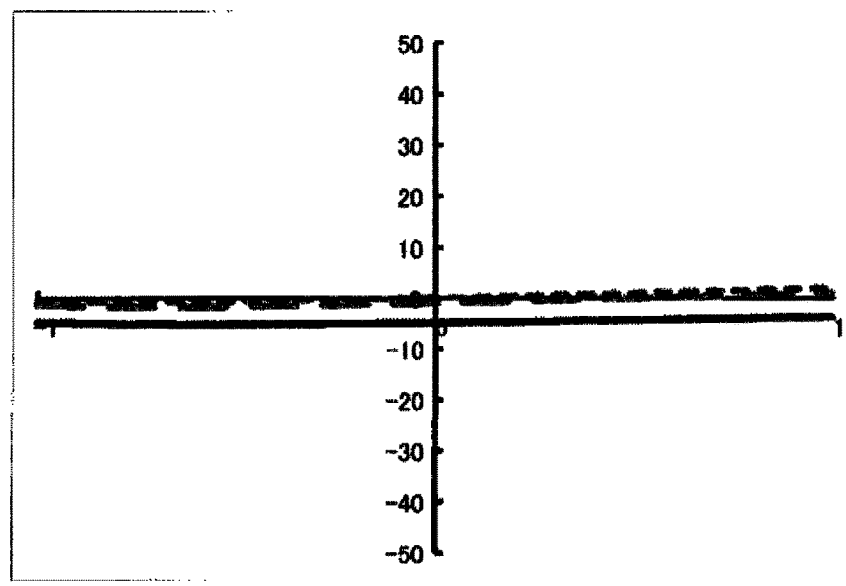

[Fig. 7A]
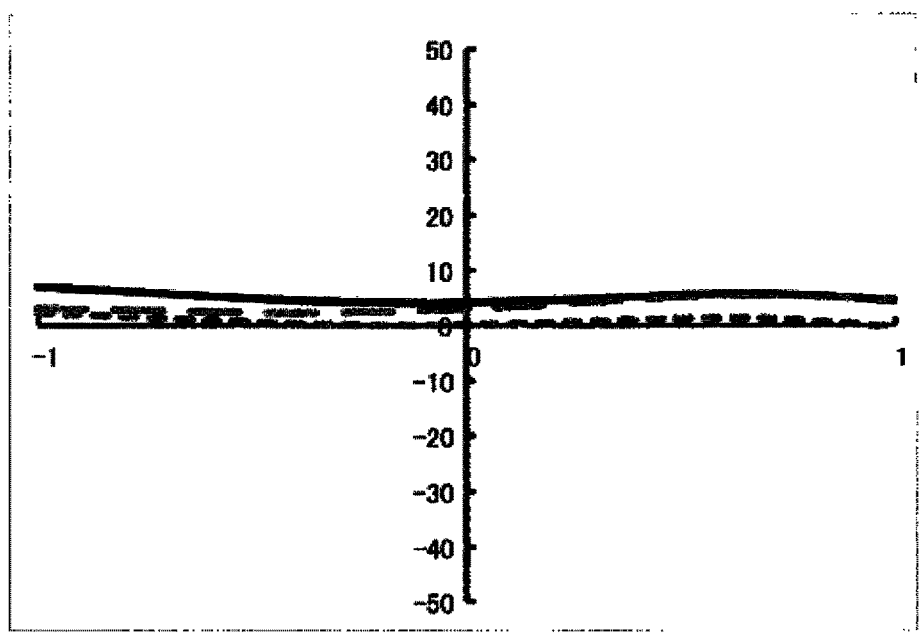
[Fig. 7B]
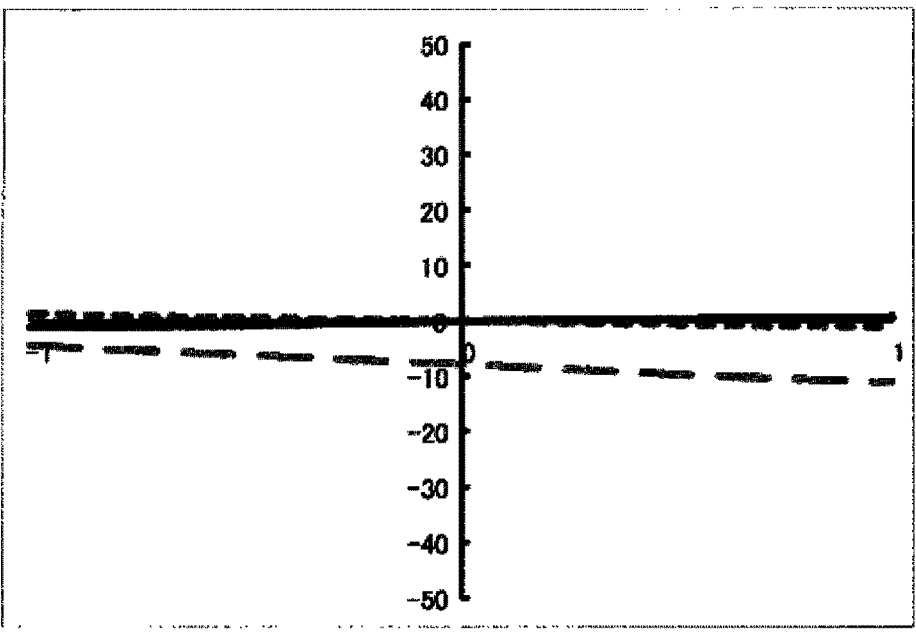

[Fig. 7C]
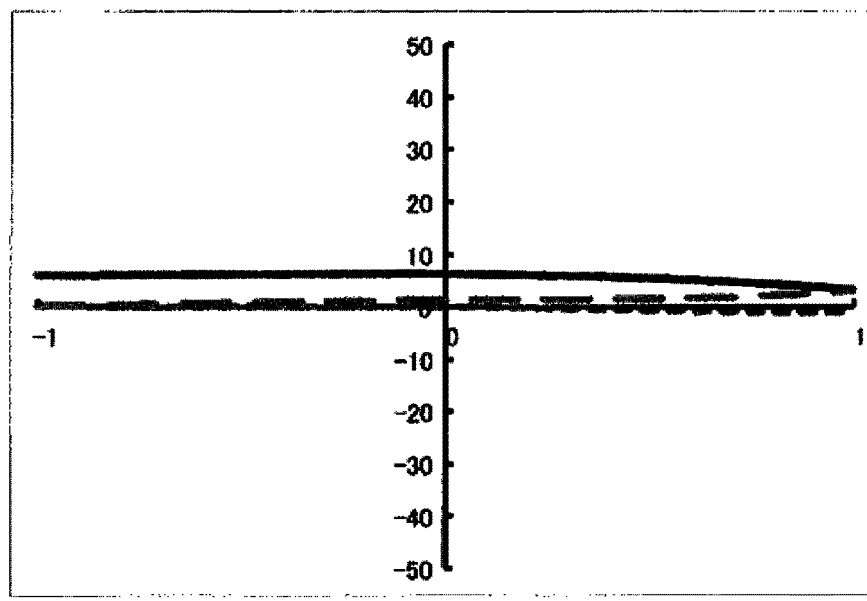
[Fig. 7D]
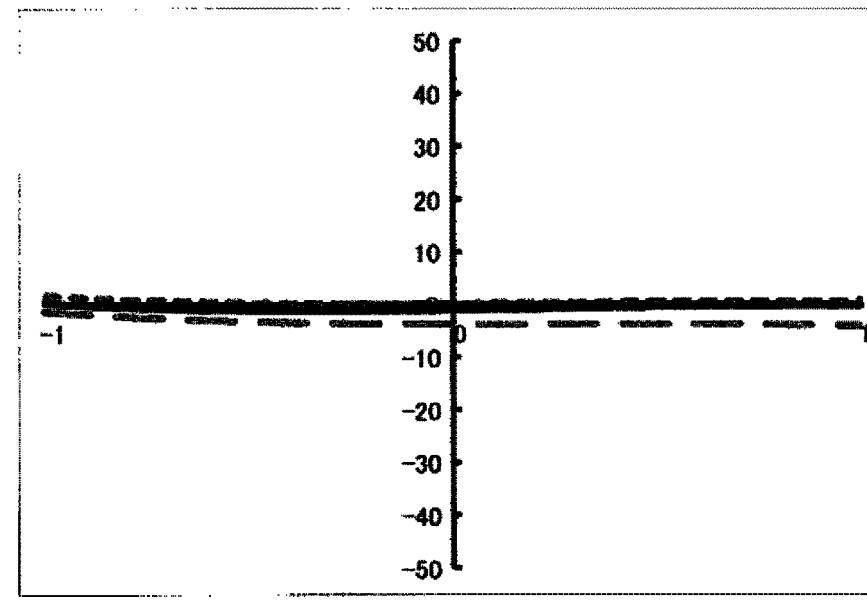

[Fig. 7E]
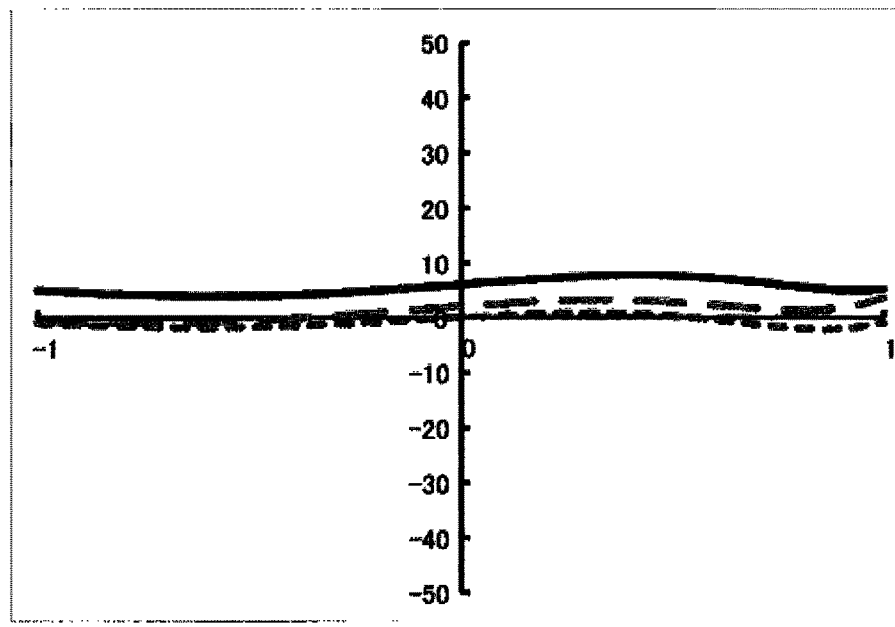
[Fig. 7F]
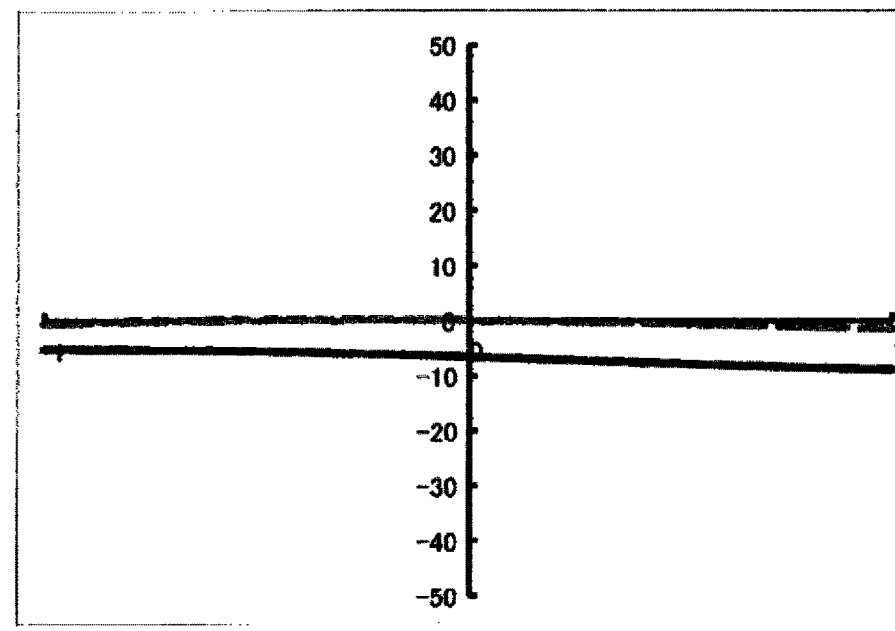

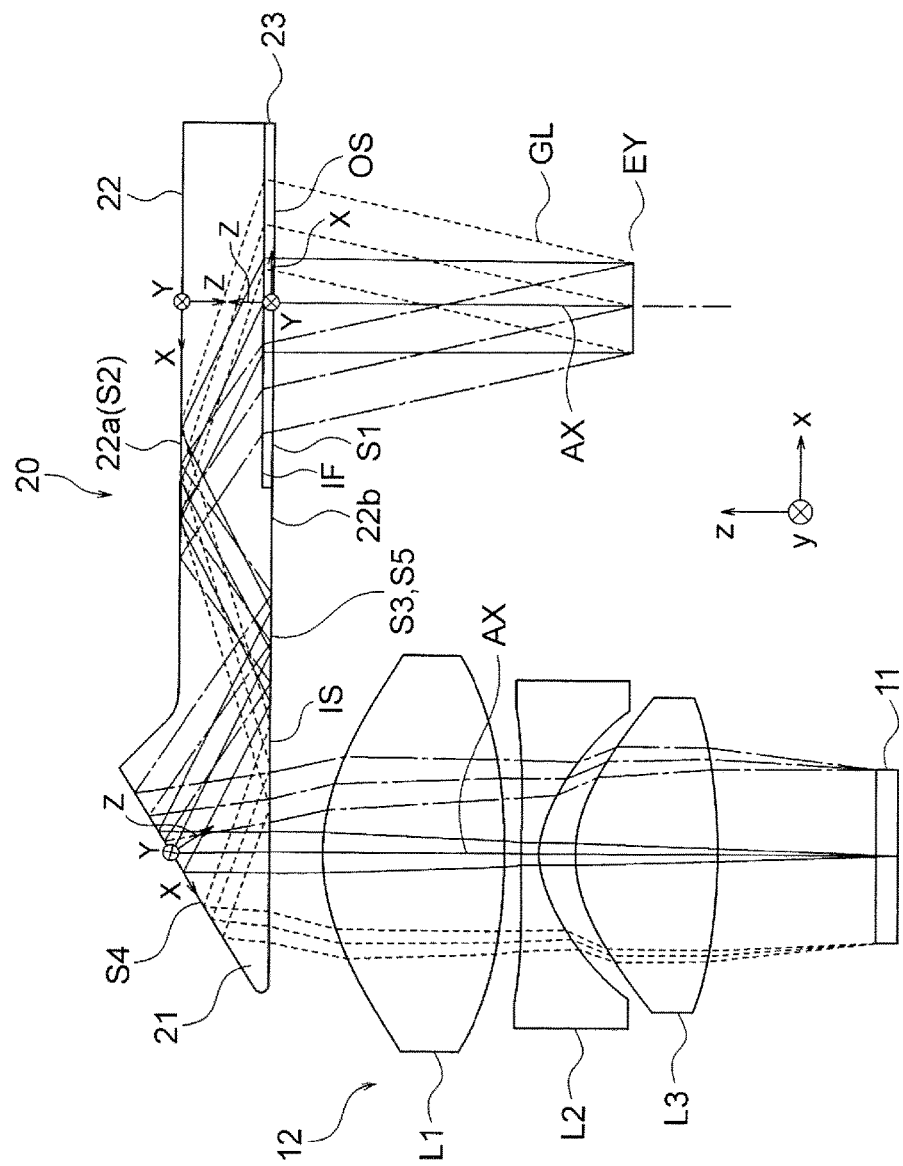
[Fig. 8]

[Fig. 9A]
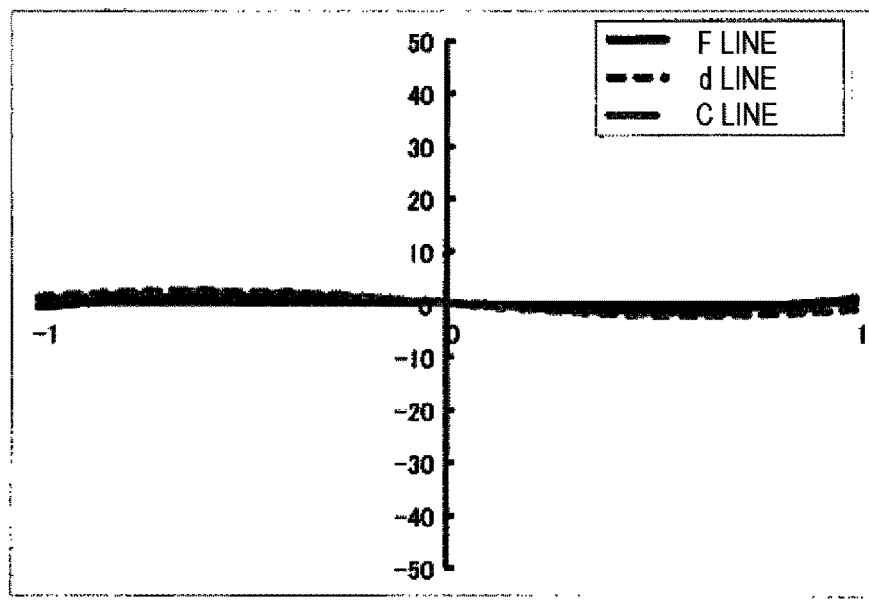
[Fig. 9B]
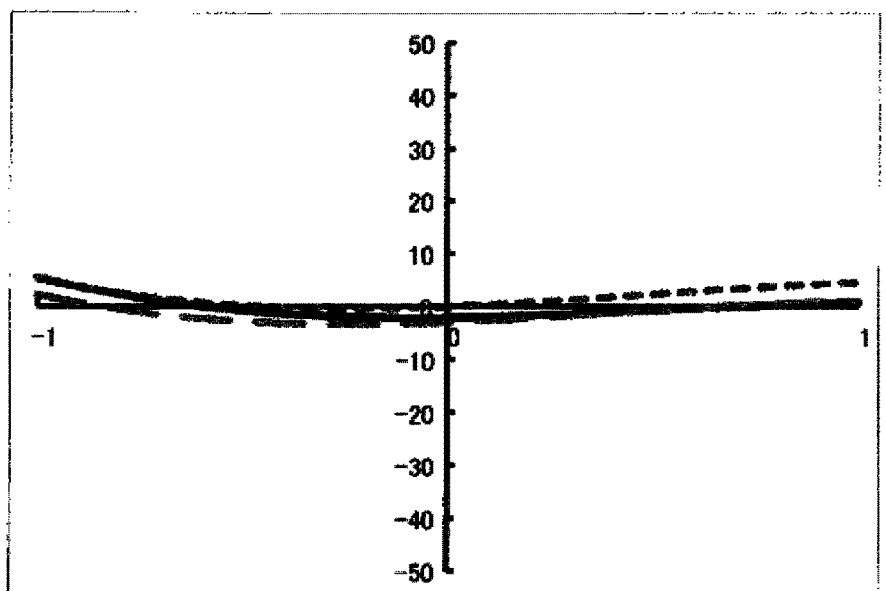

[Fig. 9C]
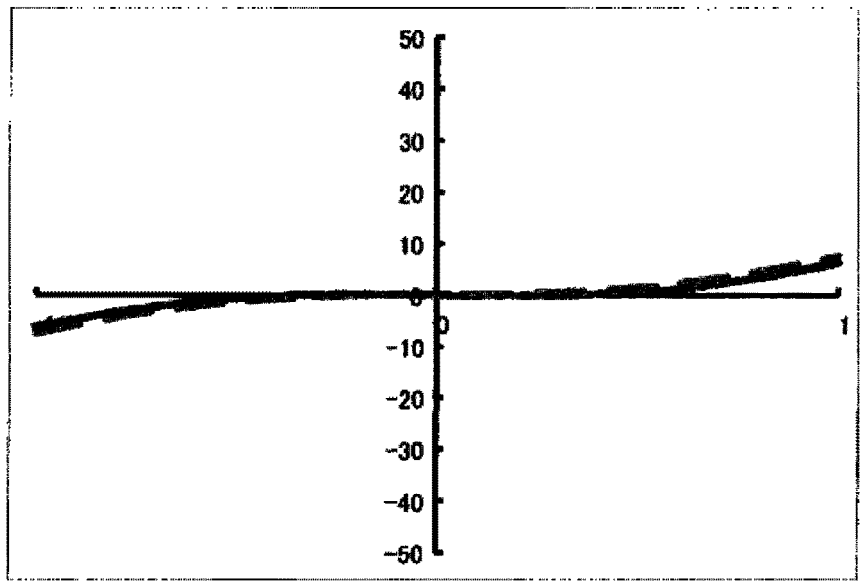
[Fig. 9D]
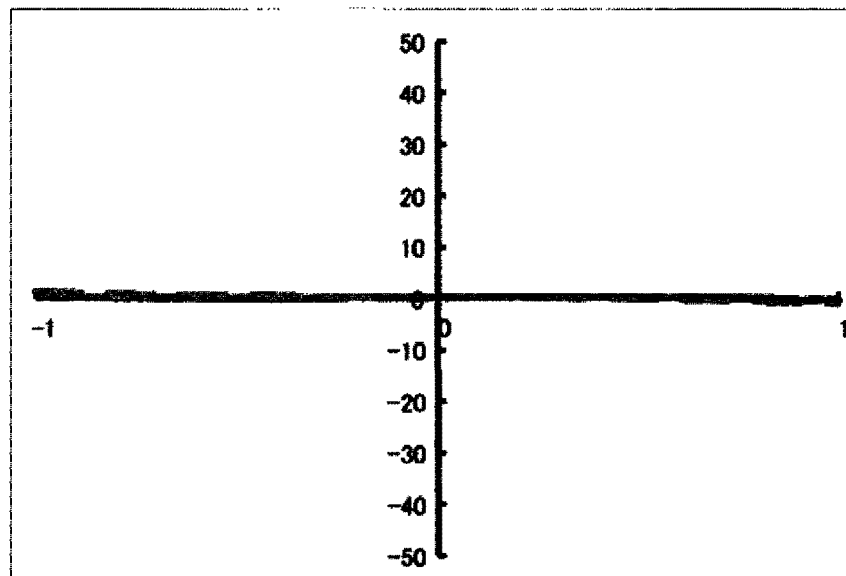

[Fig. 9E]
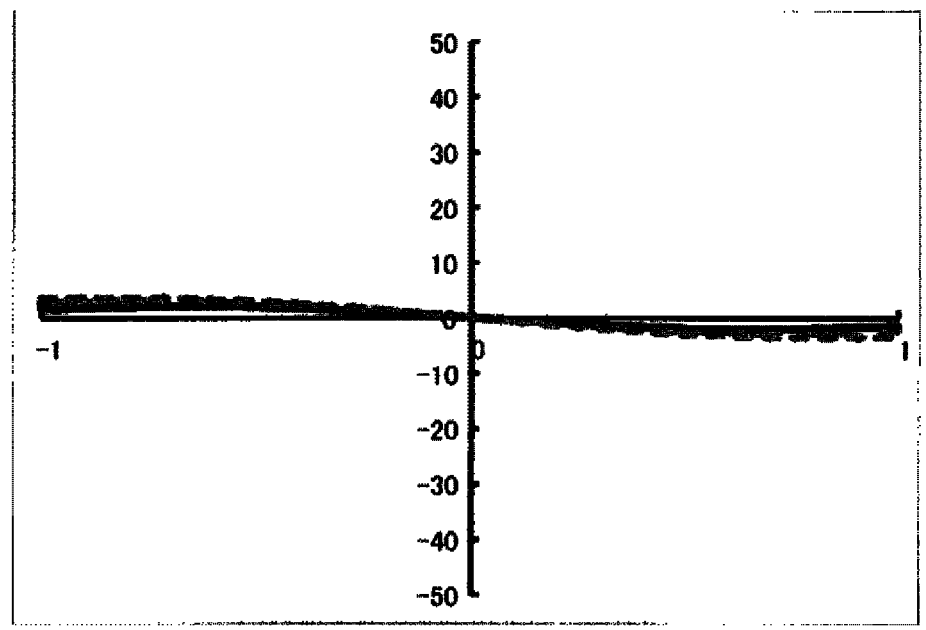
[Fig. 9F]
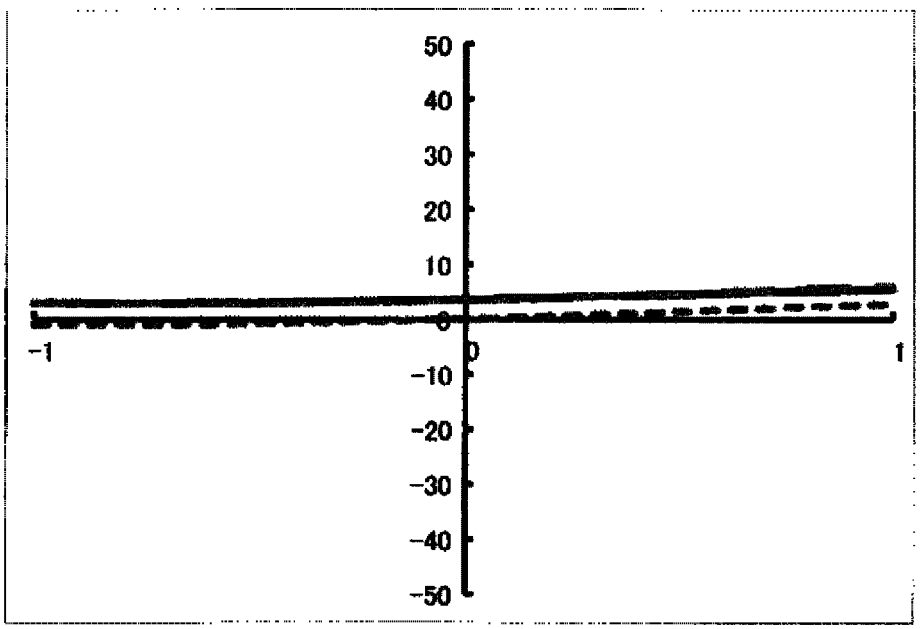

[Fig. 10A]
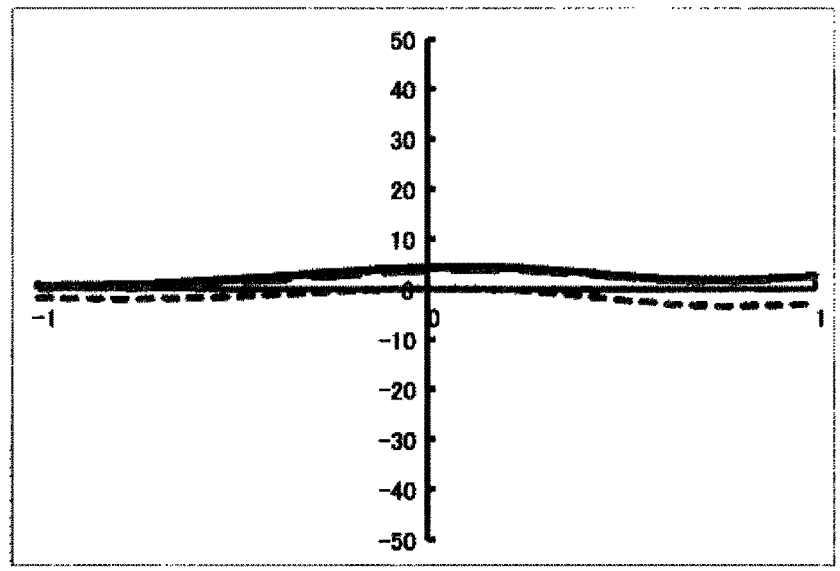
[Fig. 10B]
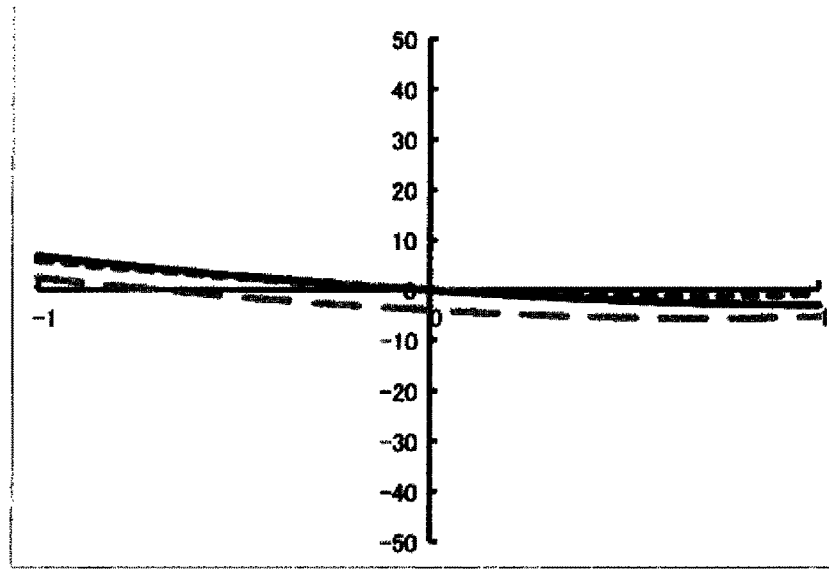

[Fig. 10C]
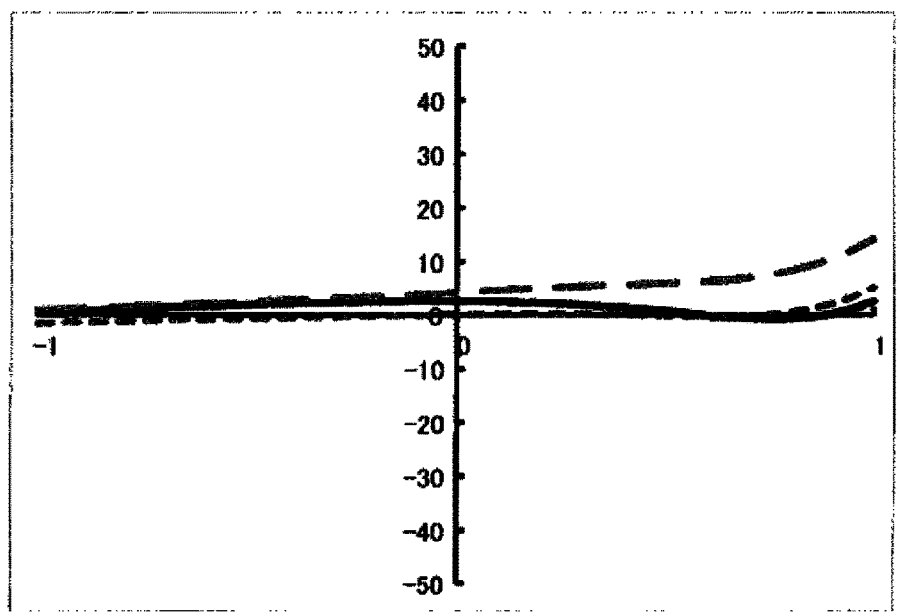
[Fig. 10D]
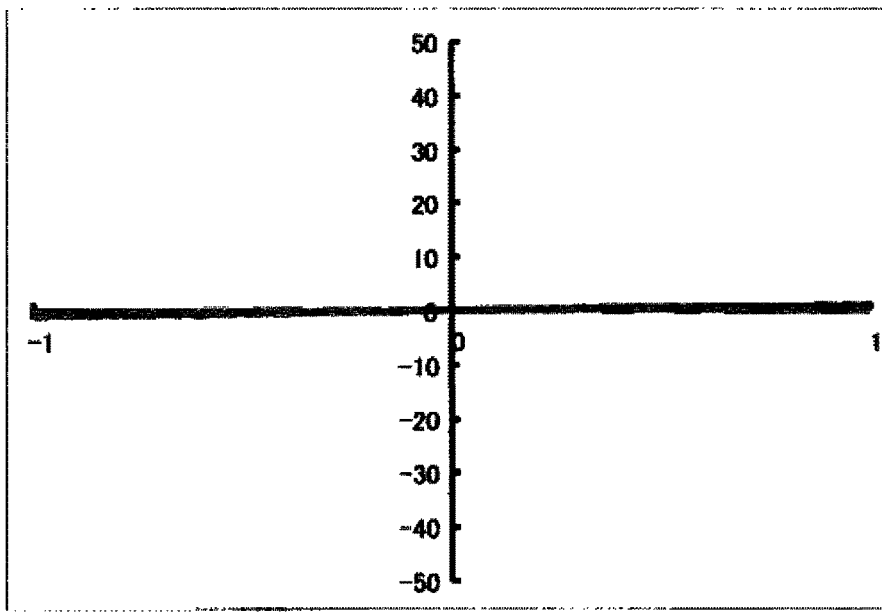

[Fig. 10E]
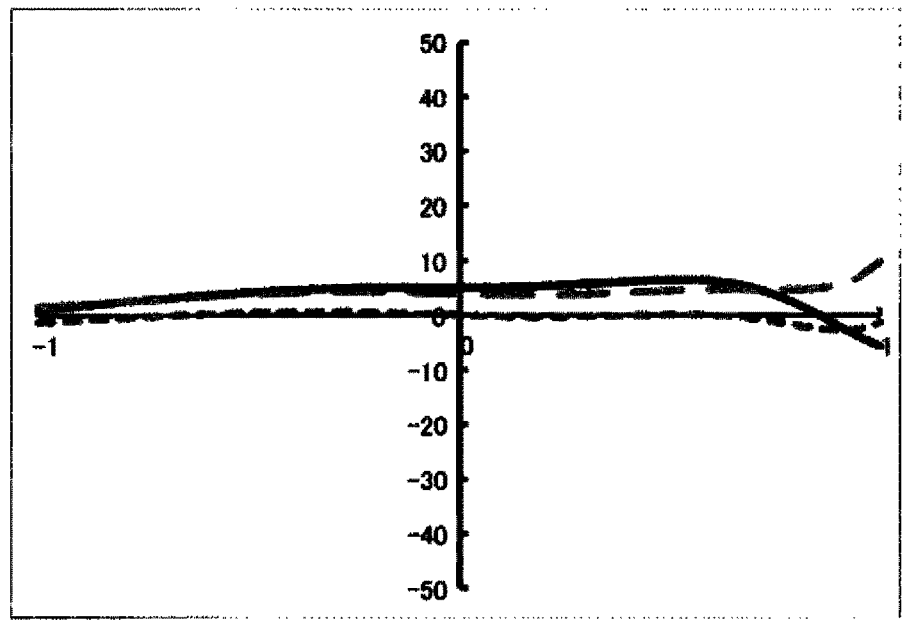
[Fig. 10F]
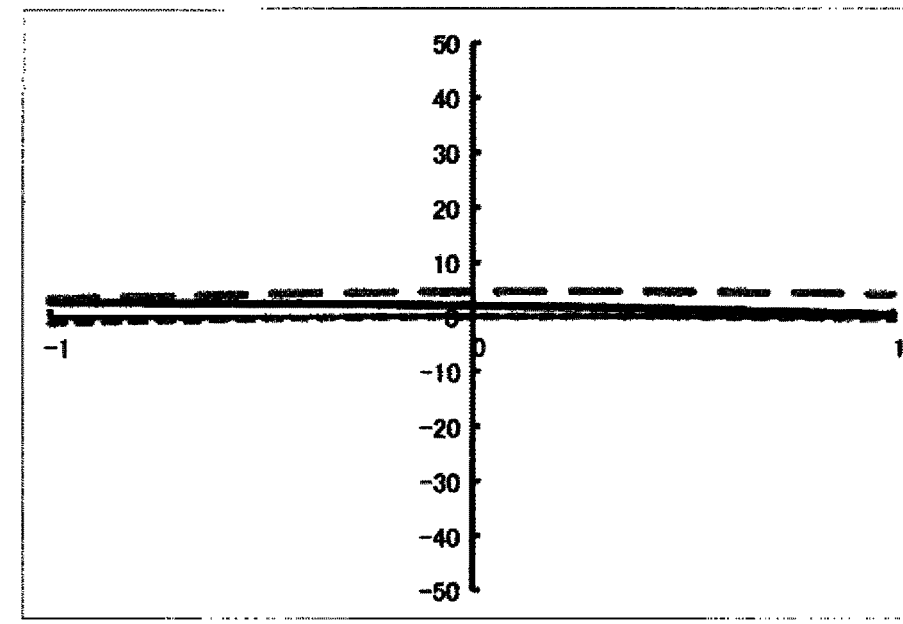

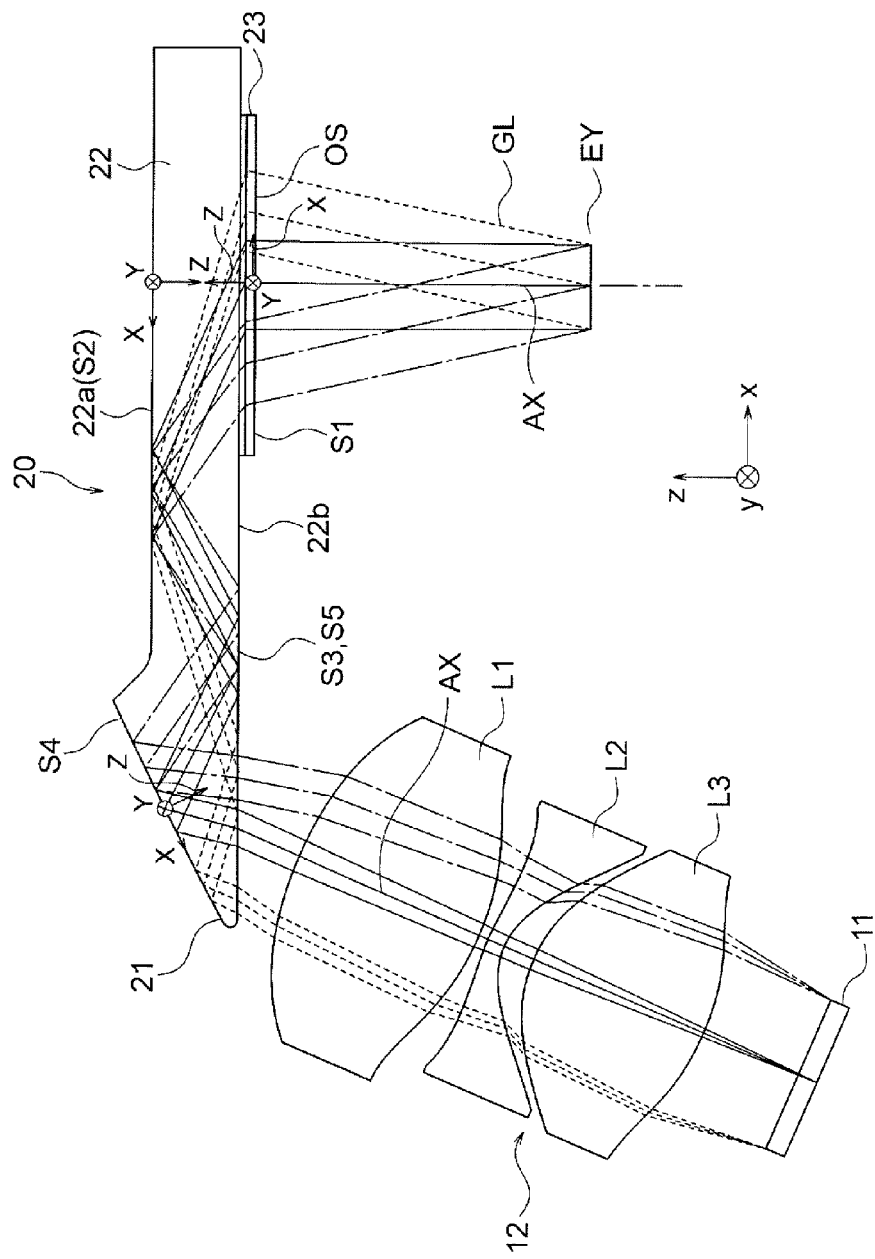
[Fig. 11]

[Fig. 12A]
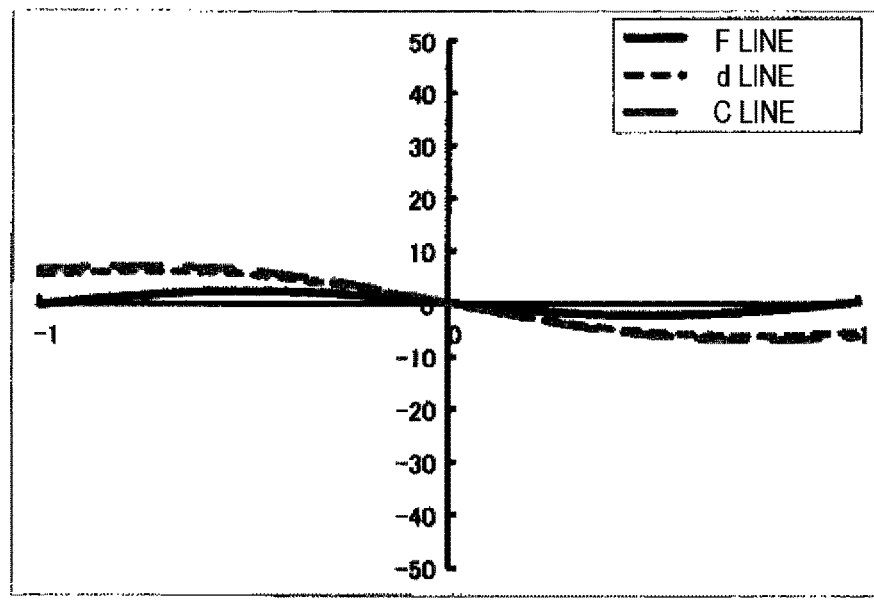
[Fig. 12B]
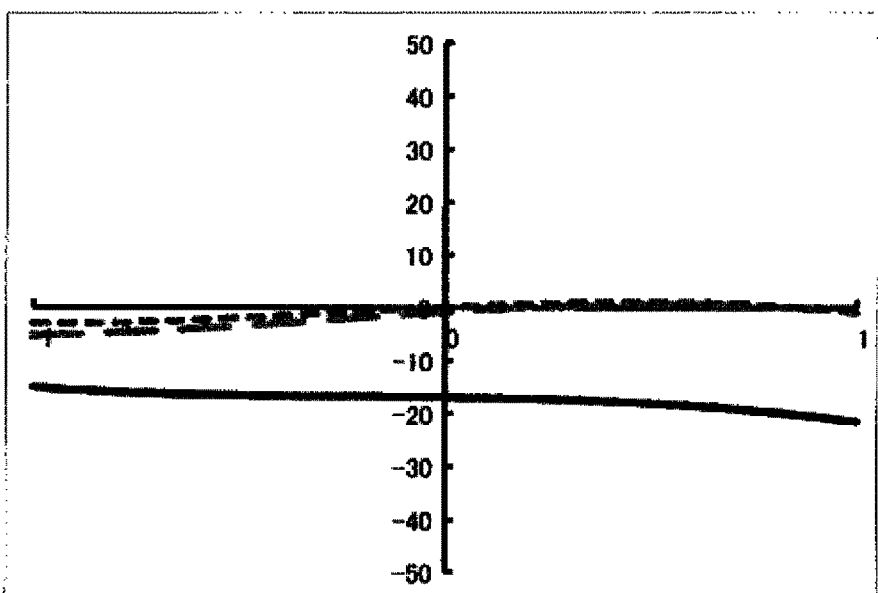

[Fig. 12C]
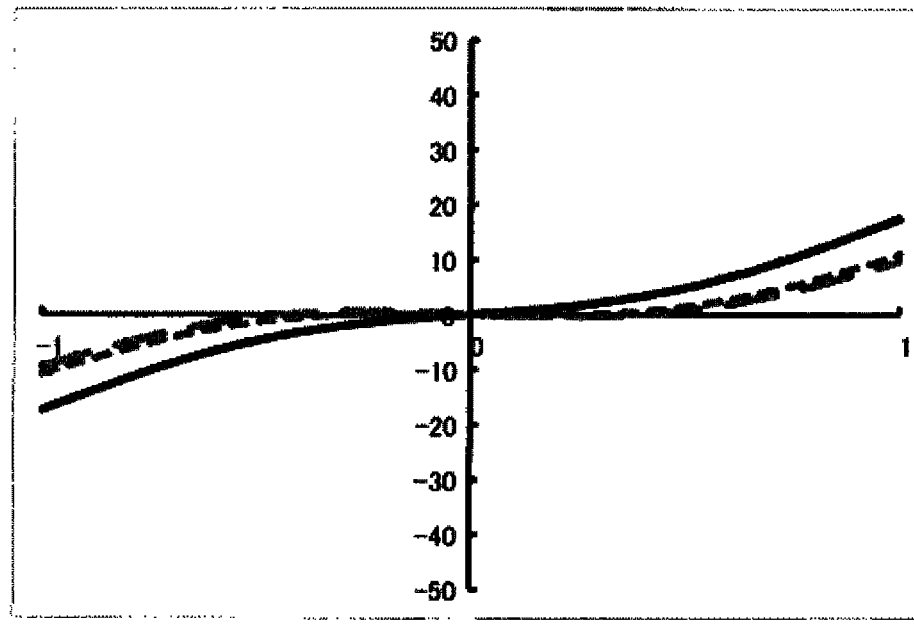
[Fig. 12D]
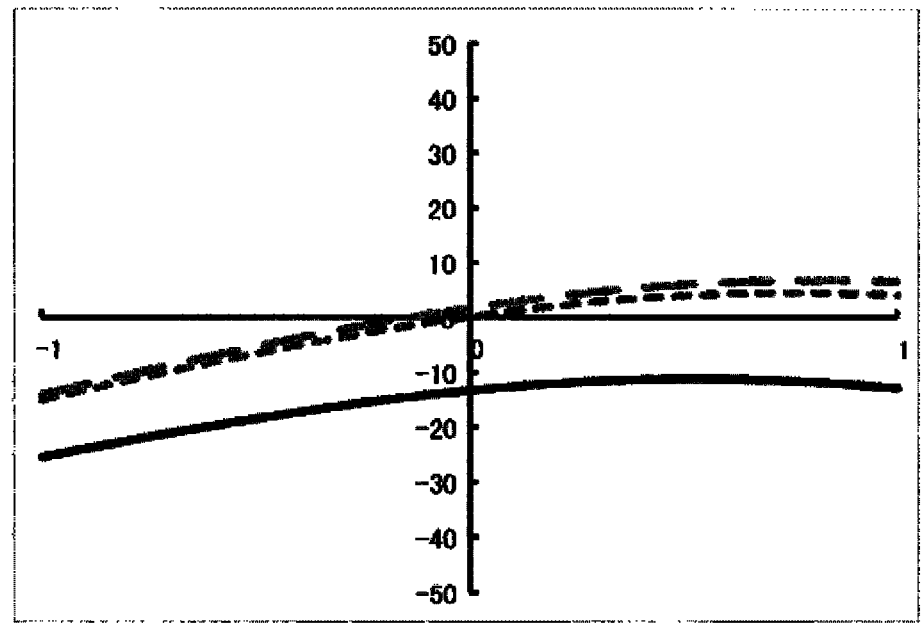

[Fig. 12E]
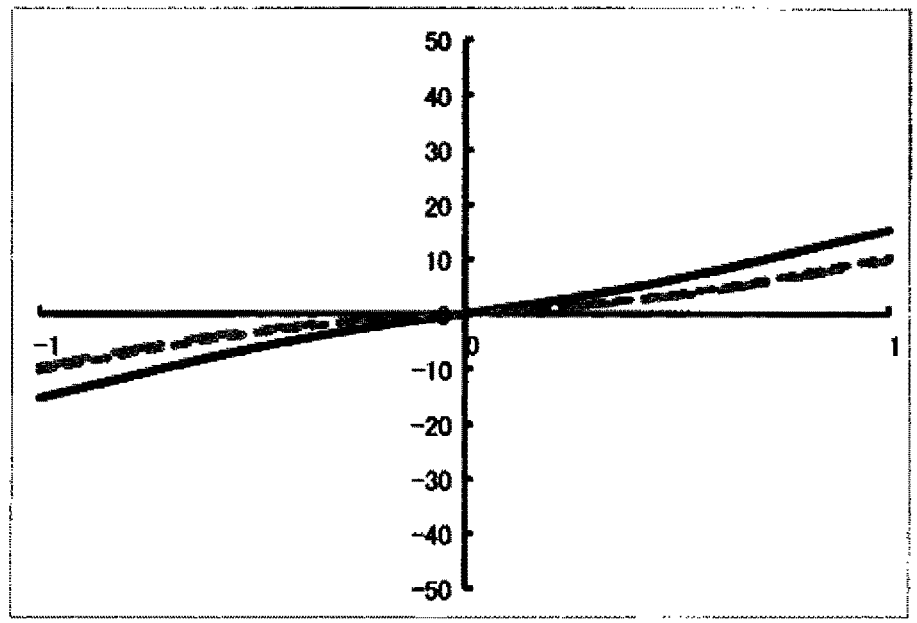
[Fig. 12F]
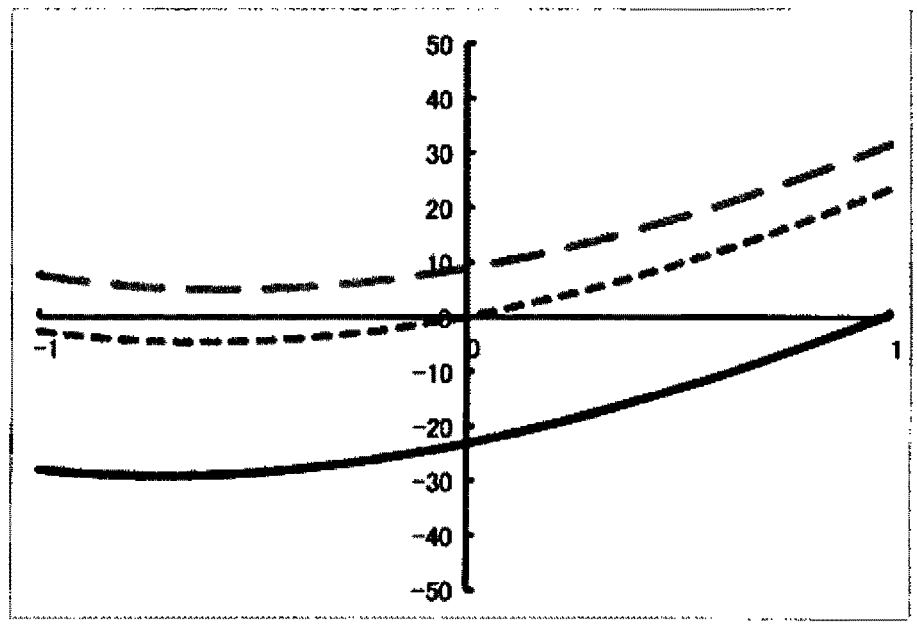

[Fig. 13A]
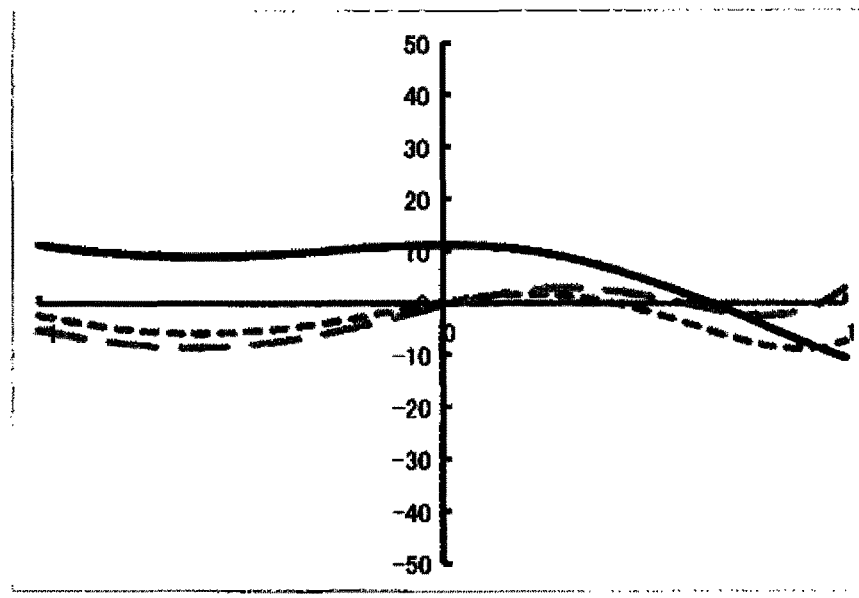
[Fig. 13B]
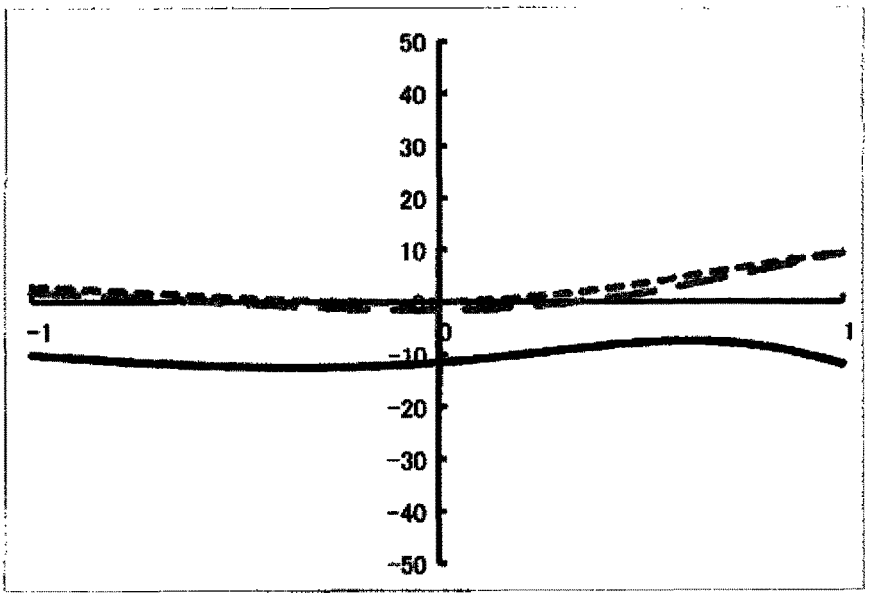

[Fig. 13C]
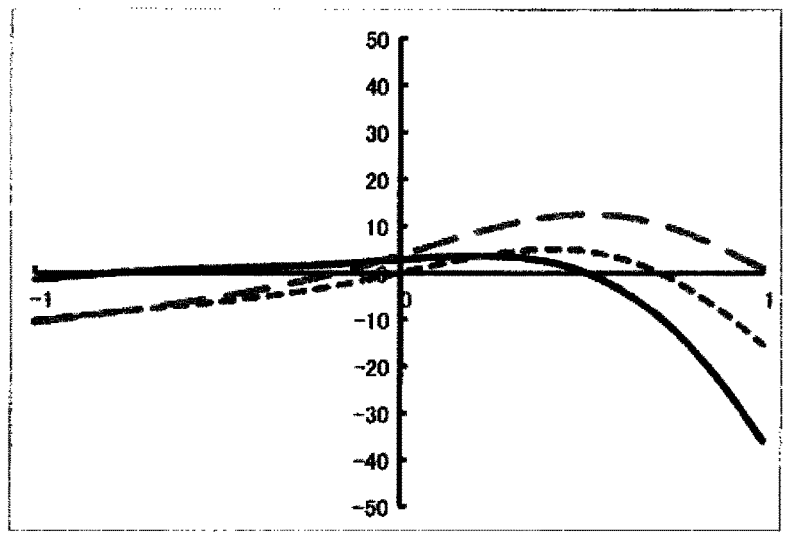
[Fig. 13D]
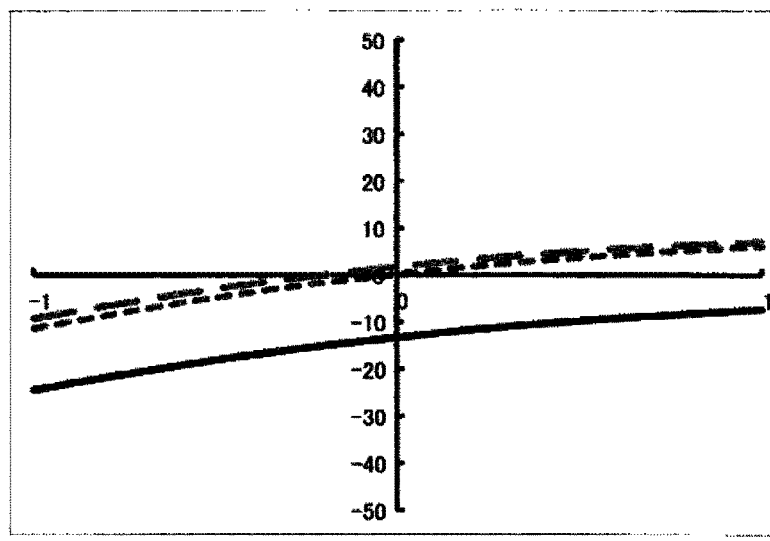

[Fig. 13E]
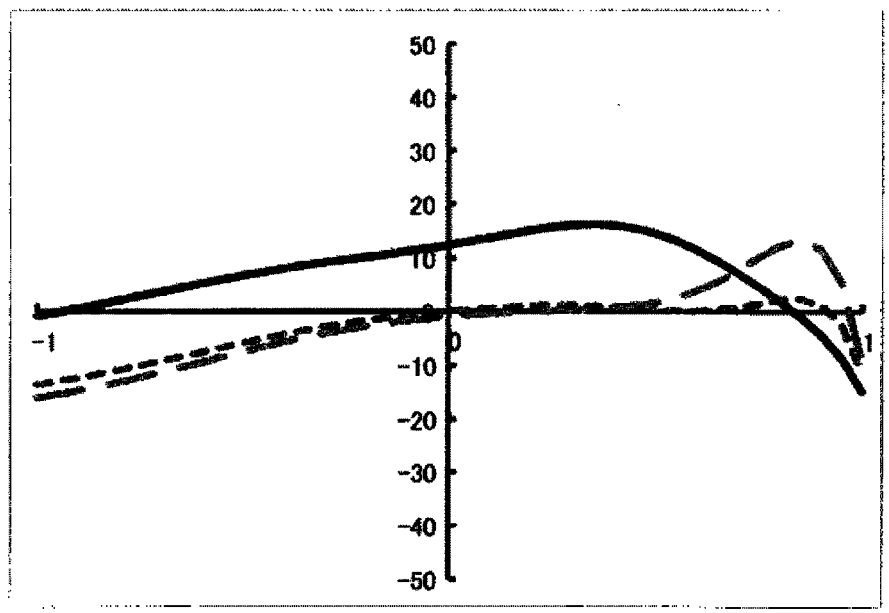
[Fig. 13F]
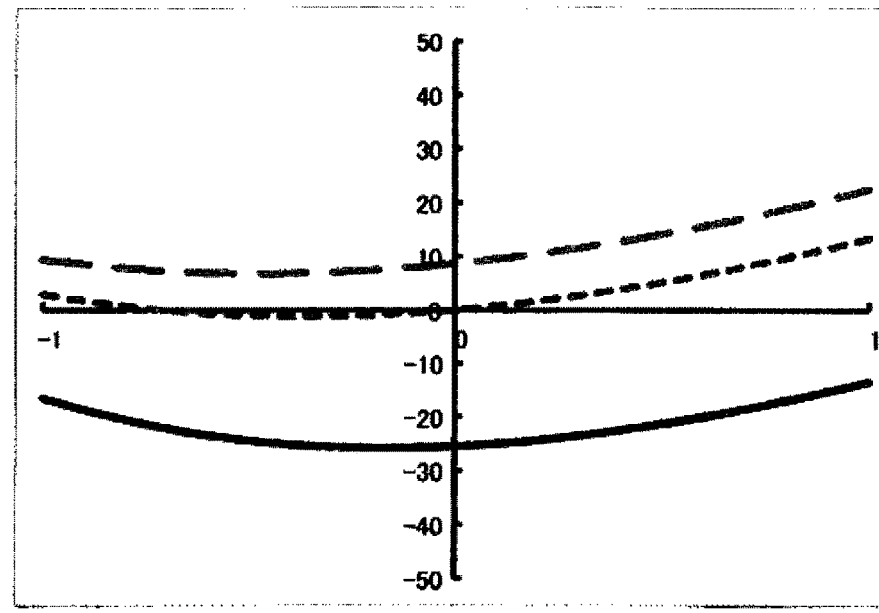

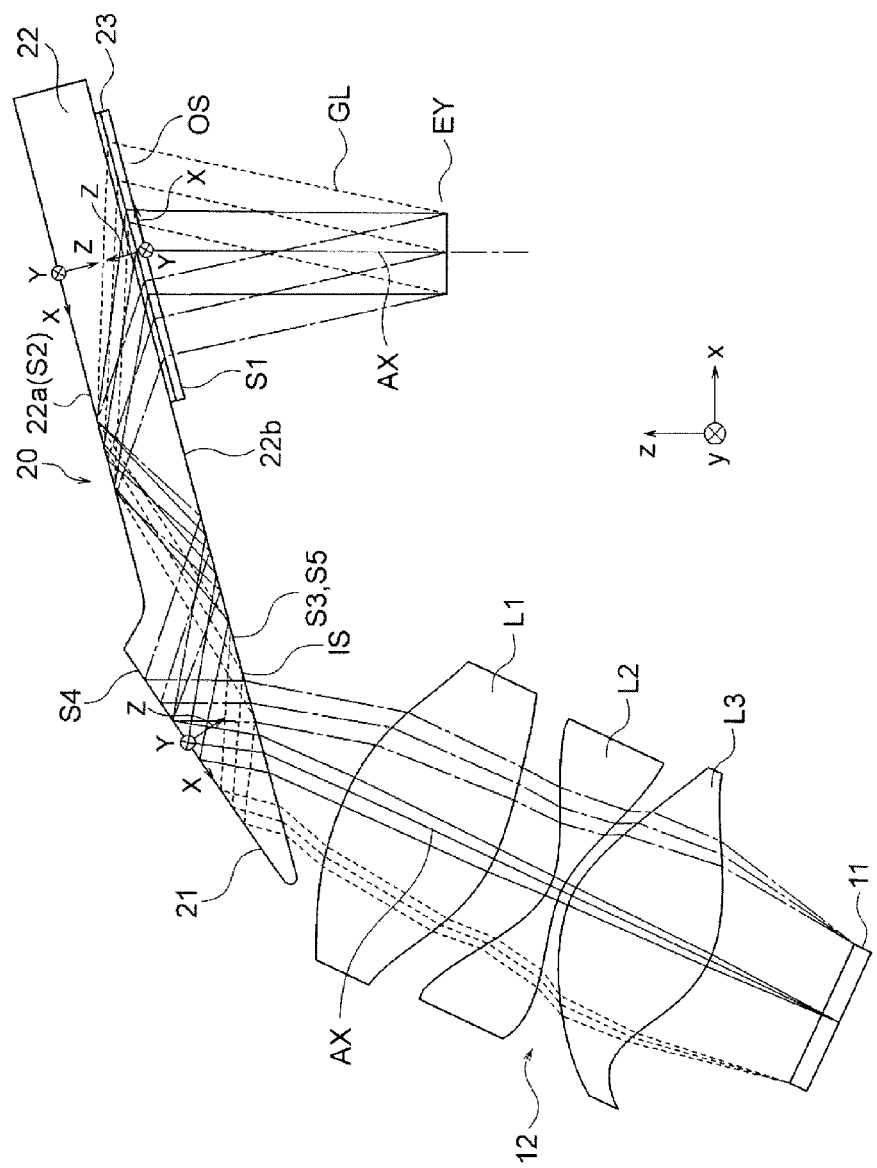
[Fig. 14]

[Fig. 15A]
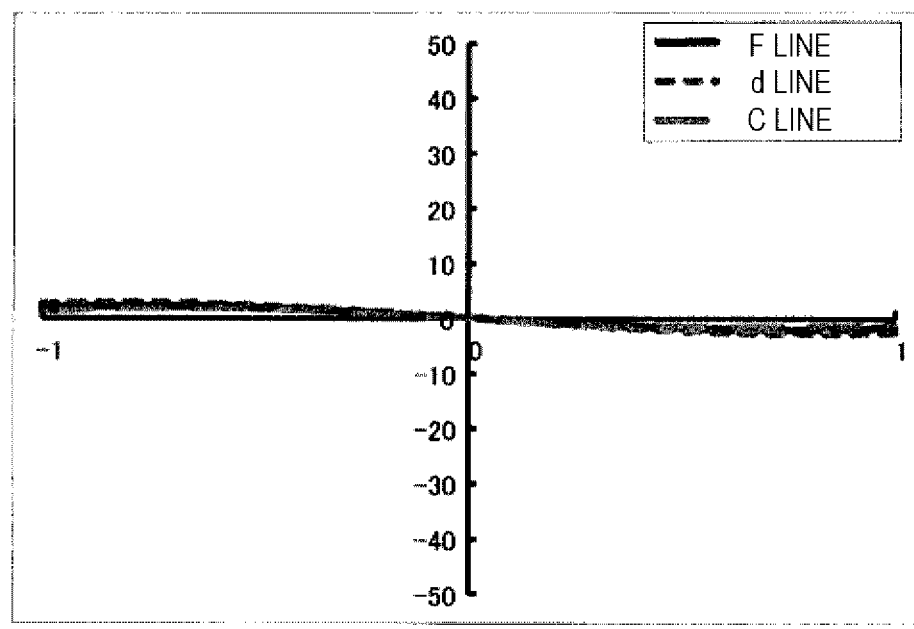
[Fig. 15B]
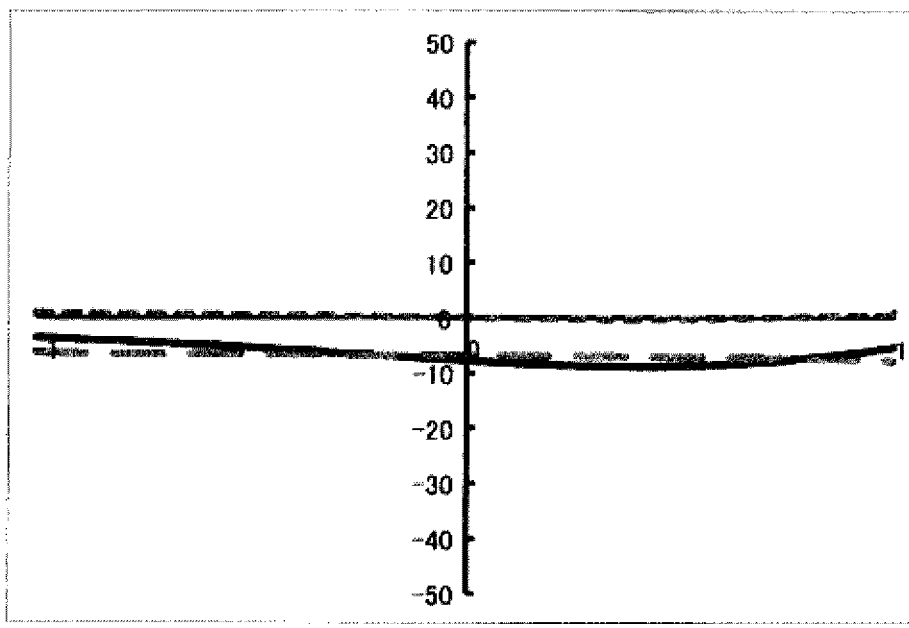

[Fig. 15C]
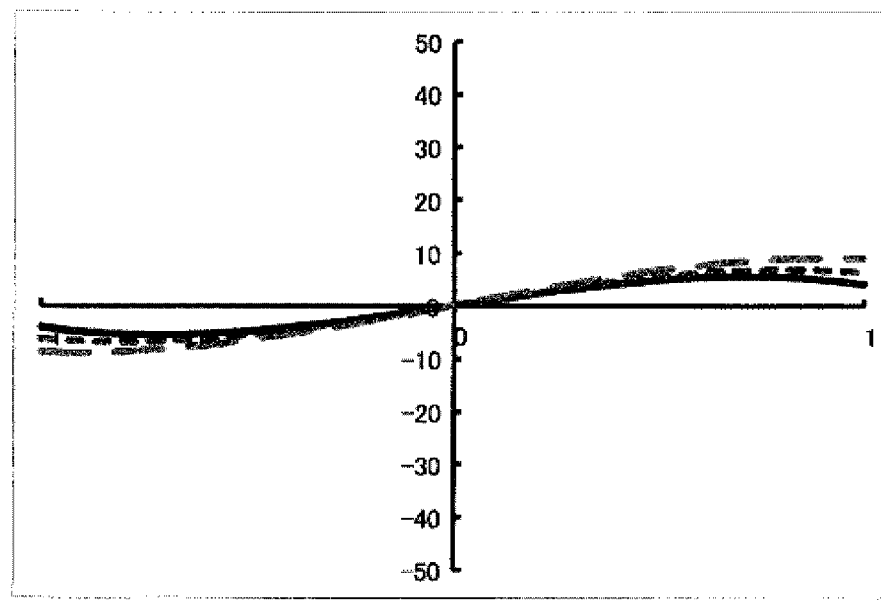
[Fig. 15D]
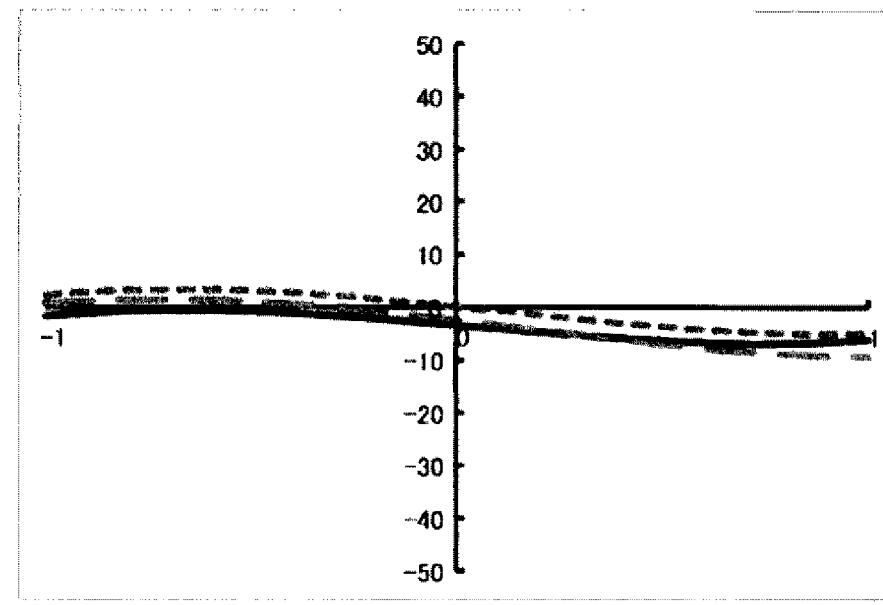

[Fig. 15E]
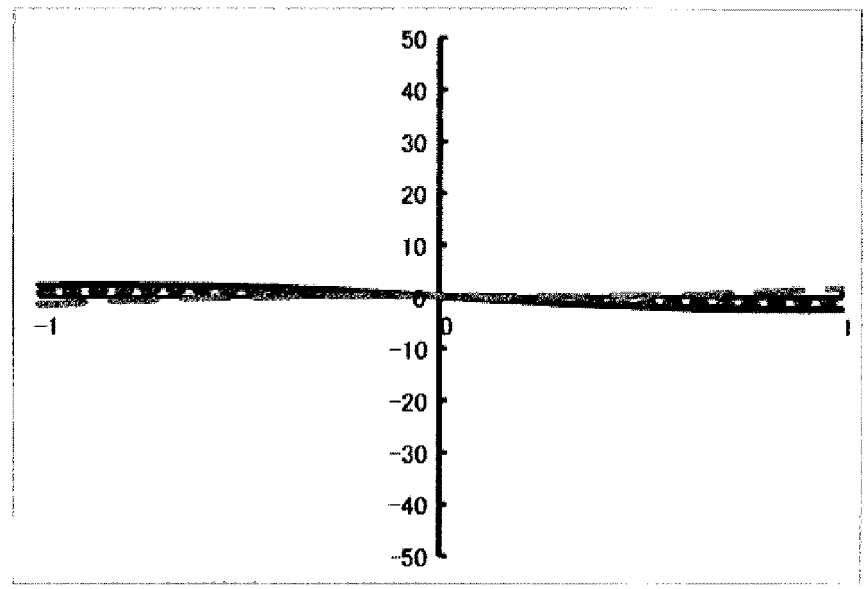
[Fig. 15F]
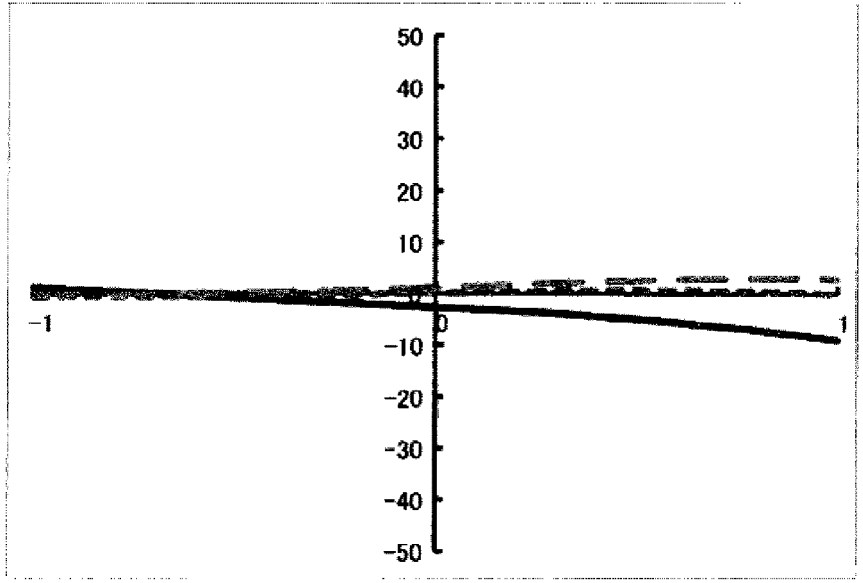

[Fig. 16A]
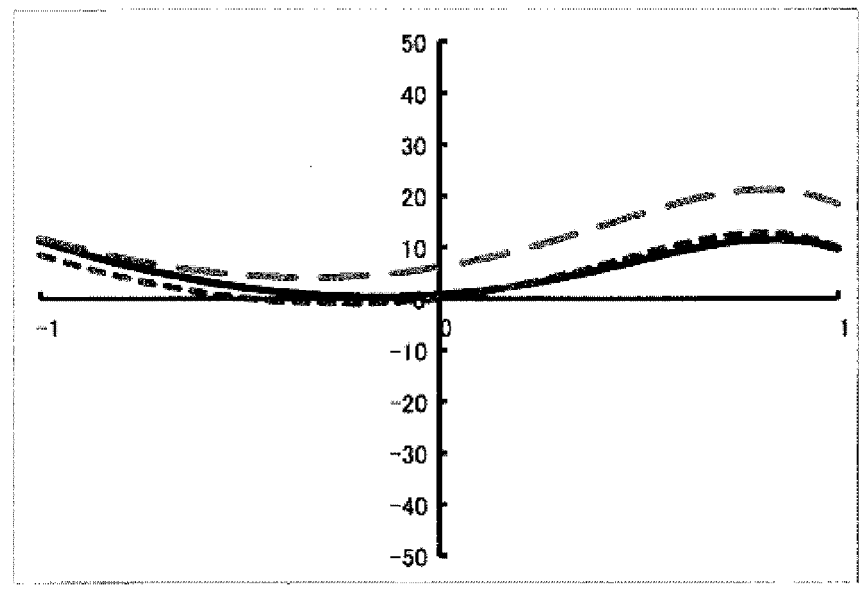
[Fig. 16B]
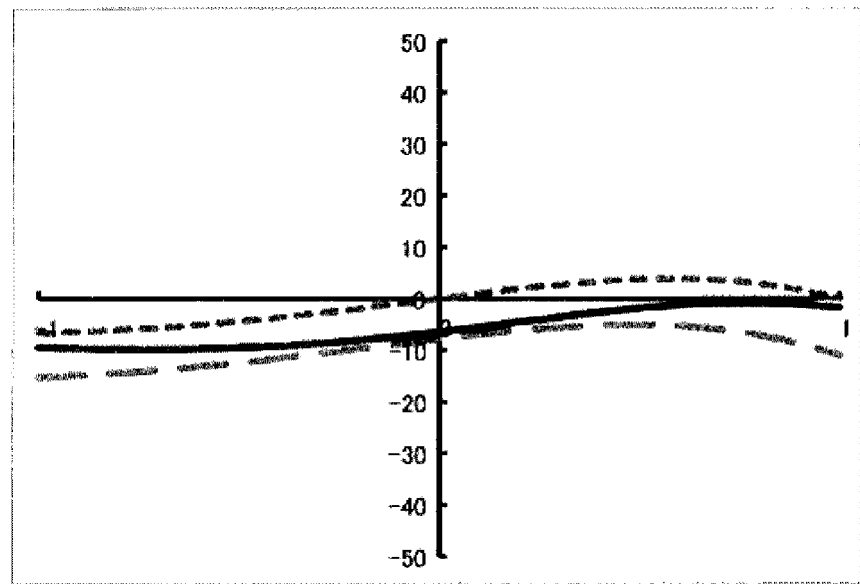

[Fig. 16C]
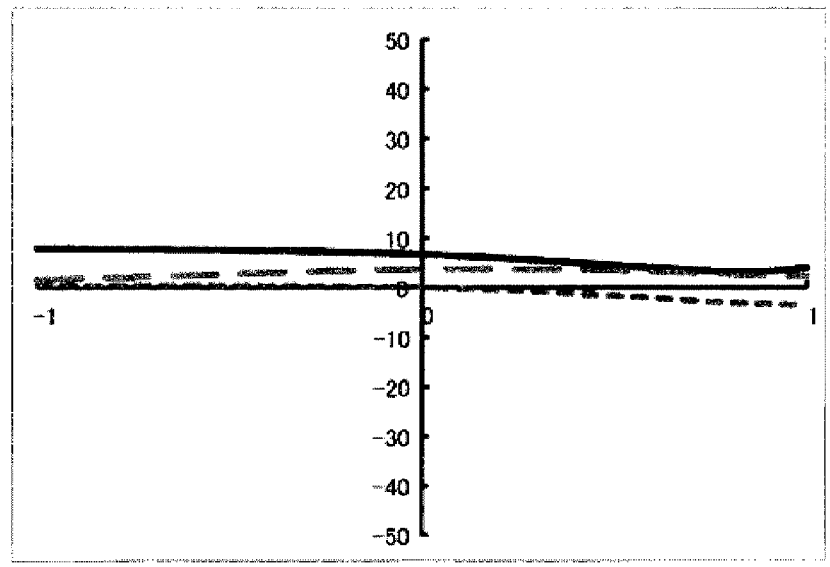
[Fig. 16D]
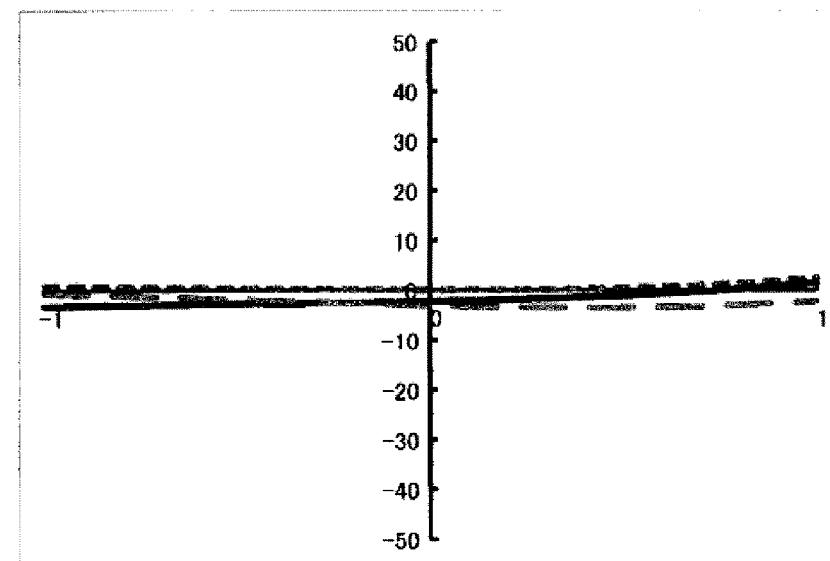

[Fig. 16E]
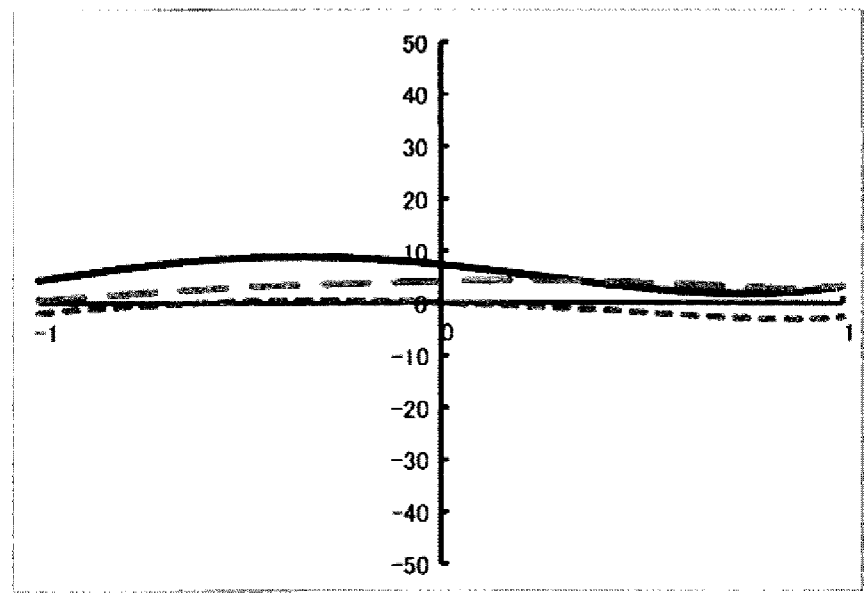
[Fig. 16F]
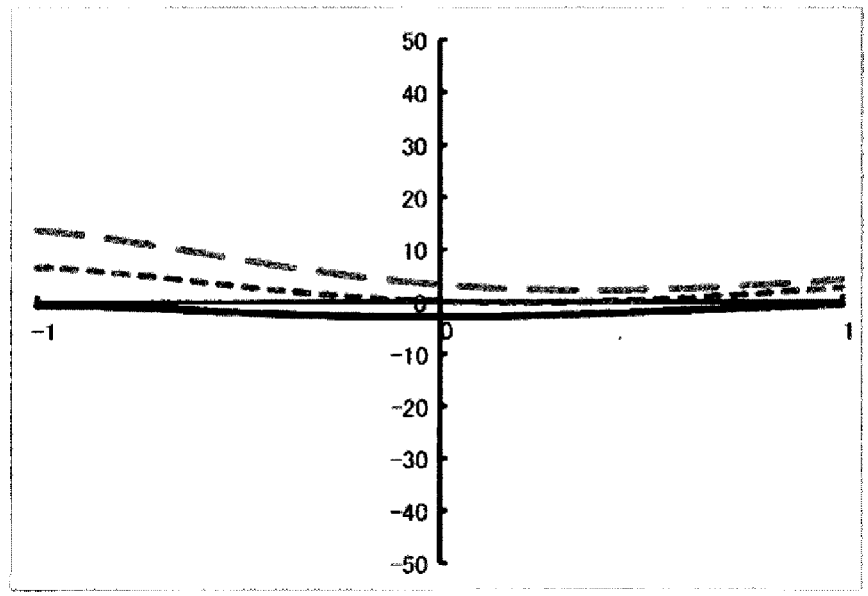

[Fig. 17]
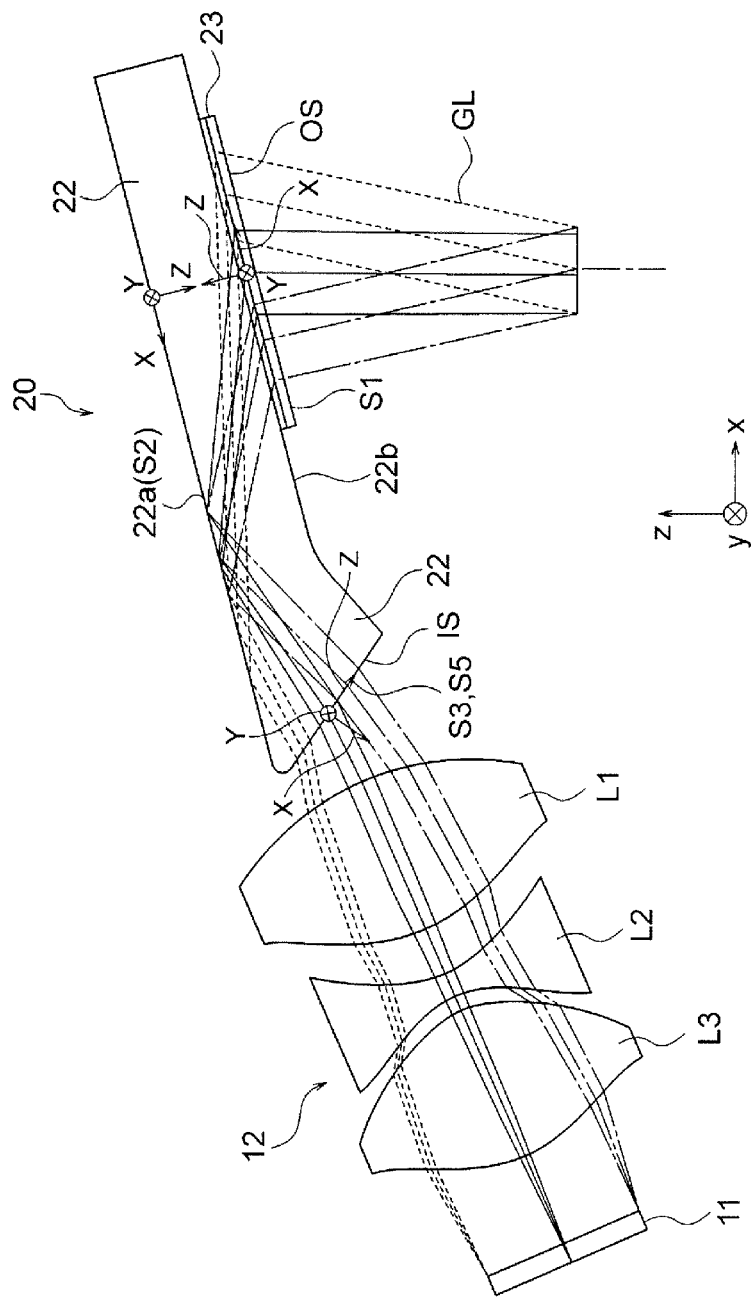

[Fig. 18A]
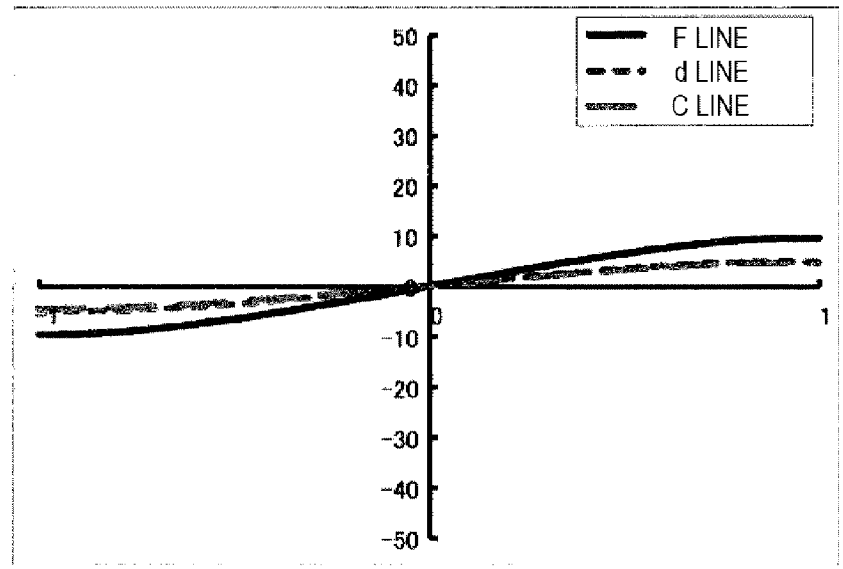
[Fig. 18B]
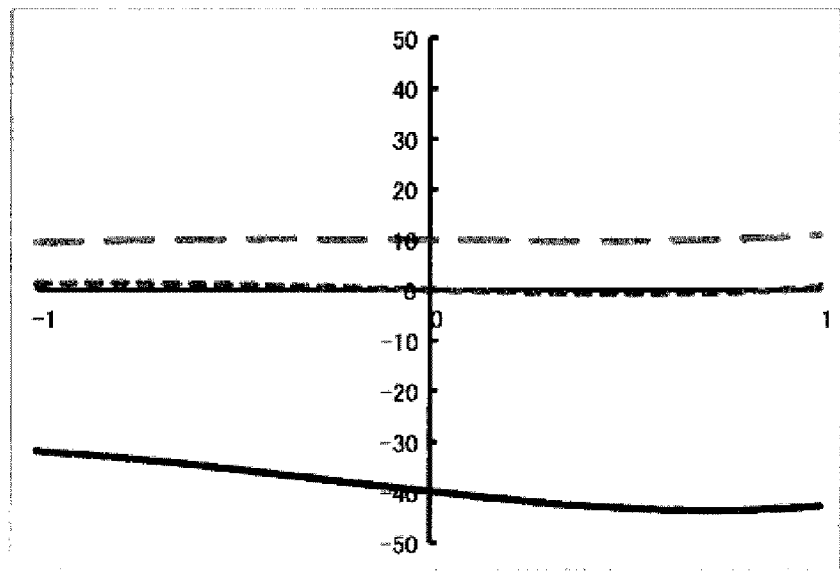

[Fig. 18C]
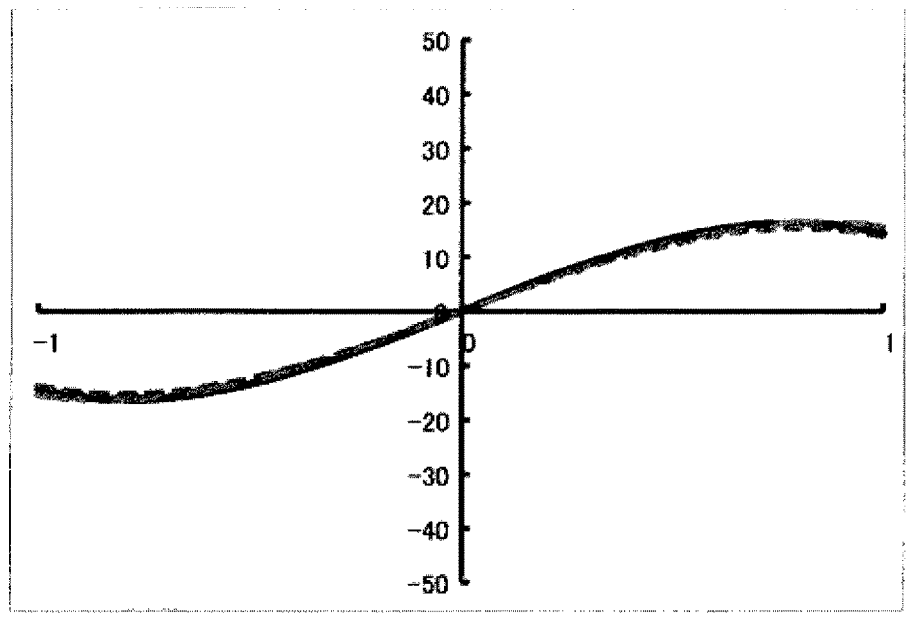
[Fig. 18D]
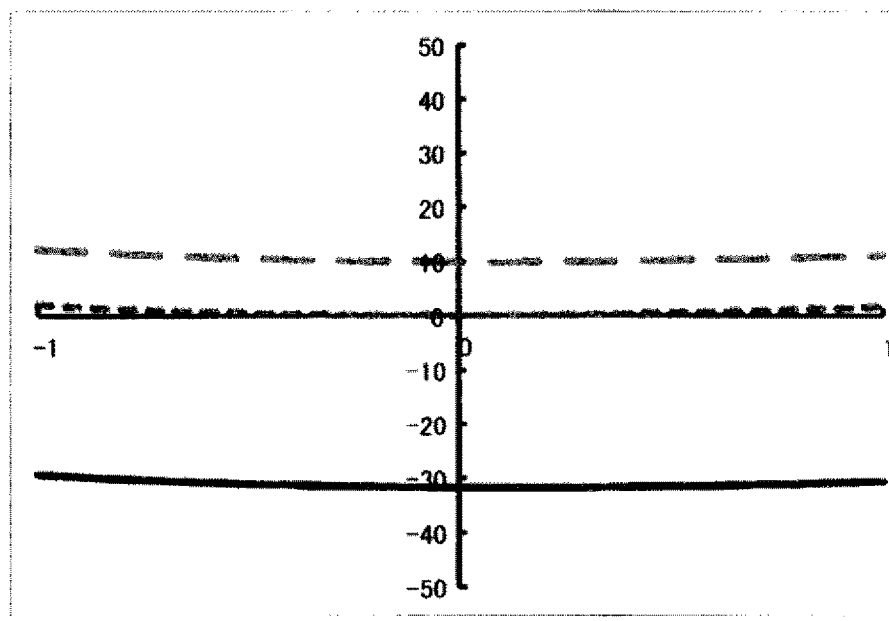

[Fig. 18E]
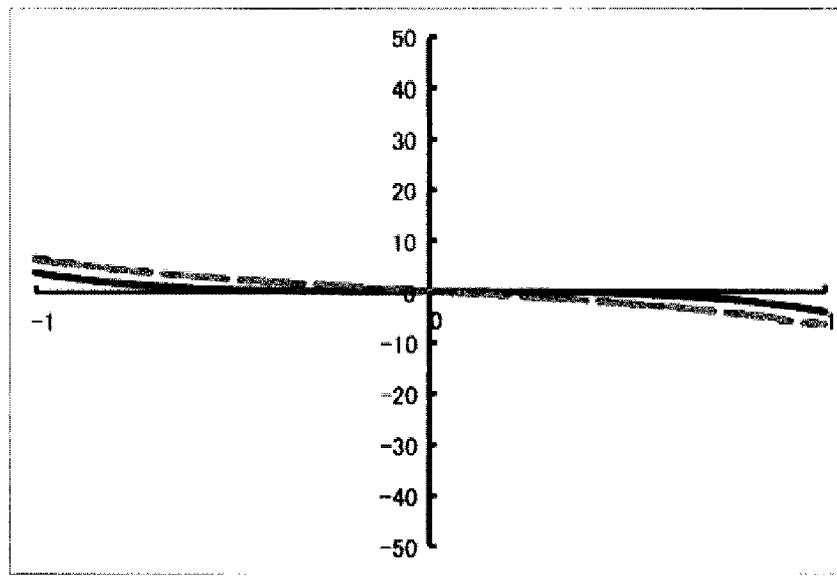
[Fig. 18F]
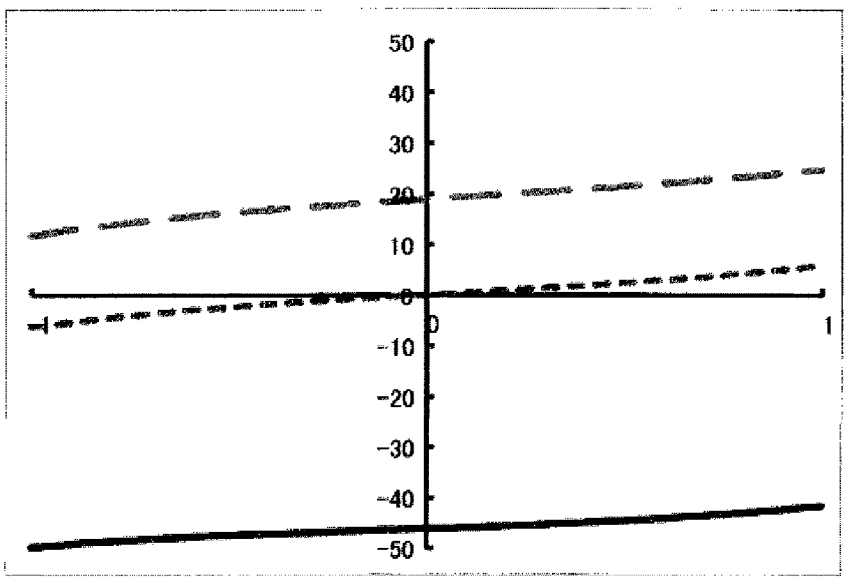

[Fig. 19A]
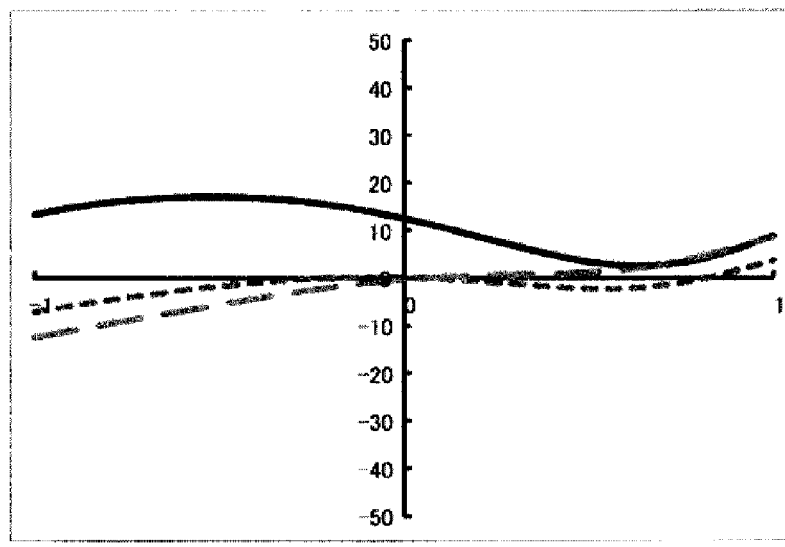
[Fig. 19B]
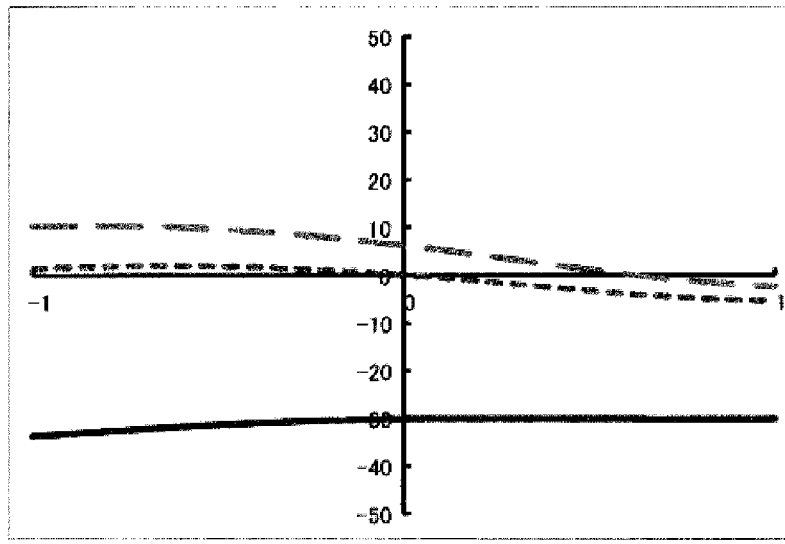

[Fig. 19C]
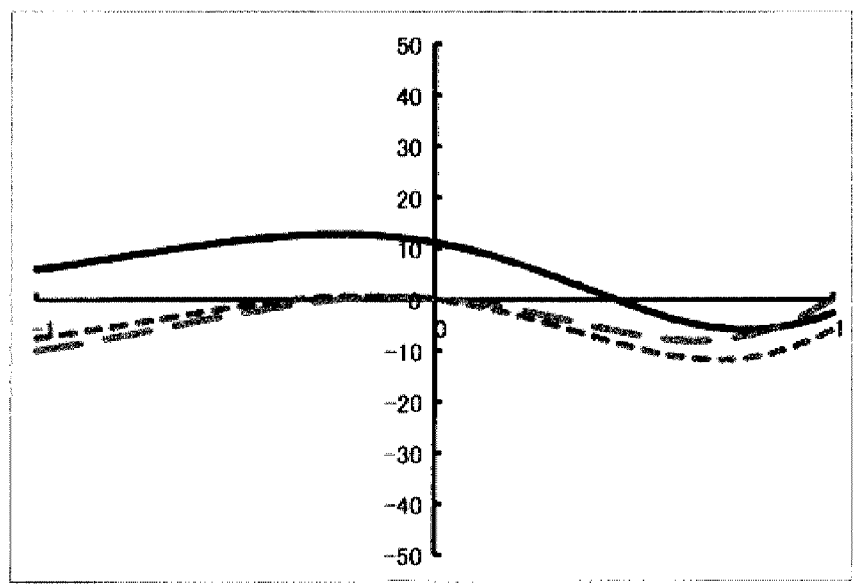
[Fig. 19D]
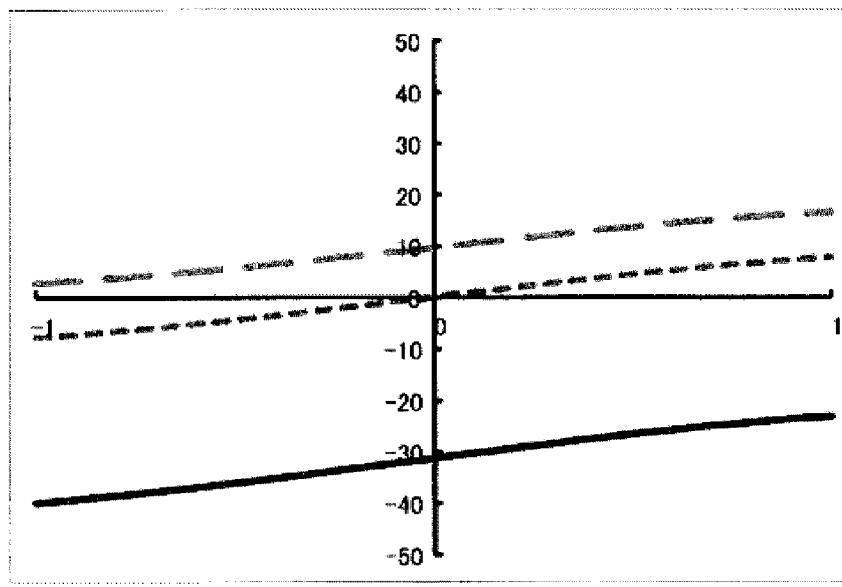

[Fig. 19E]
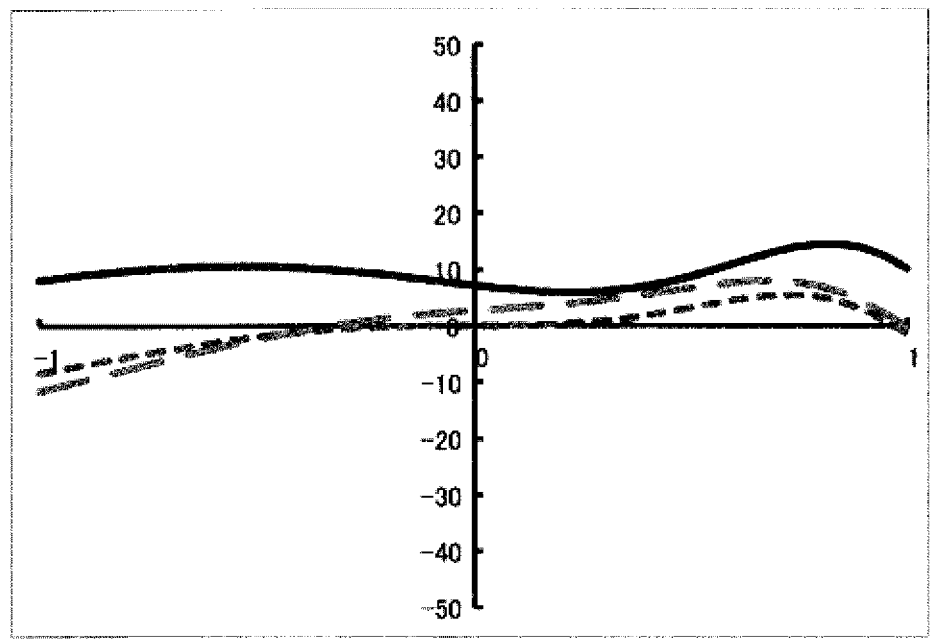
[Fig. 19F]
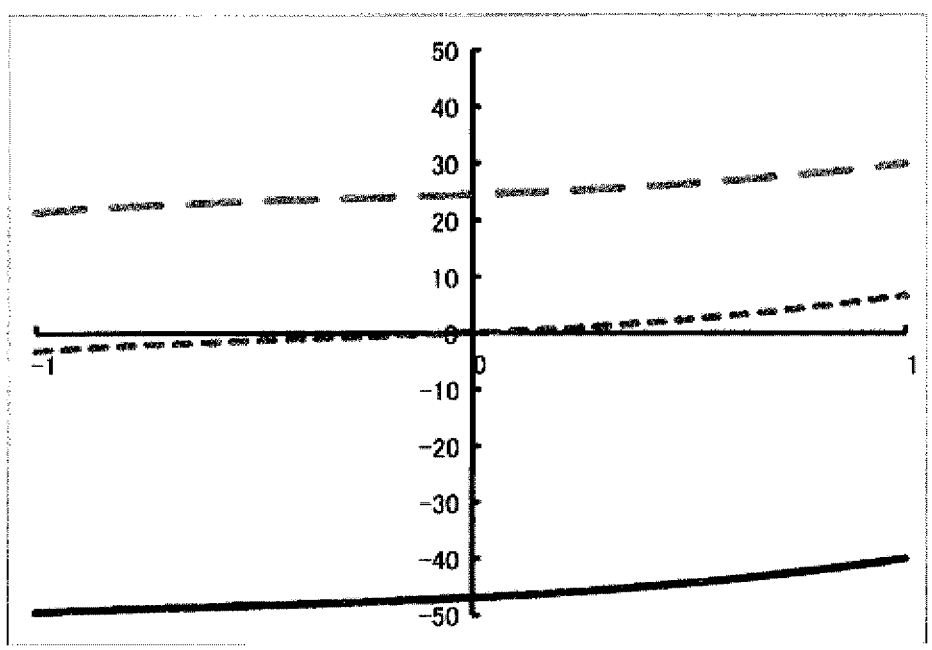

[Fig. 20A]
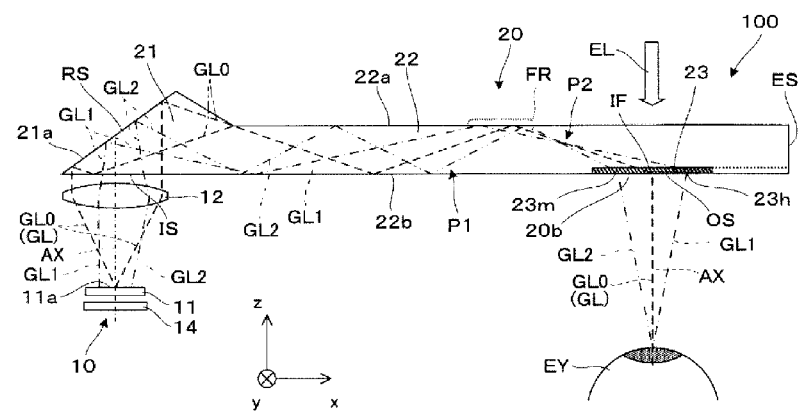
[Fig. 20B]
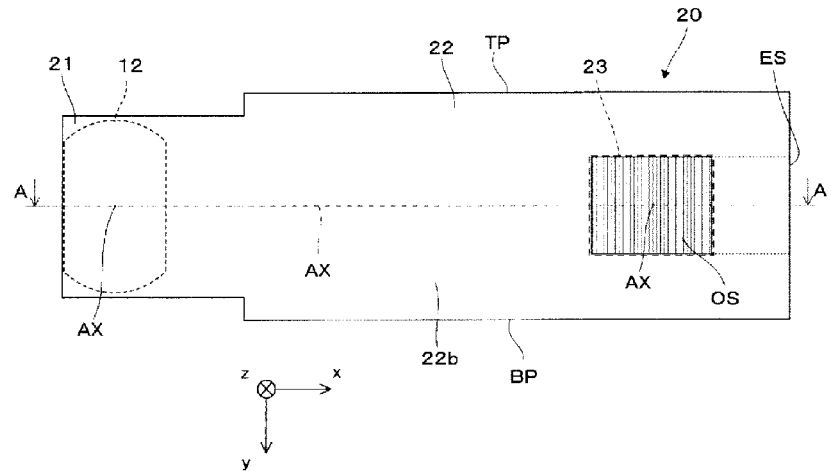

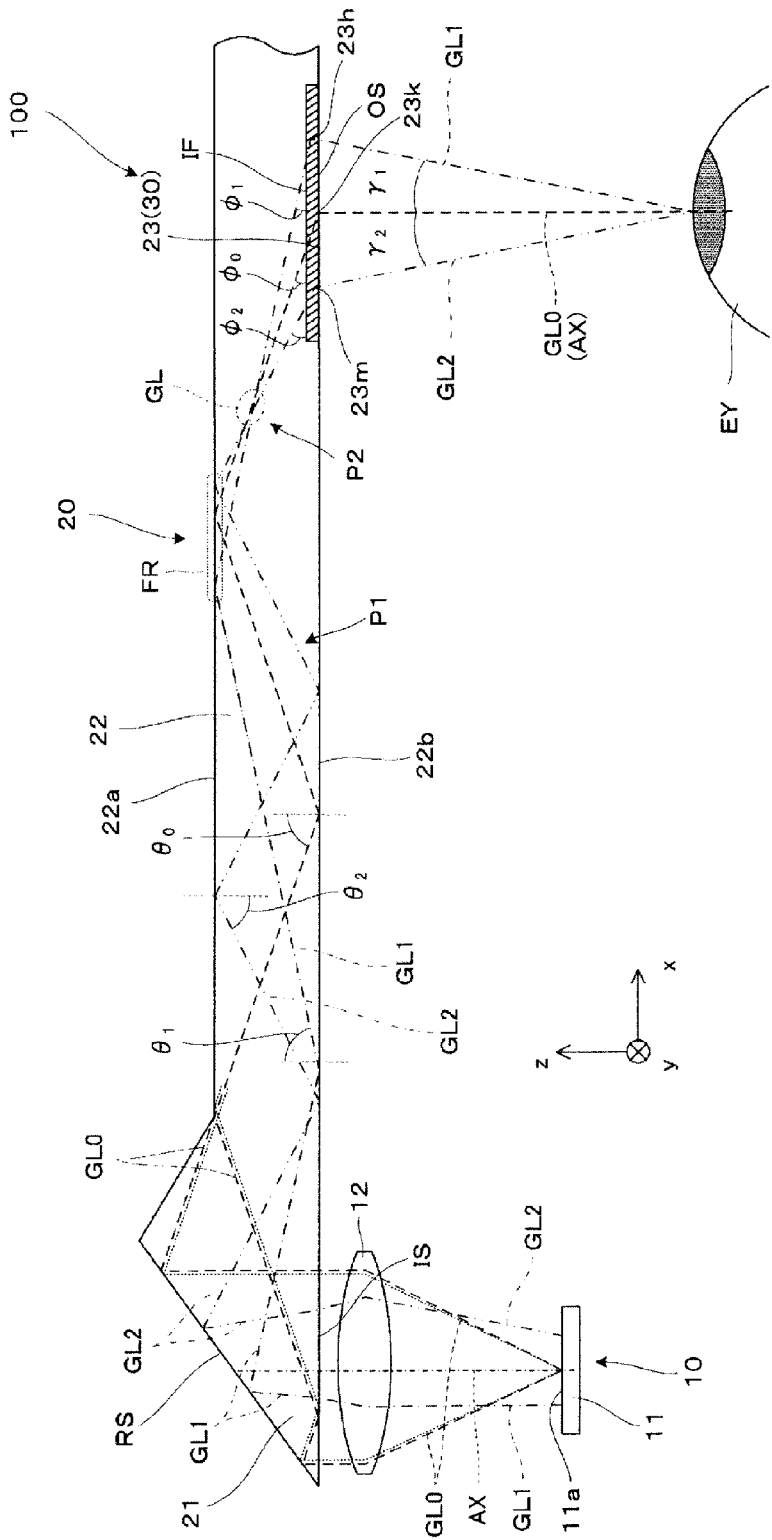
[Fig. 21]

[Fig. 22]
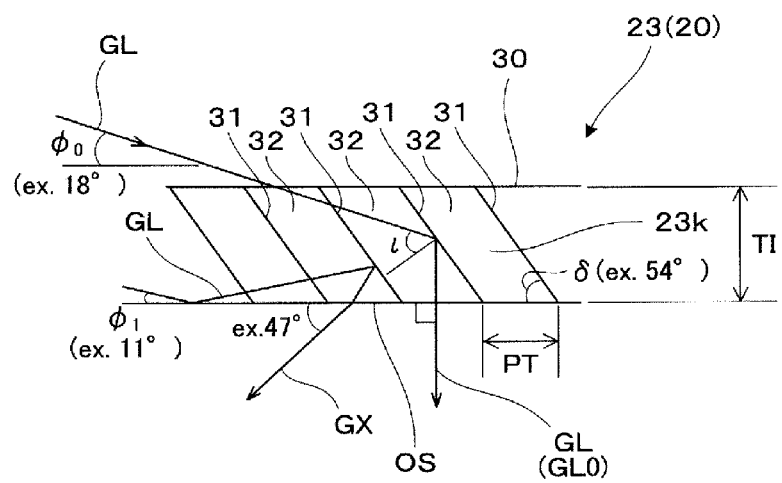
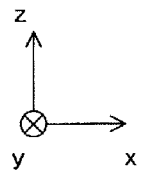
[Fig. 23A]
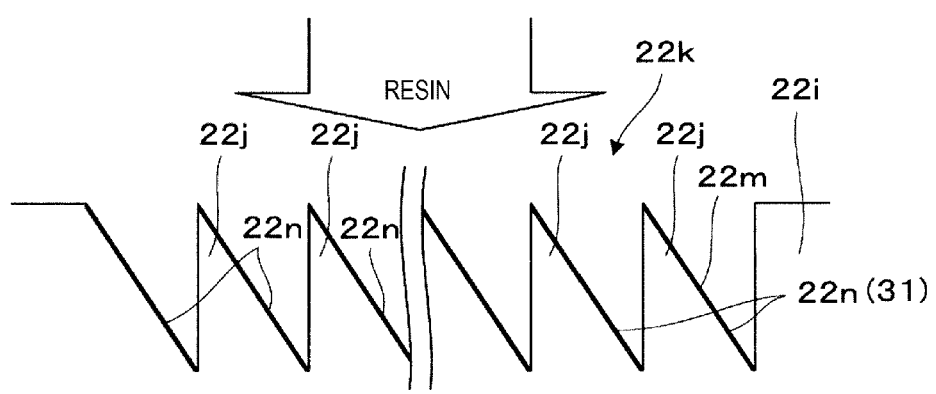

[Fig. 23B]
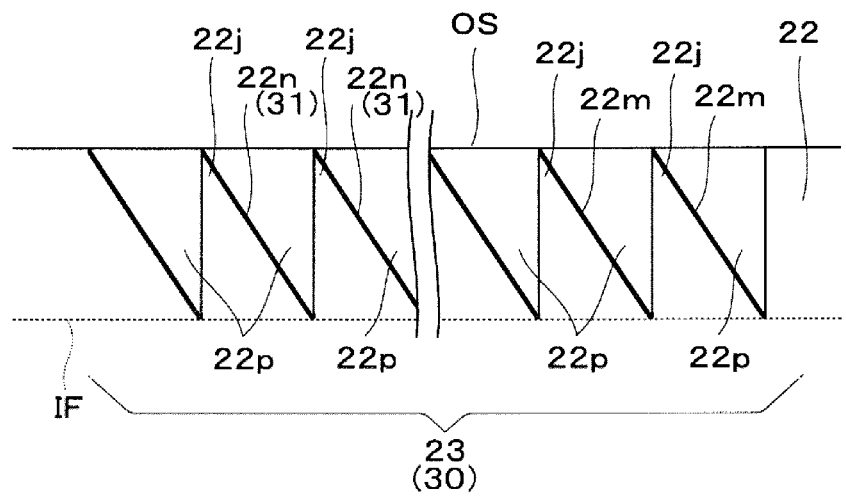
[Fig. 24]
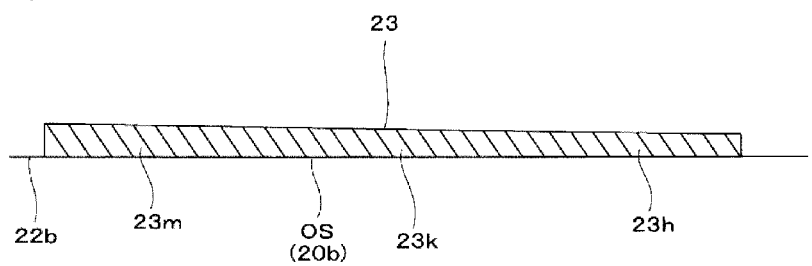
[Fig. 25A]
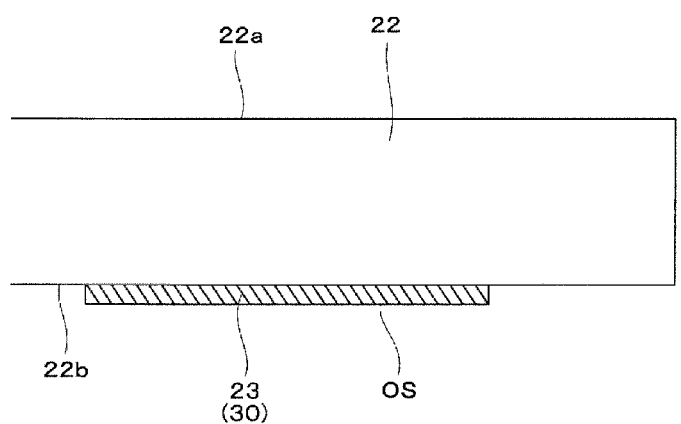

[Fig. 25B]
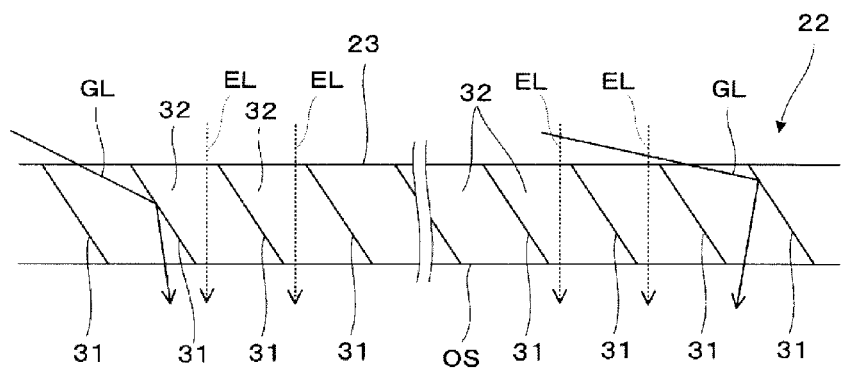
[Fig. 26A]
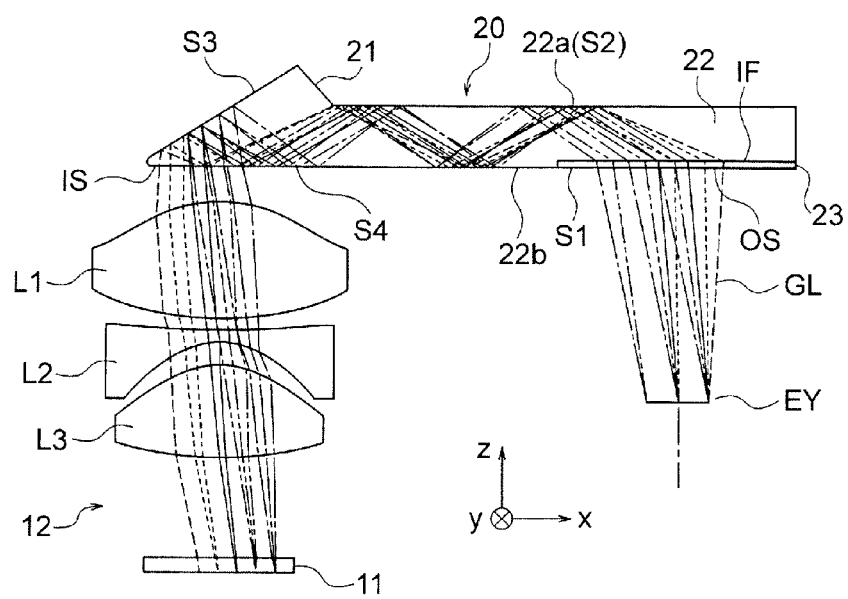

[Fig. 26B]
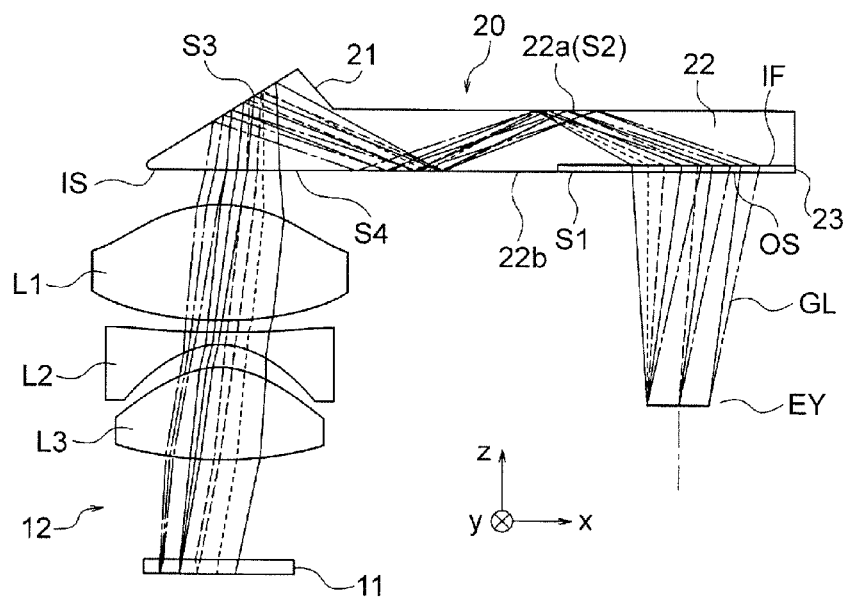
[Fig. 27A]
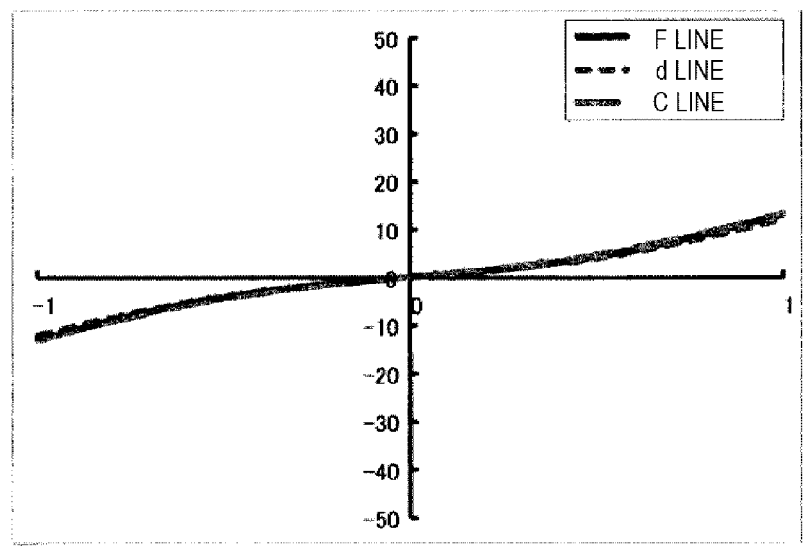

[Fig. 27B]
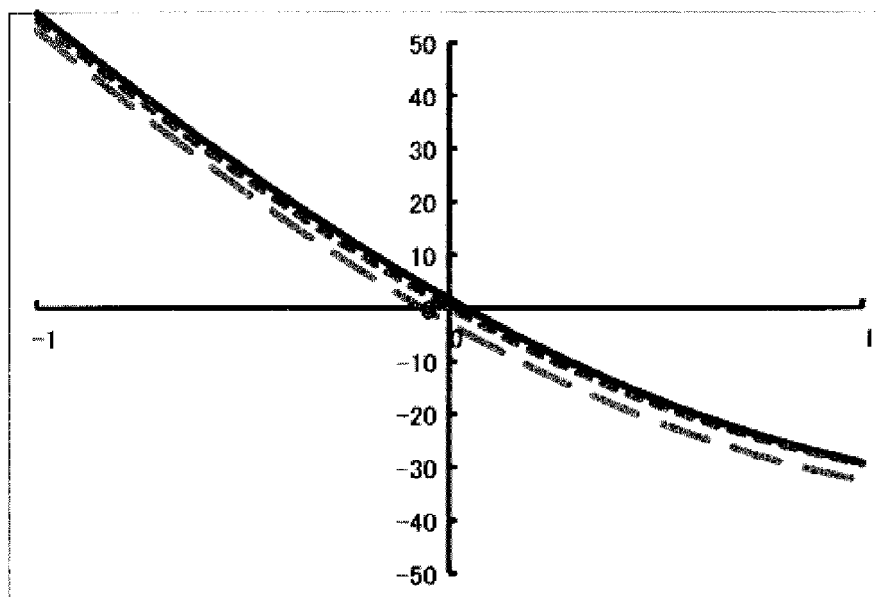
[Fig. 27C]
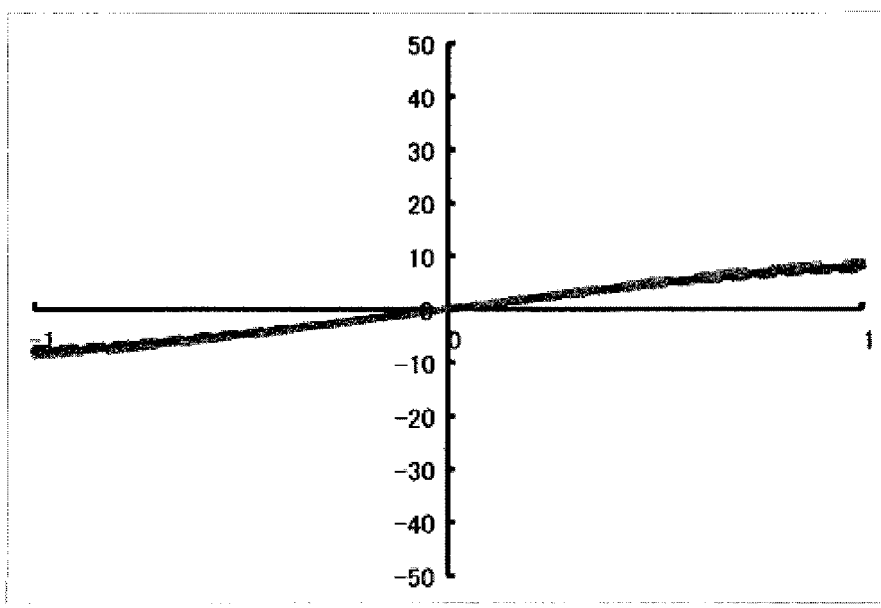

[Fig. 27D]
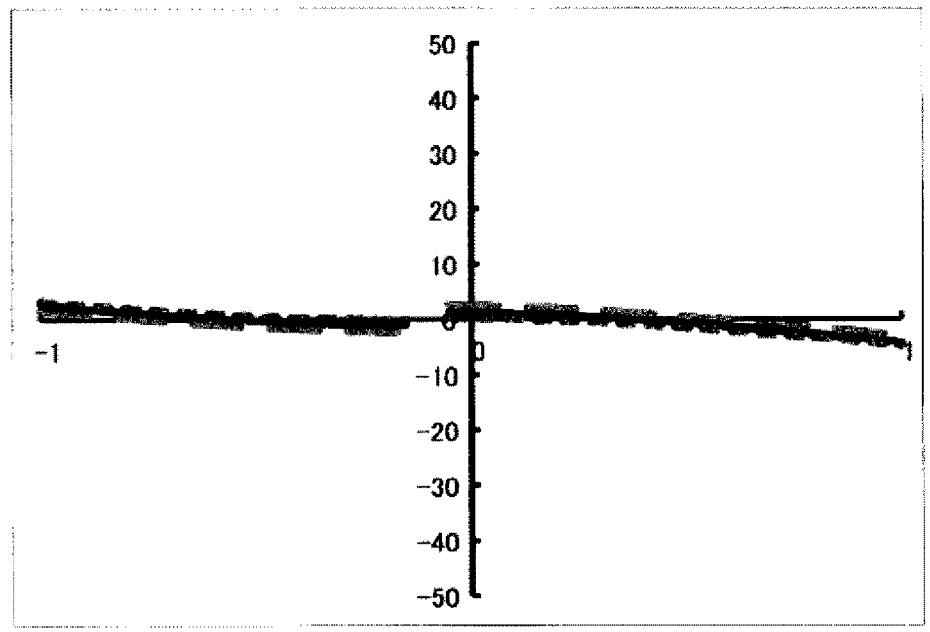
[Fig. 27E]
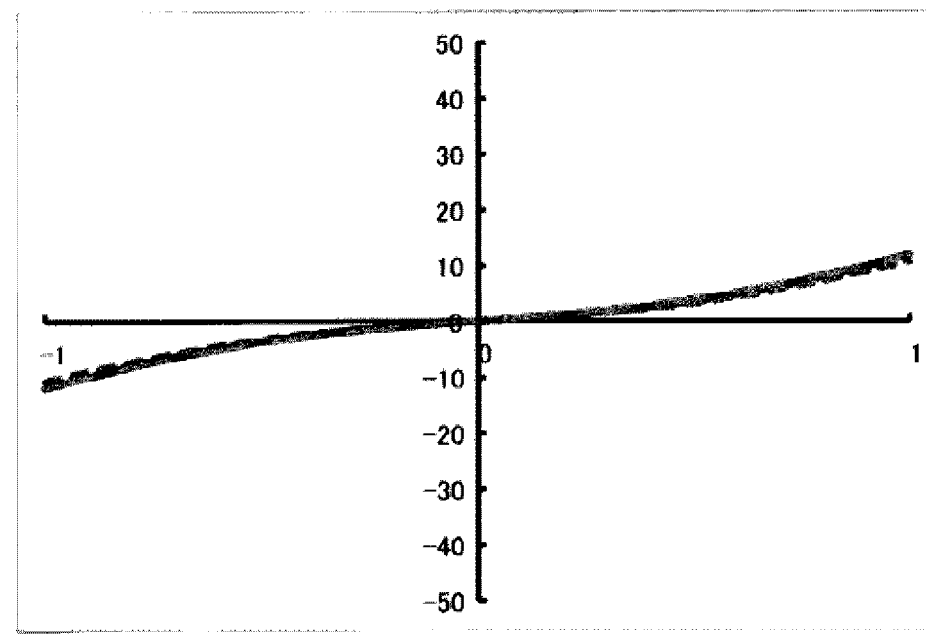

[Fig. 27F]
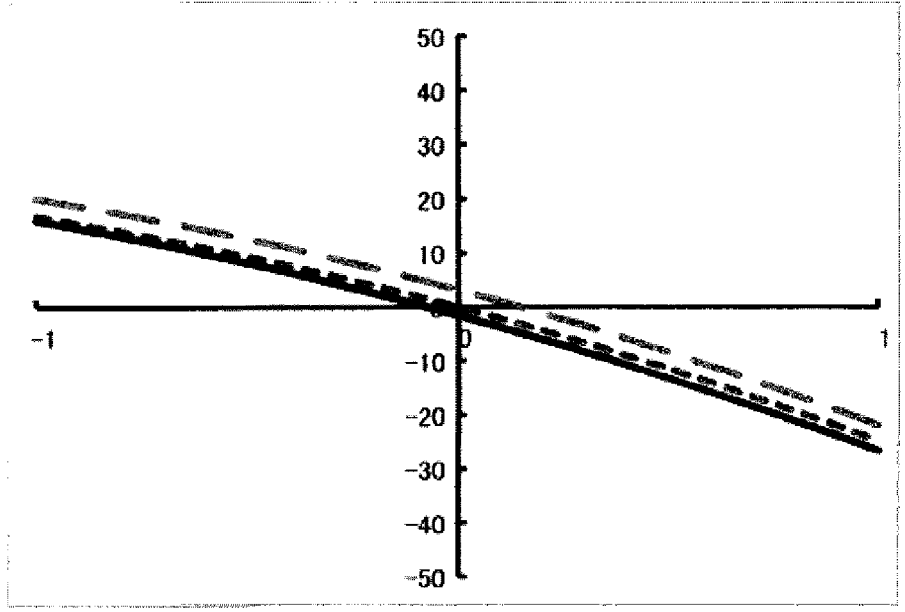
[Fig. 28A]
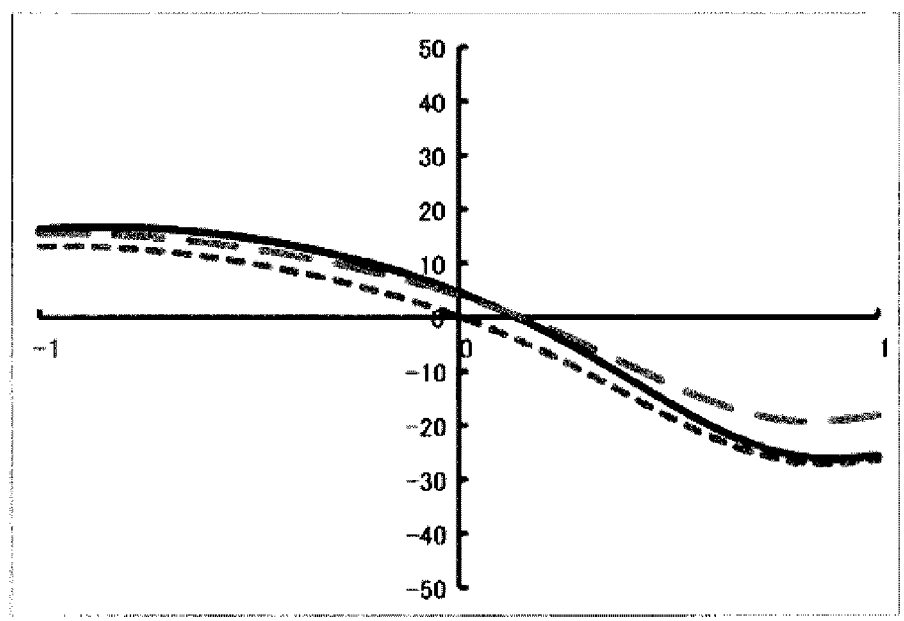

[Fig. 28B]
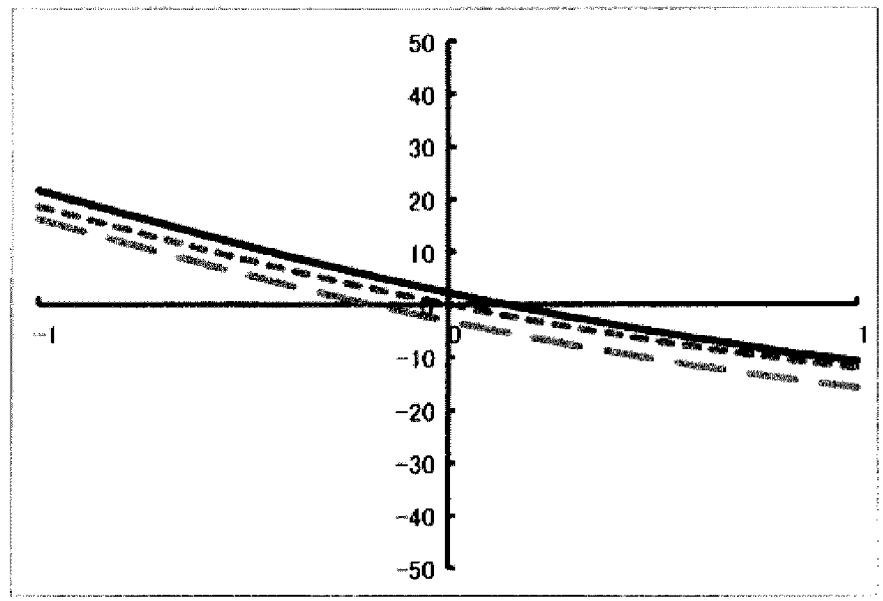
[Fig. 28C]
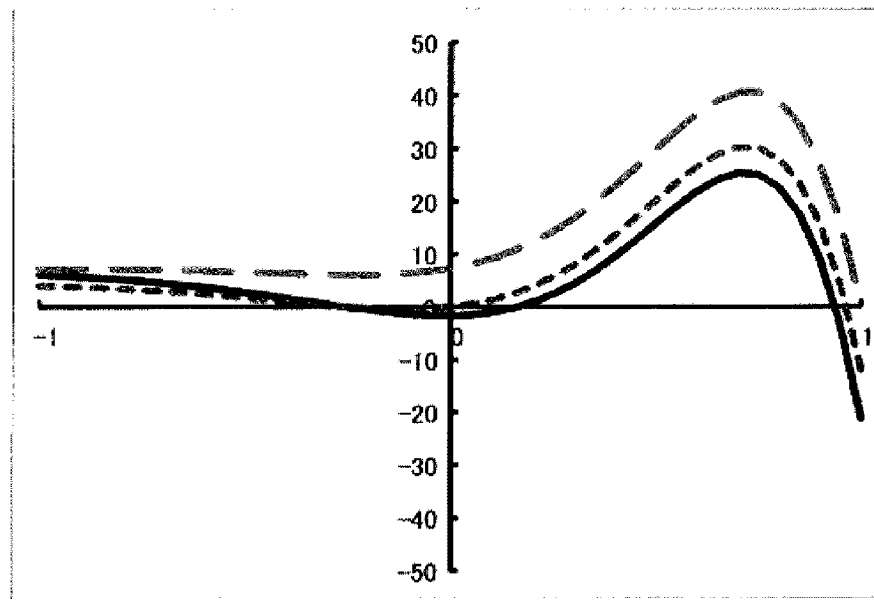

[Fig. 28D]
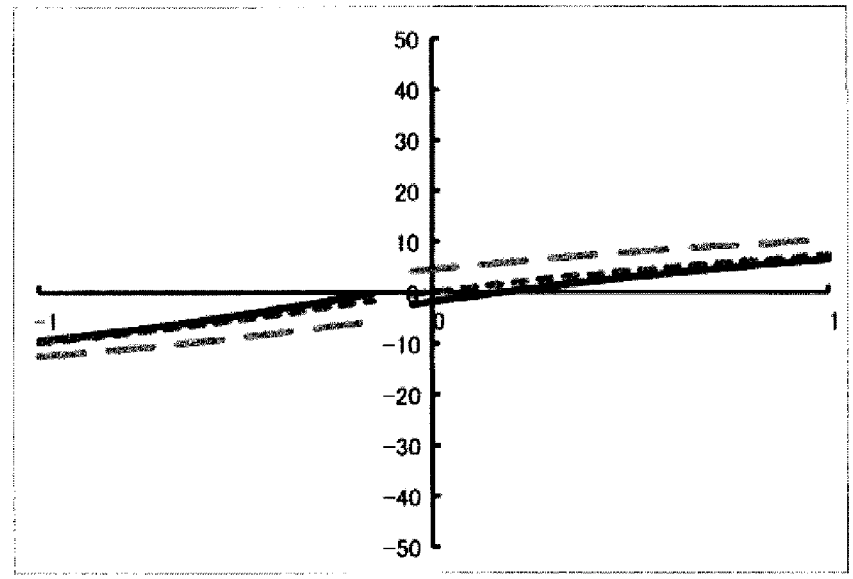
[Fig. 28E]
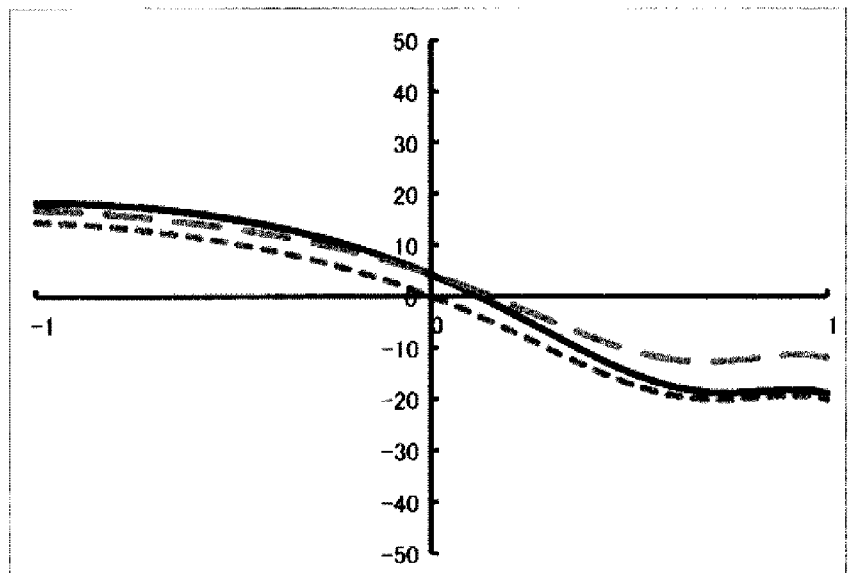

[Fig. 28F]
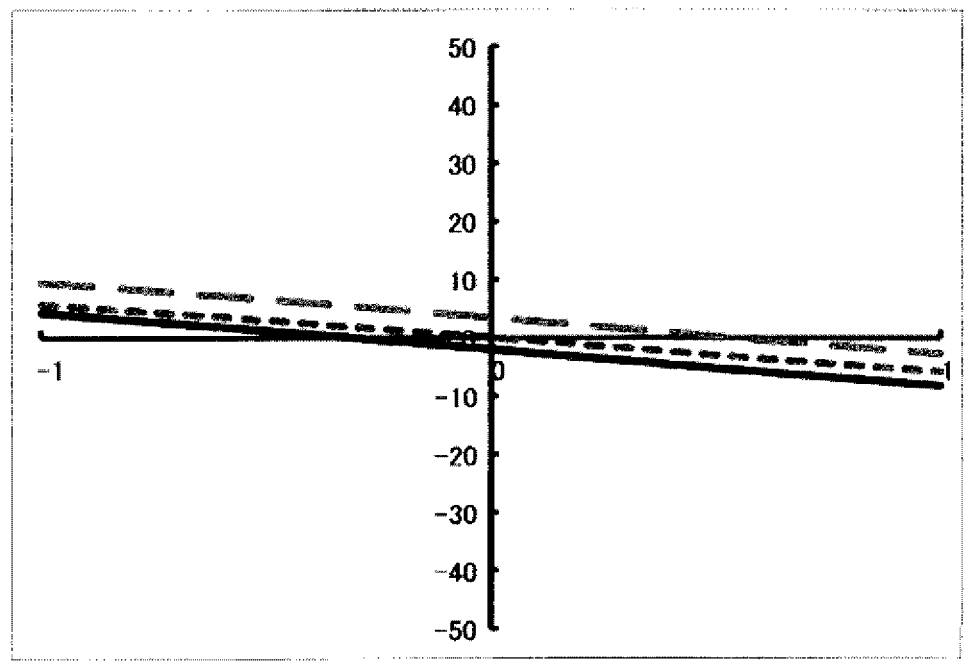

[Fig. 29]
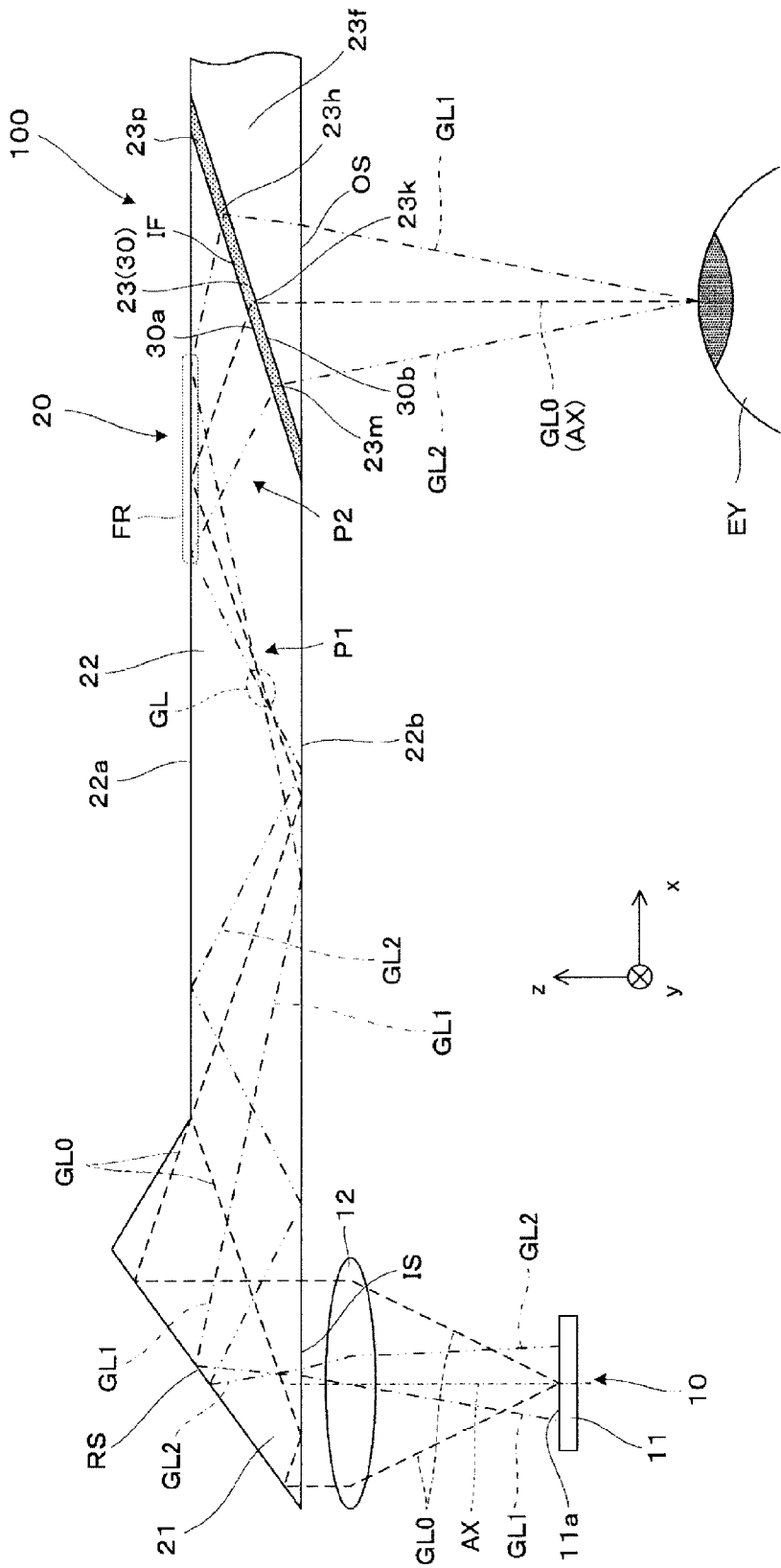

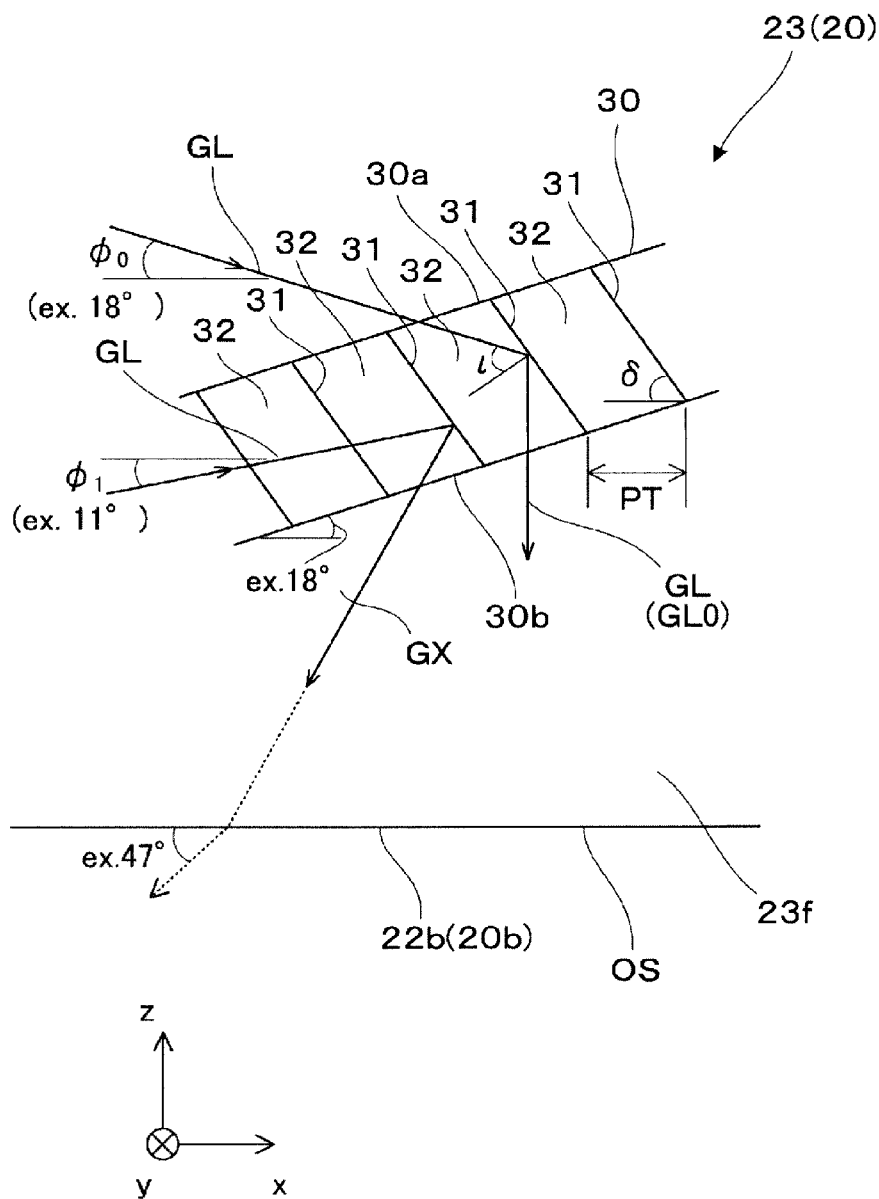
[Fig. 30]

[Fig. 31A]
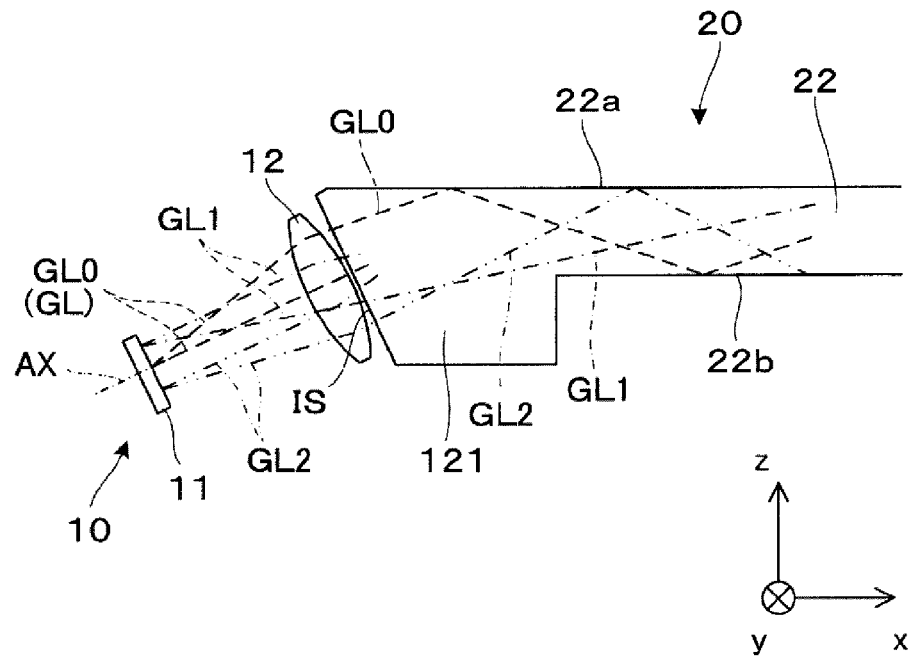
[Fig. 31B]
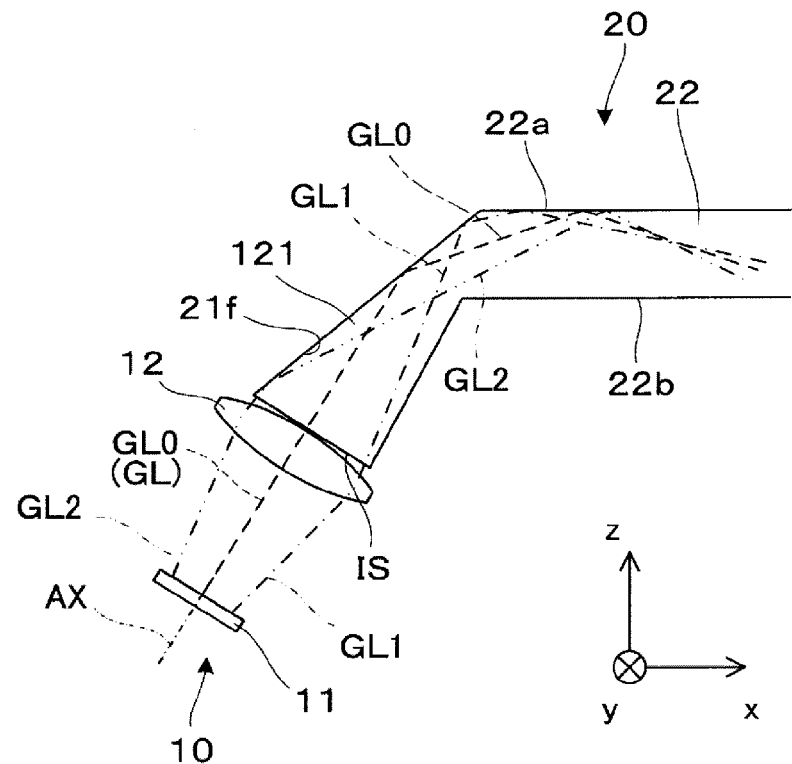

LIGHT GUIDE DEVICE AND VIRTUAL IMAGE DISPLAY APPARATUS

TECHNICAL FIELD

The present invention relates to a light guide device used in a head-mounted display used by being worn on a head, and a virtual image display apparatus provided with the light guide device.

BACKGROUND ART

In recent years, as a virtual image display apparatus such as a head-mounted display capable of forming and observing a virtual image, various apparatuses that guide image light rays from a display apparatus to the pupil of an observer by using a light guide plate have been suggested.

For example, as a device that guides a collimated image and the like to an observer's angle of view, a device configured such that a plurality of half mirrors (hereinafter, referred to as "HMs") is arranged in a parallel planar light guide plate and image light rays are reflected from the HMs so as to be presented to the observer has been known (see PTLs 1 to 5).

In an apparatus of PTL 1, image light rays guided from one end of a light guide plate are reflected while successively transmitting a plurality of HMs that obliquely traverses the light guide plate, and reach an observer. In an apparatus of PTL 2, image light rays guided to the light guide plate propagate while being totally reflected in the light guide plate, are reflected from an outer surface, are reflected from a plurality of HMs that obliquely traverses the light guide plate, and ultimately head for an observer. In an apparatus of PTL 3, image light rays guided to the light guide plate propagate while being totally reflected in the light guide plate, are reflected from a surface close to an observer, are reflected from a plurality of HMs that obliquely traverses the light guide plate, and ultimately head for the observer. In this case, in order to increase efficiency, among the light rays incident on the HMs, the reflectance of the light rays having a large incident angle (50 degrees to 70 degrees) is set to be approximately 0, and the reflectance of the light rays having a small incident angle (40 degrees or less) is set to be a predetermined reflectance. In an apparatus of PTL 4, image light rays guided to a light guide plate propagate while being totally reflected in the light guide plate, are reflected from a surface close to an observer, are reflected from a plurality of HMs, and ultimately head for the observer. Here, the thickness of a region or a layer in which the HMs are provided is set to be thinner than the light guide plate, and thus, the observer can observe the image light rays without transmitting the image light rays through the HMs. In an apparatus of PTL 5 shown in FIG. 1, image light rays guided to a light guide plate propagate while being totally reflected in the light guide plate, are reflected from a surface close to the external side, are reflected from the HMs, and ultimately head for an observer. Here, a region in which the HMs are provided has the same thickness as the light guide plate, and the reflectance of the HMs is gradually increased as the HM becomes farther from a display.

As another display apparatus, there is an apparatus including a thin micro-mirror array adhering to one side of a parallel plate type light guide plate (see PTL 6). In this apparatus, in order to form an image, a scanning beam image source is used, and the pupil is also vertically expanded. Scanning light rays guided to the light guide propagate in the light guide plate and a half mirror array, are reflected from a surface close to the external side, are reflected from HMs of the half mirror array close to an observer, and ultimately head for the observer.

In the apparatuses described in PTLs 1 to 3 and 5, since luminance is reduced whenever the image light rays transmit through the HMs, non-uniformity occurs in the view of angle, and it is not easy to solve or suppress such non-uniformity. In order to solve the luminance non-uniformity, when the reflectance of the HM present on an internal side or a side opposite to a light source is gradually increased, the transmittance of the HM is decreased according to the increase in the reflectance thereof, and non-uniformity occurs in external light (see-through light).

In the apparatus described in PTL 4, since the thickness of a reflection unit configured such that the HMs are arranged is thinner than a light guide, the light rays reach the HM on the internal side without transmitting other HMs. For this reason, non-uniformity in light amount does not occur. However, a HM section configured such that two small surfaces are paired is disposed in the reflection unit, and the image light rays are reflected from the HM twice. For this reason, reflection efficiency tends to be decreased.

In the apparatus described in PTL 6, in order to widen the width of a pencil of light rays, the pencil of light rays is divided using the HMs. In so doing, as the image light rays propagate toward the internal side, luminance is decreased, and non-uniformity occurs in the angle of view. Thus, it is not easy to solve or suppress such non-uniformity.

CITATION LIST

Patent Literature

PTL 1: JP-A-3-15815
PTL 2: JP-A-2013-210633
PTL 3: JP-A-2010-164988
PTL 4: JP-A-2012-88588
PTL 5: International Publication No. WO2007/062098
PTL 6: International Publication No. WO2009/009268

SUMMARY OF INVENTION

An advantage of some aspects of the invention is that it provides a light guide device that does not cause non-uniformity in image light and external light and does not cause ghosts, and a virtual image display apparatus provided with the light guide device.

A light guide device according to an aspect of the invention includes: a light guide that includes a pair of surfaces, which faces each other so as to correspond to an observer and an external side and extends in substantially parallel with each other; an incident section that is provided at one end of the light guide; and an emission section that is provided at the other end of the light guide close to the observer, wherein the emission section includes a reflection unit configured such that a plurality of mirrors which reflects image light rays is arranged, and the plurality of mirrors is inclined toward the incident section toward the external side, reflects the image light rays incident on the reflection unit without reflecting the image light rays from a boundary surface between the light guide and the reflection unit, and causes the reflected image light rays to head for the observer. Here, the light guide refers to a member including a light guide region interposed between the pair of surfaces. The boundary surface between the light guide and the reflection unit includes a boundary in the functional sense, and specifically includes a functional boundary that is continued in view of material as well as a bonded surface that is not continued in view of material.

The light guide may be integrally formed with one or both of the incident section and the emission section, and in this case, a portion formed by extending the pair of surfaces may be formed on the incident section or the emission section.

According to the light guide device, since the device is set such that the image light rays incident on the reflection unit are reflected without reflecting the image light rays from the boundary surface between the light guide and the reflection unit and head for the observer, the image light rays only pass through the mirrors, which are positioned in positions in which the image light rays are emitted from the emission section or are positioned therearound, without being reflected from the boundary surface. Thus, it is possible to prevent luminance non-uniformity or light reduction by reducing the number of times of the image light rays to be observed passing through the mirrors, and it is possible to suppress the occurrence of ghost light by preventing unintended image light rays from being emitted.

In a specific aspect of the invention, in the light guide device according to the aspect, a thickness of the reflection unit is less than a thickness of the light guide. In this case, it is possible to reduce the number of times of the image light rays which are reflected from the surface of the light guide close to the external side and are incident on the reflection unit passing through the mirrors, and it is possible to output the image light rays to the observer with less loss.

In another specific aspect of the invention, the plurality of mirrors is arranged in parallel. In this case, since angle information is retained irrespective of an incident position in the reflection unit, it is easy to form the image light rays, and it is possible to display a high-precision image.

In another specific aspect of the invention, the plurality of mirrors is arranged at a variable pitch. In this case, it is possible to suppress the occurrence of diffraction non-uniformity or moire.

In another specific aspect of the invention, the plurality of mirrors is arranged at a random pitch. In this case, it is possible to securely suppress the occurrence of diffraction non-uniformity or moire.

In another specific aspect of the invention, the plurality of mirrors is arranged at a pitch of 0.5 mm to 2.0 mm. By arranging the plurality of mirrors at such a pitch, there is an effect of suppressing the occurrence of wavelength dispersion due to the interference of the image light rays when the pitch of the mirrors is comparatively narrowed or black lines due to a difference in light transmission amount when the width of the mirror is comparatively widened.

In another specific aspect of the invention, among the image light rays, an angle at which a light ray used for image formation is incident on the mirror of the reflection unit is decreased as the mirror becomes farther from the incident section. That is, an angle at which the image light rays to be observed are incident on the mirrors is increased on an inlet side close to an image light source, and an angle at which the image light rays to be observed are incident on the mirrors is decreased on the internal side separated from the image light source.

In another specific aspect of the invention, a pencil of light rays used for image formation is reflected from a predetermined surface region of the light guide on the external side, is incident on the reflection unit, and is narrowed in width at any one of front and rear straight optical paths reflected from the predetermined surface region on a section including an optical axis. In this case, since the pencil of light rays used for image formation is narrowed once near the predetermined surface region, it is easy to comparatively widen an angle of view. It is possible to downsize a projecting lens that causes the image light rays to be incident on the light guide in a sectional direction including the optical axis, and it is possible to easily manufacture the projecting lens.

In another specific aspect of the invention, on the section including the optical axis, an incident width at which the pencil of light rays used for image formation is incident on the reflection unit is greater than an incident width at which the pencil of light rays used for image formation is incident on the predetermined surface region. As stated above, by relatively narrowing the incident width at which the pencil of light rays used for image formation is incident on the predetermined surface region, it is easy to cause the image light rays to be incident on the reflection unit without reflecting the image light rays from the boundary surface between the light guide and the reflection unit and to output the image light rays from the incident position.

In another specific aspect of the invention, the plurality of mirrors is a half mirror. In this case, it is possible to facilitate a see-through view by increasing the transmission properties of the external light. It is easy to narrow the interval between the plurality of mirrors, and it is possible to increase the utilization efficiency of the image light rays.

In another specific aspect of the invention, the reflection unit is disposed along a surface of the light guide close to the observer. In this case, it is easy to reflect the image light rays reflected from the surface of the light guide close to the external side by using the plurality of mirrors.

In another specific aspect of the invention, the reflection unit is disposed so as to be inclined such that a portion far away from the incident section is relatively close to the external side. In this case, it is possible to reflect the image light rays reflected from the surface of the light guide close to the external side to the observer by using the plurality of mirrors.

In another specific aspect of the invention, image light rays in all angles of view are reflected the same number of times within the light guide, are reflected from the plurality of mirrors, and reach an eye of the observer.

In another specific aspect of the invention, the incident section includes at least one of an incident surface and a reflection surface of a curved surface.

In another specific aspect of the invention, the light guide includes first and second total reflection surfaces that extend in parallel with each other as the pair of facing surfaces, and guides the image light rays received by the incident section through total reflection from the first and second total surfaces.

In another specific aspect of the invention, by forming the surface present at the incident section (for example, the incident surface or the reflection surface) as the non-axisymmetric curved surface, the degree of freedom in design is improved, and favorable optical performance is realized.

A virtual image display apparatus according to another aspect of the invention includes an image device that generates image light rays, and the light guide device described above.

According to the virtual image display apparatus, by using the light guide device, it is possible to prevent the luminance non-uniformity or light reduction of an image to be observed, and it is possible to suppress the occurrence of ghost light. Accordingly, it is possible to observe a high-quality image.

BRIEF DESCRIPTION OF DRAWINGS

FIG. 1A is a sectional view showing a virtual image display apparatus according to a first embodiment.

FIG. 1B is a rear view of a light guide device.

FIG. 2 is a diagram for describing an optical path of image light in the light guide device by using a section including an optical axis.

FIG. 3 is a partial enlarged view for describing a change of an optical path in a reflection unit.

FIG. 4 is a diagram for describing an example of manufacturing the reflection unit.

FIG. 5A is a sectional view for describing an optical system of Example 1.

FIG. 5B is a sectional views for describing an optical system of Example 1.

FIG. 6A is a diagram for describing an aberration of the optical system of Example 1.

FIG. 6B is a diagram for describing an aberration of the optical system of Example 1.

FIG. 6C is a diagram for describing an aberration of the optical system of Example 1.

FIG. 6D is a diagram for describing an aberration of the optical system of Example 1.

FIG. 6E is a diagram for describing an aberration of the optical system of Example 1.

FIG. 6F is a diagram for describing an aberration of the optical system of Example 1.

FIG. 7A is a diagram for describing the aberration of the optical system of Example 1.

FIG. 7B is a diagram for describing the aberration of the optical system of Example 1.

FIG. 7C is a diagram for describing the aberration of the optical system of Example 1.

FIG. 7D is a diagram for describing the aberration of the optical system of Example 1.

FIG. 7E is a diagram for describing the aberration of the optical system of Example 1.

FIG. 7F is a diagram for describing the aberration of the optical system of Example 1.

FIG. 8 is a sectional view for describing an optical system of Example 2.

FIG. 9A is a diagram for describing an aberration of the optical system of Example 2.

FIG. 9B is a diagram for describing an aberration of the optical system of Example 2.

FIG. 9C is a diagram for describing an aberration of the optical system of Example 2.

FIG. 9D is a diagram for describing an aberration of the optical system of Example 2.

FIG. 9E is a diagram for describing an aberration of the optical system of Example 2.

FIG. 9F is a diagram for describing an aberration of the optical system of Example 2.

FIG. 10A is a diagram for describing the aberration of the optical system of Example 2.

FIG. 10B is a diagram for describing the aberration of the optical system of Example 2.

FIG. 10C is a diagram for describing the aberration of the optical system of Example 2.

FIG. 10D is a diagram for describing the aberration of the optical system of Example 2.

FIG. 10E is a diagram for describing the aberration of the optical system of Example 2.

FIG. 10F is a diagram for describing the aberration of the optical system of Example 2.

FIG. 11 is a sectional view for describing an optical system of Example 3.

FIG. 12A is a diagram for describing an aberration of the optical system of Example 3.

FIG. 12B is a diagram for describing an aberration of the optical system of Example 3.

FIG. 12C is a diagram for describing an aberration of the optical system of Example 3.

FIG. 12D is a diagram for describing an aberration of the optical system of Example 3.

FIG. 12E is a diagram for describing an aberration of the optical system of Example 3.

FIG. 12F is a diagram for describing an aberration of the optical system of Example 3.

FIG. 13A is a diagram for describing the aberration of the optical system of Example 3.

FIG. 13B is a diagram for describing the aberration of the optical system of Example 3.

FIG. 13C is a diagram for describing the aberration of the optical system of Example 3.

FIG. 13D is a diagram for describing the aberration of the optical system of Example 3.

FIG. 13E is a diagram for describing the aberration of the optical system of Example 3.

FIG. 13F is a diagram for describing the aberration of the optical system of Example 3.

FIG. 14 is a sectional view for describing an optical system of Example 4.

FIG. 15A is a diagram for describing an aberration of the optical system of Example 4.

FIG. 15B is a diagram for describing an aberration of the optical system of Example 4.

FIG. 15C is a diagram for describing an aberration of the optical system of Example 4.

FIG. 15D is a diagram for describing an aberration of the optical system of Example 4.

FIG. 15E is a diagram for describing an aberration of the optical system of Example 4.

FIG. 15F is a diagram for describing an aberration of the optical system of Example 4.

FIG. 16A is a diagram for describing the aberration of the optical system of Example 4.

FIG. 16B is a diagram for describing the aberration of the optical system of Example 4.

FIG. 16C is a diagram for describing the aberration of the optical system of Example 4.

FIG. 16D is a diagram for describing the aberration of the optical system of Example 4.

FIG. 16E is a diagram for describing the aberration of the optical system of Example 4.

FIG. 16F is a diagram for describing the aberration of the optical system of Example 4.

FIG. 17 is a sectional view for describing an optical system of Example 5.

FIG. 18A is a diagram for describing an aberration of the optical system of Example 5.

FIG. 18B is a diagram for describing an aberration of the optical system of Example 5.

FIG. 18C is a diagram for describing an aberration of the optical system of Example 5.

FIG. 18D is a diagram for describing an aberration of the optical system of Example 5.

FIG. 18E is a diagram for describing an aberration of the optical system of Example 5.

FIG. 18F is a diagram for describing an aberration of the optical system of Example 5.

FIG. 19A is a diagram for describing the aberration of the optical system of Example 5.

FIG. 19B is a diagram for describing the aberration of the optical system of Example 5.

FIG. 19C is a diagram for describing the aberration of the optical system of Example 5.

FIG. 19D is a diagram for describing the aberration of the optical system of Example 5.

FIG. 19E is a diagram for describing the aberration of the optical system of Example 5.

FIG. 19F is a diagram for describing the aberration of the optical system of Example 5.

FIG. 20A is a sectional view showing a virtual image display apparatus according to a second embodiment.

FIG. 20B is a rear view of a light guide device.

FIG. 21 is a diagram for describing an optical path of image light in the light guide device by using a section including an optical axis.

FIG. 22 is a partial enlarged view for describing a change of an optical path in a reflection unit.

FIG. 23A is a diagram for describing an example of manufacturing the reflection unit.

FIG. 23B is a diagram for describing an example of manufacturing the reflection unit.

FIG. 24 is a sectional view for describing a modification example of an emission side of an optical path of image light.

FIG. 25A shows an arrangement modification example of the reflection unit.

FIG. 25B is a structure modification example of the reflection unit.

FIG. 26A is a sectional view for describing an optical system of Example 6.

FIG. 26B is a sectional view for describing an optical system of Example 6.

FIG. 27A is a diagram for describing an aberration of the optical system of Example 6.

FIG. 27B is a diagram for describing an aberration of the optical system of Example 6.

FIG. 27C is a diagram for describing an aberration of the optical system of Example 6.

FIG. 27D is a diagram for describing an aberration of the optical system of Example 6.

FIG. 27E is a diagram for describing an aberration of the optical system of Example 6.

FIG. 27F is a diagram for describing an aberration of the optical system of Example 6.

FIG. 28A is a diagram for describing the aberration of the optical system of Example 6.

FIG. 28B is a diagram for describing the aberration of the optical system of Example 6.

FIG. 28C is a diagram for describing the aberration of the optical system of Example 6.

FIG. 28D is a diagram for describing the aberration of the optical system of Example 6.

FIG. 28E is a diagram for describing the aberration of the optical system of Example 6.

FIG. 28F is a diagram for describing the aberration of the optical system of Example 6.

FIG. 29 is a sectional view showing a virtual image display apparatus according to a third embodiment.

FIG. 30 is a partial enlarged view for describing a change of an optical path in a reflection unit.

FIG. 31A is a diagram for describing a modification example of an incident section of a light guide device.

FIG. 31B is a diagram for describing a modification example of an incident section of a light guide device.

DESCRIPTION OF EMBODIMENTS

First Embodiment

Hereinafter, a virtual image display apparatus provided with a light guide device according to a first embodiment of the invention will be described.

1A. Structure of Light Guide Device and Virtual Image Display Apparatus

A virtual image display apparatus 100 shown in FIG. 1A is applied to a head-mounted display, and includes an image forming device 10, and a light guide device 20 which are paired. FIG. 1A corresponds to the A-A section of the light guide device 20 shown in FIG. 1B.

The virtual image display apparatus 100 causes an observer to recognize an image as a virtual image, and causes the observer to observe an external image in a see-through manner. In the virtual image display apparatus 100, the image forming device 10 and the light guide device 20 are typically provided as two pairs so as to correspond to the right eye and left eye of the observer. However, since one pair for the right eye and the other pair for the left eye are bilaterally symmetric with each other, only the pair for the left eye will be illustrated in this description, and the pair for the right eye will not be illustrated. For example, the virtual image display apparatus 100 has a general external appearance of glasses (not shown) as a whole.

The image forming device 10 includes a liquid crystal device 11 which is an image device, and a projecting lens 12 for light coupling. The liquid crystal device 11 (image device) spatially modulates illumination light from a light source 14, and forms image light rays GL which are a moving image or other targets to be displayed. The projecting lens 12 is a collimating lens that renders the image light rays GL emitted from the respective points on the liquid crystal device 11 substantially parallel light rays. The projecting lens 12 is made of glass or plastic, but is not limited to being one lens, and may be a plurality of lenses. The projecting lens 12 is not limited to a spherical lens, and may be a non-spherical lens or a free-form curved surface lens.

The light guide device 20 includes a plate-like portion. The light guide device emits, as virtual image light, the image light rays GL formed in the image forming device 10 toward an eye EY of the observer, and substantially transmits external light EL corresponding to the external image with no change. The light guide device 20 includes an incident section 21 that receives the image light rays, a parallel light guide 22 for guiding light, and an emission section 23 that outputs the image light rays. The main body of the parallel light guide 22 and the incident section 21 is an integrated body made of a resin material having high light transmission properties. In the first embodiment, the optical paths of the image light rays GL that transmit through the light guide device 20 are the same type of optical paths in which the light rays are reflected the same number of times, and are not a type in which multiple types of optical paths are combined. The parallel light guide 22 is disposed so as to tilt with respect to an optical axis AX with the eye EY of the observer as its reference, and a normal direction Z thereof tilts with respect to the optical axis AX at only an angle k. In this case, the parallel light guide 22 is disposed along the curve of the observer's face, but the normal line of the parallel light guide 22 has the gradient with respect to the optical axis AX. As stated above, when the normal line of the parallel light guide 22 tilts with respect to an x direction parallel to the optical axis AX at only the angle k, an image light ray GL0 on the optical axis AX which is emitted from a reflection unit 30 and is present therearound forms the angle k with respect to the normal line of a light emission surface OS.

The incident section 21 includes a light incident surface IS that receives the image light rays GL from the image forming device 10, and a reflection surface RS that reflects the received image light rays GL to guide the reflected light rays into the parallel light guide 22. The light incident surface IS is formed from a concave curved surface 21b so as to be close to the projecting lens 12, and the curved surface 21b has a function of totally reflecting the image light rays GL, which are reflected from the reflection surface RS, from the inner surface. The reflection surface RS is also formed from a concave curved surface 21a so as to be close to the projecting lens 12. The reflection surface RS is formed by performing film deposition such as aluminum vapor deposition on the curved surface 21a, and reflects the image light rays GL incident from the light incident surface IS to bend the optical path in a predetermined direction. The curved surface 21b totally reflects the image light rays GL, which are reflected from the reflection surface RS, from the inner surface to bend the optical path in a predetermined direction. That is, the incident section 21 securely couples the image light rays GL within the parallel light guide 22 by bending the image light rays through the reflection of the image light rays GL incident from the light incident surface IS two times.

The parallel light guide 22 is a plate portion which is parallel to a y axis and is inclined with respect to a z axis, and is also called a light guide. The parallel light guide (light guide) 22 is made of a transmissive resin material, and includes a pair of parallel planar surfaces 22a and 22b. Since both the planar surfaces 22a and 22b are the parallel-planar surfaces, the external image is not enlarged and is not out of focus. One planar surface 22a on a +z side or a Z side functions as a total reflection surface that totally reflects the image light rays from the incident section 21, and serves to guide the image light rays to the emission section 23 with less loss. The planar surface 22a on the +z side is disposed on an external side of the parallel light guide 22 to function as a first total reflection surface, and is also called an external-side surface in the present specification. The planar surface 22b on the −z side is called an observer-side surface in the present specification. The rear-side planar surface (observer-side surface) 22b extends up to one end of the emission section 23. Here, the extended planar surface of the rear-side planar surface 22b is a boundary surface IF between the parallel light guide 22 and the emission section 23 (see FIG. 2).

In the parallel light guide 22, the image light rays GL reflected from the inner surface of the reflection surface RS or the light incident surface IS of the incident section 21 incident on the planar surface 22a which is the total reflection surface, are totally reflected on the planar surface, and are guided to the internal side of the light guide device 20, that is, the +x side or X side on which the emission section 23 is provided. The parallel light guide 22 has an end surface ES as a side surface that defines the end surface of the +x side or X side of the external appearance of the light guide device 20. The parallel light guide 22 has an upper end surface TP and a lower end surface BP which are a top surface and a bottom surface for defining the end surfaces of +/−y sides.

As shown in FIG. 2, the emission section 23 is formed on the internal side (+x side) of the parallel light guide 22 in a laminar shape along the rear-side planar surface 22b or the boundary surface IF. When the image light rays GL which are totally reflected from a predetermined surface region FR on the external-side planar surface (total reflection surface) 22a of the parallel light guide 22 are transmitted, the emission section 23 reflects the incident image light rays GL at a predetermined angle, and bends the reflected image light rays toward the light emission surface OS. Here, the image light rays GL which are initially incident without being transmitted to the emission section 23 are an output target as the virtual light. That is, even though there are light rays reflected from the inner surface of the light emission surface OS in the emission section 23, the reflected light rays are not used as the image light. The emission section 23 has the reflection unit 30 configured such that a plurality of mirrors (that is, a plurality of half mirrors) having transmission properties is arranged, and a specific structure thereof will be described below with reference to FIG. 3. The reflection unit 30 is formed to extend along the observer-side planar surface 22b of the parallel light guide 22.

Since the light guide device 20 has the above configuration, the image light rays GL which are emitted from the image forming device 10 and are incident on the light guide device 20 from the light incident surface IS are bent by the incident section 21 through the reflection multiple times, are totally reflected from the predetermined surface region FR of the planar surface 22a of the parallel light guide 22, and travel substantially along the optical axis AX. The image light rays GL reflected from the predetermined surface region FR of the planar surface 22a on the +z side are incident on the incident section 23. In this case, in the xy plane, the width of the predetermined surface region FR in the longitudinal direction thereof is less than the width of the emission section 23 in the longitudinal direction thereof. That is, the incident width at which a pencil of image light rays GL are incident on the emission section 23 (or the reflection unit 30) is greater than the incident width at which the pencil of image light rays GL is incident on the predetermined surface region FR. As stated above, by setting the incident width at which the pencil of image light rays GL is incident on the predetermined surface region FR to be comparatively narrowed, the interference of the optical path does not occur, and the boundary surface IF is not used to guide the light (that is, the image light rays GL are not reflected from the boundary surface IF). Thus, it is easy to cause the image light rays GL from the predetermined surface region FR to be directly incident on the emission section 23 (or the reflection unit 30). The image light rays GL incident on the emission section 23 are output by being bent in the emission section 23 at an appropriate angle, and are ultimately emitted from the light emission surface OS. The image light rays GL emitted from the light emission surface OS are incident on the eye EY of the observer, as the virtual light. The virtual image light forms on the retina of the observer, and thus, the observer can recognize the image light rays GL due to the virtual image.

Here, the angle at which the image light rays GL used for image formation are incident on the emission section 23 is increased as the mirror becomes farther from the incident section 21 close to the light source. That is, on the internal side of the emission section 23, the image light rays GL having a large inclination with respect to the optical axis AX or the Z direction parallel to the external-side planar surface 22a are incident and are bent at a comparatively large angle. On the front side of the emission section 23, the image light rays GL having a small inclination with respect to the optical axis AX or the Z direction are incident and are bent at a comparatively small angle.

1B. Optical Path of Image Light

Hereinafter, the optical paths of the image light rays will be described in detail. As shown in FIG. 2, among the image light rays emitted from an emission surface 11a of the liquid crystal device 11, a component emitted from the central portion of the emission surface 11a indicated by a broken line is referred to as the image light ray GL0, a component emitted from the left side (−x and +z sides) on the paper in a peripheral region of the emission surface 11a indicated by a dashed dotted line in this drawing is referred to as an image light ray GL1, and a component emitted from the right side (+x and −z sides) on the paper in the peripheral region of the emission surface 11a indicated by a dashed double-dotted line in this drawing is referred to as an image light ray GL2. It is assumed that the optical path of the image light ray GL0 extends along the optical axis AX.

The primary components of the respective image light rays GL0, GL1 and GL2 that transmit through the projecting lens 12 are respectively incident from the light incident surface IS of the light guide device 20, transmit through the inside of the parallel light guide 22 via the incident section 21, and reach the emission section 23.

Specifically, among the image light rays GL0, GL1 and GL2, the image light ray GL0 emitted from the central portion of the emission surface 11a is bent by the incident section 21, and is then coupled within the parallel light guide 22. Subsequently, the image light ray GL0 is incident on the predetermined surface region FR of the one planar surface 22a at a standard reflection angle $\theta_0$, is totally reflected, transmits through the boundary surface IF between the parallel light guide 22 and the emission section 23 (or the reflection unit 30) without being reflected, and is directly incident on the central portion 23k of the emission section 23. The image light ray GL0 is reflected from the portion 23k at a predetermined angle, and is emitted in the optical axis AX direction (the angle k direction with respect to the Z direction) which tilts with respect to the XY plane including the light emission surface OS from the light emission surface OS, as a parallel pencil.

The image light ray GL1 emitted from one end side (−x side) of the emission surface 11a is bent by the incident section 21, and is coupled within the parallel light guide 22. Subsequently, the image light ray GL1 is incident on the predetermined surface region FR of the one planar surface 22a at a maximum reflection angle $\theta_1$, and is totally reflected. Thereafter, the image light ray GL1 transmits through the boundary surface IF between the parallel light guide 22 and the emission section 23 (or the reflection unit 30) without being reflected, is reflected from an internal-side (+x side) portion 23h of the emission section 23 at a predetermined angle, and is emitted from the light emission surface OS in a predetermined angle direction, as a parallel pencil. In this case, an emission angle $\gamma_1$ is formed such that the amount of image light ray GL1 returned to the incident section 21 becomes relatively greater.

Meanwhile, the image light ray GL2 emitted from the other end side (+x side) of the emission surface 11a is bent by the incident section 21, and is coupled within the parallel light guide 22. The image light ray GL2 is incident on the predetermined surface region FR of the one planar surface 22a at a minimum reflection angle $\theta_2$, and is totally reflected. The image light ray GL2 transmits through the boundary surface IF between the parallel light guide 22 and the emission section 23 (or the reflection unit 30) without being reflected, is reflected from an inlet-side (−x side) portion 23m of the emission section 23 at a predetermined angle, and is emitted from the light emission surface OS in a predetermined angle direction, as a parallel pencil. In this case, an emission angle $\gamma_2$ is formed such that the amount of image light ray GL2 returned to the incident section 21 becomes relatively smaller.

It has been described that the image light rays GL0, GL1 and GL2 are representatively some of all of the image light rays GL. However, similarly to the image light ray GL0, since light ray components constituting other image light rays GL are guided and are emitted from the light emission surface OS, these light ray components will not be illustrated or described.

Here, as an example of the refractive index n of a transparent resin material used for the incident section 21 and the parallel light guide 22, when n=1.4, the value of a critical angle $\theta_c$ thereof is $\theta_c$ = 45.6°. By setting a reflection angle $\theta_2$ which is the minimum of reflection angles $\theta_0$, $\theta_1$ and $\theta_2$ of the respective image light rays GL0, GL1 and GL2 to be greater than the critical angle $\theta_c$, it is possible to satisfy a total reflection condition of necessary image light on the planar surface 22a within the parallel light guide 22.

The image light ray GL0 heading for the central portion is incident on the portion 23k of the emission section 23 at an elevation angle $\varphi_0$ (=90°−$\theta_0$), the image light ray GL1 for the peripheral region is incident on the portion 23h of the emission section 23 at an elevation angle $\varphi_1$ (=90°−$\theta_1$), and the image light ray GL2 for the peripheral region is incident on the portion 23m of the emission section 23 at an elevation angle $\varphi_2$ (=90°−$\theta_2$). Here, the relationship of $\varphi_2 > \varphi_0 > \varphi_1$ is satisfied between the elevation angles $\varphi_0$, $\varphi_1$ and $\varphi_2$ by reflecting the magnitude relationship between the reflection angles $\theta_0$, $\theta_1$ and $\theta_2$. That is, an incident angle $\varphi_1$. (see FIG. 3) on the half mirror 31 of the reflection unit 30 is gradually decreased in the order of the portion 23m corresponding to the elevation angle $\varphi_2$, the portion 23k corresponding to the elevation angle $\varphi_0$ and the portion 23h corresponding to the elevation angle $\varphi_1$. In other words, the incident angle $\tau$ on the half mirror 31 or the reflection angle from the half mirror 31 is decreased as the mirror becomes farther from the incident section 21.

The entire movement of the pencil of image light rays GL which are reflected from the external-side planar surface 22a of the parallel light guide 22 and head for the emission section 23 will be described. The width of the pencil of image light rays GL is narrowed at any one of front and rear straight optical paths P1 and P2 reflected from the predetermined surface region FR on the external side of the parallel light guide 22 on a section including the optical axis AX. Specifically, the width of the pencil of image light rays GL is narrowed as a whole in a position across both the straight optical paths P1 and P2 near the predetermined surface region FR, that is, near the boundary between the straight optical paths P1 and P2 on the section including the optical axis AX, and thus, a beam width is narrowed. Accordingly, the pencil of image light rays GL is narrowed in front of the emission section 23, and thus, it is easy to comparatively widen a lateral view angle.

Although it has been described in the illustrated example that the width of the pencil of image light rays GL is narrowed at the position across both the straight optical paths P1 and P2 and the beam width is narrowed, the width of only one of the straight optical paths P1 and P2 may be narrowed, and the beam width may be narrowed.

1C. Structure of Emission Section and Bending of Optical Path Due to Emission Section Hereinafter, the structure of the emission section 23 and the bending of the optical paths of the image light rays due to the emission section 23 will be described in detail with reference to FIGS. 2 and 3. Similarly to the parallel light guide 22, the emission section 23 extends along the XY plane which tilts with respect to the optical axis AX by the angle k.

Initially, the structure of the emission section 23 will be described. The emission section 23 has the reflection unit 30 configured such that the plurality of half mirrors 31 that respectively reflects the image light rays GL is arranged. The reflection unit 30 is a rectangular plate-like member, and has a structure in which a plurality of narrow band-shaped half mirrors 31 is embedded in a stripe pattern. That is, the reflection unit 30 is configured such that a plurality of elongated half mirrors 31 extending in a y direction or a Y direction is arranged in a direction in which the parallel light guide 22 extends, that is, in the X direction, at a predetermined pitch PT. More specifically, the half mirrors 31 extend in a straight line with the vertical y direction or Y direction, among directions which are parallel to the planar surfaces 22a and 22b of the parallel light guide 22 shown in FIG. 2 and are perpendicular to the X direction in which the half mirrors 31 are arranged, as the longitudinal direction. The half mirrors 31 are inclined to the incident section 21 toward the external side of the parallel light guide 22 rather than the observer. More specifically, the half mirrors 31 are inclined such that upper ends (+Z side) rotate in a counterclockwise direction by using the longitudinal direction (Y direction) as its axis and the YZ plane orthogonal to the planar surfaces 22a and 22b as its reference. That is, the respective mirrors 31 extend in a direction between a −X direction and a +Z direction when viewed on an XZ section. All the half mirrors 31 are minutely arranged in parallel with each other.

The reflection unit 30 has a structure in which a plurality of block members 32 is bonded, and the half mirror 31 has a thin-film shape interposed between a pair of neighboring block members 32. Here, although it has been described that the refractive index of the block member 32 is equal to the refractive index of the parallel light guide 22, the refractive indices thereof may be different from each other. When the refractive indices thereof are different, it is necessary to adjust or correct an angle δ at which the half mirrors 31 are inclined. In order to easily observe the external light EL in the see-through manner, the reflectance of the half mirrors 31 with respect to the image light rays GL is set in a range of 10% to 50% in an assumed incident angle range of the image light rays GL. The reflectance of the half mirrors 31 which are a specific example with respect to the image light rays GL is set to be, for example, 20%, and the transmittance of the half mirrors with respect to the image light rays GL is set to be, for example, 80%.

An example of a method of manufacturing the reflection unit 30 will be described with reference to FIG. 4. A plurality of glass plates 91 which is parallel plates made of glass is previously prepared, and a plurality of element plates 90 is prepared by forming a reflection film 92 which is a metal reflection film or a dielectric multilayer film on one surface thereof. Thereafter, the plurality of formed element plates 90 is layered while being bonded with an adhesive, and the layered element plates are obliquely cut along cutting lines C1 and C2 as a whole. Thus, it is possible to obtain the reflection unit 30 having a structure in which the half mirrors 31 formed using the metal reflection film or the dielectric multilayer film are interposed between the block members 32 which are elongated prism pieces obtained by obliquely dividing the parallel plate. The reflection unit 30 is fixed by adhering to a proper place of the parallel light guide 22 close to the observer through an adhesive and hardening the adhesive.

The pitch PT of the half mirrors 31 in the reflection unit 30 is set to be about 0.5 mm to 2.0 mm. By arranging the plurality of half mirrors 31 at such a pitch, an effect of suppressing color shift due to a difference between interference methods of the image light rays when the pitch of the half mirrors 31 is narrowed or an effect of suppressing the occurrence of black lines due to a difference in light transmission amount when the pitch of the half mirrors 31 is widened is exhibited.

When the reflection unit 30 shown in FIG. 3 is used, it has been described that the pitch of the half mirrors 31 is slightly widened and a part of the external light EL is directly transmitted, but it may be possible to prevent the external light EL from being directly transmitted by appropriately adjusting the pitch of the half mirrors 31.

The pitch PT of the half mirrors 31 is not an equal interval but a variable pitch. More specifically, the pitch PT of the half mirrors 31 in the reflection unit 30 is a random pitch that is randomly increased or decreased by using a reference interval as its center. As stated above, by arranging the half mirrors 31 in the reflection unit 30 at the random pitch, it is possible to securely suppress the occurrence of diffraction non-uniformity or moire. The pitch is not limited to the random pitch, and for example, a predetermined pitch pattern including a pitch that is increased or decreased at multiple stages may be repeated.

Here, the thickness of the reflection unit 30, that is, a thickness TI of the half mirror 31 in the Z-axis direction is set to be about 0.7 mm to 3.0 mm. The thickness of the parallel light guide 22 that supports the reflection unit 30 is set to be, for example, about several mm to 10 mm, preferably, about 4 mm to 6 mm. When the thickness of the parallel light guide 22 is sufficiently greater than the thickness of the reflection unit 30, the incident angles of the image light rays GL on the reflection unit 30 or the boundary surface IF are easily decreased, and it is easy to suppress the reflection from the half mirrors 31 positioned in a position where the image light rays GL are not received by the eye EY. Meanwhile, when the thickness of the parallel light guide 22 is comparatively thin, it is easy to achieve the weight reduction of the parallel light guide 22 and the light guide device 20.

In the example shown in FIGS. 2 and 3, all the half mirrors 31 can form an inclination angle δ of, for example, about 48° to 70° in a clockwise direction by using the observer-side surface 22b of the parallel light guide 22 as its reference, specifically, an inclination angle δ of 60° is formed. Here, it is assumed that the elevation angle $\varphi_0$ of the image light ray GL0 is set to be, for example, 30°, the elevation angle $\varphi_1$ of the image light ray GL1 is set to be, for example, 22°, and the elevation angle $\varphi_2$ of the image light ray GL2 is set to be, for example, 38°. In this case, the image light ray GL1 and the image light ray GL2 are incident on the eye EY of the observer while forming the angle $\gamma_1 = \gamma_2 = 12.5°$ by using the optical axis AX as its reference.

Thus, among the image light rays GL, the component (image light ray GL1) of which the total reflection angle is comparatively large is primarily incident on the portion 23h of the reflection unit 30 on the −x side, and the component (image light ray GL2) of which the total reflection angle is comparatively small is primarily incident on the portion 23m of the emission section 23 on the +x side. In so doing, it is possible to efficiently output the image light rays GL in the angle state capable of being collected in the eye EY of the observer as a whole. Since the image light rays GL are output with such an angle relationship, the light guide device 20 can cause the image light rays GL to pass through the reflection unit 30 only once without basically causing the image light rays to pass through the reflection unit multiple times, and can output the image light rays GL as the virtual image light with less loss.

In the portions 23k and 23h on the central side or the internal side of the reflection unit 30, a very small part of the image light rays GL is transmitted through the half mirrors 31 multiple times (specifically, passing including the reflection once and the transmission one or more times). In this case, the number of times of the image light rays passing through the half mirrors 31 is multiple times. However, since the reflection light rays from the plurality of half mirrors 31 are respectively incident on the eye EY of the observer, as the image light rays GL, the loss of the light amount is not large.

In the portions 23k and 23h on the central side or internal side of the reflection unit 30, the components of the image light rays GL which are reflected from the rear side or the observer side (that is, the light emission surface OS or the boundary surface IF and the like) of the parallel light guide 22 are also likely to be generated. However, the image light rays GL are guided to the outside of the optical paths, as non-use light rays GX (see FIG. 3) reflected from the half mirrors 31, and are prevented from being incident on the eye EY of the observer. The non-use light rays that pass through the half mirrors 31 are likely to be re-incident on the external-side planar surface 22a. However, when the non-use light rays are totally reflected from the external-side planar surface, most non-use light rays can be incident on the internal-side portion 23h of the reflection unit 30 or a region which is a further inner side than the internal-side portion and is outside of an effective region, and are less likely to be incident on the eye EY.

1D. Conclusion of First Embodiment

According to the light guide device 20 of the first embodiment described above, since the light guide device is set such that the image light rays GL incident on the reflection unit 30 are reflected and are headed for the observer without reflecting the image light rays GL from the boundary surface IF between the parallel light guide 22 and the reflection unit 30, the image light rays GL only pass through the half mirrors 31 in the position where the image light rays are output from the reflection unit 30 of the emission section 23 or near this position without being reflected from the boundary surface IF. Thus, by reducing the number of times of the image light rays GL to be observed passing through the half mirrors 31, it is possible to prevent luminance non-uniformity or light reduction.

From the other perspective, in the light guide device 20 according to the present embodiment, the reflection unit 30 has a thickness which is equal to or less than about half of the parallel light guide 22 in the optical path AX direction, the half mirrors 31 constituting the reflection unit 30 are inclined so as to be close to the incident section 21 on the external side of the parallel light guide 22 further from the observer, and a portion of the reflection unit 30 close to at least the incident section 21 is disposed on the portion of the parallel light guide 22 close to the observer. Thus, the inclinations of the image light rays GL to be observed with respect to the optical axis AX are comparatively increased on the internal side separated from the incident section 21 of the reflection unit 30, and it is easy to cause the image light rays GL from the incident section 21 to be directly incident on a target place of the reflection unit 30. That is, by reducing the number of times of the image light rays GL to be observed passing through the half mirrors 31, it is possible to prevent luminance non-uniformity or light reduction, and it is possible to suppress the occurrence of ghost light.

Although it has been described in the aforementioned first embodiment that the parallel light guide 22 is inclined with respect to the xy plane perpendicular to the optical axis AX passing through the eye, it is possible to cause the parallel light guide 22 to be parallel to the xy plane.

It has been described that the incident section 21 includes the curved surfaces 21a and 21b, but one or both of the curved surfaces may be a planar surface. In this case, a portion corresponding to the curved surface 21b may be formed as a planar surface formed by extending the planar surface 22b of the parallel light guide 22.

In the incident section 21, the image light rays GL incident from the light incident surface IS may be coupled to the parallel light guide 22 with no change without being reflected from the inner surface.

The parallel light guide 22 is not limited to a complete parallel plate, but may have a slight curve or wedge angle. That is, the planar surfaces 22a and 22b of the parallel light guide 22 may be an aspherical surface or other curved surfaces, or the planar surfaces may form a tilt angle. When the planar surfaces 22a and 22b are curved, since a change in magnification or visibility occurs, the planar surfaces are preferably less curved. When the planar surfaces 22a and 22b form the tilt angle, since chromatic dispersion occurs, the planar surfaces preferably form a small tilt angle.

1E. Examples of First Embodiment

Hereinafter, examples of an optical system included in the virtual image display apparatus according to the embodiment will be described. Signs used in the respective examples are described below.

STOP: stop surface corresponding to eye
PLANE: plane in front of eye or image surface
IMAGE: image surface
MA: mirror array
PSi: planar surface (i=surface number of the same type of surface)
FFSj: free-form curved surface (j=surface number of the same type of surface)
ASPk: spherical surface or planar surface (k=surface number of the same type of surface)
R: radius of curvature
T: axial surface distance
Nd: refractive index of optical material for d line
Vd: Abbe number of optical material in relation to d line
TLY: tilt angle (°) of optical axis on cross section (XZ section) of specific surface
(TLY is changed in front and back of specific surface in some cases)
DCX: optical deviation amount on cross section (XZ section) of specific surface in X-axis direction The following specifications are commonly used in all the examples.

Angle of view of virtual image: 25 degrees*9.6 degrees, corresponding to 50-inch monitor in 2.5 m ahead
Display device: 9.6 mm*5.4 mm (0.43-inch panel)
Focal distance: 21.7 mm
Incident pupil diameter: φ5 mm Example 1

Data of optical surfaces of Example 1 is represented in Table 1. For example, signs PS1 and FFS2 denote the planar surfaces 22a and 22b of the parallel light guide 22, and signs FFS1 and FFS2 denote the reflection surface RS and the light incident surface IS of the incident section 21. Signs ASP1 to ASP6 denote lens surfaces of the projecting lens 12.

TABLE 1

| No | Name | T | Nd | Vd |
|---|---|---|---|---|
| 1 | STOP | 20.00 | | |
| 2 | PLANE | 0.50 | 1.517 | 64.17 |
| 3 | MA | −0.50 | 1.517 | 64.17 |
| 4 | PS1 | −5.00 | 1.525 | 55.95 |
| 5 | PS2 | 14.00 | 1.525 | 55.95 |
| 6 | FFS1 | −7.00 | 1.525 | 55.95 |
| 7 | FFS2 | 7.00 | 1.525 | 55.95 |
| 8 | FFS1 | 7.00 | | |
| 9 | ASP1 | 12.00 | 1.525 | 55.95 |
| 10 | ASP2 | 1.50 | | |
| 11 | ASP3 | 1.00 | 1.585 | 29.90 |
| 12 | ASP4 | 2.00 | | |
| 13 | ASP5 | 6.00 | 1.525 | 55.95 |
| 14 | ASP6 | 5.60 | | |
| 15 | PLANE | 1.10 | 1.458 | 67.82 |
| 16 | IMAGE | | | |

As for the optical surfaces of the prism of Example 1, an optical axis deviation amount (decenter) DCX and an optical axis tilt angle (tilt) TLY on the cross section thereof are represented in Table 2.

TABLE 2

| No | Name | TLY (front) | DCX (back) | TLY (back) |
|---|---|---|---|---|
| 2 | PLANE | 15.00 | 0.0 | 0.00 |
| 5 | PS2 | 0.00 | 11.8 | 65.08 |
| 6 | FFS1 | −54.00 | 0.0 | −54.00 |
| 7 | FFS2 | 36.48 | 0.0 | −36.48 |
| 8 | FFS1 | 54.00 | 7.0 | 32.38 |

A coefficient $Ak_{m,n}$ obtained by performing polynomial expansion on the free-form curved surface of the optical surfaces of Example 1 is represented in Table 3. In Table 3, symbols m and n refer to variables or degrees in the coefficient $Ak_{m,n}$. Here, the coefficient $Ak_{m,n}$ refers to a coefficient of each term $X^m*Y^n$ constituting the polynomial representing a k-th surface which is a target. That is, the k-th surface is expressed as $Z=\Sigma\{Ak_{m,n}*(X^m*Y^n)\}$.

TABLE 3

| m | n | FFS1 | FFS2 |
|---|---|---|---|
| 2 | 0 | 4.025E−03 | 6.215E−03 |
| 0 | 2 | 6.136E−03 | 6.836E−03 |
| 3 | 0 | 2.529E−05 | 6.218E−05 |
| 1 | 2 | 1.150E−05 | 2.657E−05 |
| 4 | 0 | 2.362E−06 | 3.504E−06 |
| 2 | 2 | 1.238E−06 | 2.624E−06 |

TABLE 3-continued

| m | n | FFS1 | FFS2 |
|---|---|---|---|
| 0 | 4 | 4.822E−06 | 4.171E−06 |
| 5 | 0 | 0.000E+00 | 5.012E−08 |
| 3 | 2 | 0.000E+00 | −5.990E−08 |
| 1 | 4 | 0.000E+00 | 4.723E−08 |
| 6 | 0 | 0.000E+00 | 7.769E−09 |
| 4 | 2 | 0.000E+00 | −2.522E−09 |
| 2 | 4 | 0.000E+00 | −6.814E−09 |
| 0 | 6 | 0.000E+00 | −4.870E−09 |

As for the aspherical surface of the optical surfaces of Example 1, a coefficient Bi (i=2, 4, 6, . . . ) obtained by performing polynomial expansion on the sectional shape thereof is represented in Table 4. That is, the aspherical surface is expressed as $Z=\Sigma Bi*r^i$ by using $r^2=X^2+Y^2$.

TABLE 4

| | ASP1 | ASP2 | ASP3 |
|---|---|---|---|
| B2 | 4.088E−02 | −2.844E−02 | −5.546E−02 |
| B4 | 4.789E−05 | 7.964E−05 | 3.746E−04 |
| B6 | 1.379E−07 | 7.442E−08 | −1.359E−06 |
| B8 | 6.850E−10 | −7.115E−10 | 2.222E−09 |

| | ASP4 | ASP5 | ASP6 |
|---|---|---|---|
| B2 | 4.503E−02 | 6.674E−02 | −1.370E−02 |
| B4 | −2.053E−04 | −3.603E−06 | 1.003E−03 |
| B6 | 1.234E−06 | −2.773E−06 | −1.894E−05 |
| B8 | 5.199E−08 | 2.982E−09 | 1.120E−07 |

FIG. 5A is a sectional view of a light guide device 20 and a projecting lens 12 of Example 1. The light guide device 20 includes first and second surfaces S1 and S2 as the pair of planar surfaces 22a and 22b of the parallel light guide 22. The planar surface 22a or the first surface S1 corresponds to the light emission surface OS. The light guide device 20 includes a third surface S3 which is a free-form curved surface and has a comparatively small negative refractive force on a section, a fourth surface S4 which is a free-form curved surface and has a comparatively small positive refractive force on a section, and a fifth surface S5 which is a transmission surface common to the third surface S3, in the incident section 21. Here, the fifth surface S5 corresponds to the light incident surface IS. As in the present example, by forming the free-form curved surfaces in the incident section 21, it is possible to reduce a burden of the projecting lens, and, as a result, it is possible to thinly form the optical system.

In order to prevent chromatic dispersion due to a wavelength on the incident and emission refraction surfaces, the optical axis AX of the incident section 21 and the optical axis AX of the emission section 23 tilt in the same direction in which the chromatic dispersion is cancelled.

The projecting lens 12 includes three lenses L1, L2 and L3. Both optical surfaces of these lenses L1, L2 and L3 are aspherical surfaces.

FIG. 5B specifically shows local coordinates of the first to fifth surfaces S1 to S5 constituting the light guide device 20.

FIGS. 6A to 6F and FIGS. 7A to 7F show an aberration of Example 1. In the respective aberration diagrams, a horizontal axis represents a position in the pupil, and a vertical axis represents an aberration amount. Specifically, FIGS. 6A and 6B represent aberrations in the Y and X directions at an azimuth of −12.48° in the X direction and 0.0° in the Y direction on a micron scale. FIGS. 6C and 6D represent aberrations in the Y and X directions at an azimuth of 0.0° in the X direction and 0.0° in the Y direction. FIGS. 6E and 6F represent aberrations in the Y and X directions at an azimuth of 12.48° in the X direction and 0.0° in the Y direction. FIGS. 7A and 7B represent aberrations in the Y and X directions at an azimuth of 12.48° in the X direction and 7.1° in the Y direction. FIGS. 7C and 7D represent aberrations in the Y and X directions at an azimuth of 0.0° in the X direction and 7.10° in the Y direction. FIGS. 7E and 7F represent aberrations in the Y and X directions at an azimuth of 12.48° in the X direction and 7.1° in the Y direction. The illustrated aberration amount is an aberration amount on the image surface of the image display device when the light rays are moved backward for the sake of convenience.

Example 2

Data of optical surfaces of Example 2 is represented in Table 5.

TABLE 5

| No | Name | T | Nd | Vd |
|----|------|------|-------|-------|
| 1  | STOP | 20.00 |       |       |
| 2  | PS1  | 0.50  | 1.525 | 55.95 |
| 3  | MA   | −4.50 | 1.525 | 55.95 |
| 4  | PS2  | 5.00  | 1.525 | 55.95 |
| 5  | PS1  | −12.00| 1.525 | 55.95 |
| 6  | PS3  | 12.00 | 1.525 | 55.95 |
| 7  | PS1  | 3.00  |       |       |
| 8  | ASP1 | 10.00 | 1.525 | 55.95 |
| 9  | ASP2 | 1.00  |       |       |
| 10 | ASP3 | 1.00  | 1.585 | 29.90 |
| 11 | ASP4 | 2.00  |       |       |
| 12 | ASP5 | 8.00  | 1.525 | 55.95 |
| 13 | ASP6 | 8.74  |       |       |
| 14 | PLANE| 1.10  | 1.458 | 67.82 |
| 15 | IMAGE|       |       |       |

As for the optical surfaces of the prism of Example 2, an optical axis deviation amount DCX and an optical axis tilt angle TLY on the cross section thereof are represented in Table 6.

TABLE 6

| No | Name | TLY (front) | DCX (back) | TLY (back) |
|----|------|-------------|------------|------------|
| 6  | PS3  | 32.00       | 0.0        | −32.00     |

As for the aspherical surface of the optical surfaces of Example 2, a coefficient Bi (i=2, 4, 6, . . . ) obtained by performing polynomial expansion on the sectional shape thereof is represented in Table 7.

TABLE 7

|    | ASP1      | ASP2       | ASP3       |
|----|-----------|------------|------------|
| B2 | 4.261E−02 | −9.425E−03 | 6.069E−03  |
| B4 | −4.971E−05| −2.179E−04 | −4.037E−04 |
| B6 | 4.023E−07 | 1.745E−06  | 4.321E−06  |
| B8 | −4.222E−09| −5.872E−09 | −1.277E−08 |

|    | ASP4      | ASP5       | ASP6       |
|----|-----------|------------|------------|
| B2 | 9.219E−02 | 7.256E−02  | −1.695E−02 |
| B4 | −7.190E−04| −3.935E−04 | 6.896E−06  |
| B6 | 9.852E−06 | 3.653E−06  | 4.050E−07  |
| B8 | −4.414E−08| −1.601E−08 | −6.515E−09 |

FIG. 8 is a sectional view of a light guide device 20 and a projecting lens 12 of Example 2. The light guide device 20 includes first and second surfaces S1 and S2 as the pair of planar surfaces 22a and 22b of the parallel light guide 22. The planar surface 22a or the first surface S1 corresponds to the light emission surface OS. The light guide device 20 includes a third surface S3 which is a planar surface, a fourth surface S4 which is a planar surface, and a fifth surface S5 which is a transmission surface common to the third surface S3, in the incident section 21. Here, the fifth surface S5 corresponds to the light incident surface IS.

In Example 2, the optical axis AX of the incident section 21 and the optical axis AX of the emission section 23 are parallel.

The projecting lens 12 includes three lenses L1, L2 and L3. Both optical surfaces of these lenses L1, L2 and L3 are aspherical surfaces.

FIGS. 9A to 9F and FIGS. 10A to 10F show an aberration of Example 2. In the respective aberration diagrams, a horizontal axis represents a position in the pupil, and a vertical axis represents an aberration amount. Specifically, FIGS. 9A and 9B represent aberrations in the Y and X directions at an azimuth of −12.48° in the X direction and 0.0° in the Y direction on a micron scale. FIGS. 9C and 9D represent aberrations in the Y and X directions at an azimuth of 0.0° in the X direction and 0.0° in the Y direction. FIGS. 9E and 9F represent aberrations in the Y and X directions at an azimuth of 12.48° in the X direction and 0.0° in the Y direction. FIGS. 10A and 10B represent aberrations in the Y and X directions at an azimuth of 12.48° in the X direction and 7.1° in the Y direction. FIGS. 10C and 10D represent aberrations in the Y and X directions at an azimuth of 0.0° in the X direction and 7.10° in the Y direction. FIGS. 10E and 10F represent aberrations in the Y and X directions at an azimuth of 12.48° in the X direction and 7.1° in the Y direction. The illustrated aberration amount is an aberration amount on the image surface of the image display device when the light rays are moved backward for the sake of convenience.

Example 3

Data of optical surfaces of Example 3 is represented in Table 8.

TABLE 8

| No | Name | T | Nd | Vd |
|----|------|-------|-------|-------|
| 1  | STOP | 20.00 |       |       |
| 2  | PS   | 0.50  | 1.517 | 64.17 |
| 3  | MA   | −0.50 | 1.517 | 64.17 |
| 4  | PS1  | −5.00 | 1.525 | 55.95 |
| 5  | PS2  | 5.00  | 1.525 | 55.95 |
| 6  | PS1  | −10.00| 1.525 | 55.95 |
| 7  | PS3  | 10.00 | 1.525 | 55.95 |
| 8  | PS1  | 4.00  |       |       |
| 9  | ASP1 | 12.00 | 1.525 | 55.95 |
| 10 | ASP2 | 0.50  |       |       |
| 11 | ASP3 | 1.00  | 1.585 | 29.90 |
| 12 | ASP4 | 2.00  |       |       |
| 13 | ASP5 | 11.00 | 1.525 | 55.95 |
| 14 | ASP6 | 6.44  |       |       |
| 15 | PLANE| 1.10  | 1.458 | 67.82 |
| 16 | IMAGE|       |       |       |

As for the optical surfaces of the prism of Example 3, an optical axis deviation amount DCX and an optical axis tilt angle TLY on the cross section thereof are represented in Table 9.

TABLE 9

| No | Name | TLY (front) | DCX (back) | TLY (back) |
|----|------|-------------|------------|------------|
| 7  | PS3  | 25.00       | 0.0        | −25.00     |
| 8  | PS1  | 0.00        | −22.8      | 23.56      |

As for the aspherical surface of the optical surfaces of Example 3, a coefficient Bi (i=2, 4, 6, ...) obtained by performing polynomial expansion on the sectional shape thereof is represented in Table 10.

TABLE 10

|    | ASP1       | ASP2       | ASP3       |
|----|------------|------------|------------|
| B2 | 3.396E−02  | −4.156E−02 | 1.916E−02  |
| B4 | −1.679E−04 | 5.338E−05  | −6.739E−04 |
| B6 | 1.566E−06  | 1.826E−06  | 9.440E−06  |
| B8 | −3.074E−09 | −9.729E−09 | −7.057E−08 |

|    | ASP4       | ASP5       | ASP6       |
|----|------------|------------|------------|
| B2 | 1.215E−01  | 6.757E−02  | −1.951E−02 |
| B4 | −9.379E−04 | −4.438E−04 | −4.454E−04 |
| B6 | 6.844E−06  | 5.699E−06  | 5.299E−06  |
| B8 | −3.857E−08 | −2.672E−08 | −1.411E−08 |

FIG. 11 is a sectional view of a light guide device 20 and a projecting lens 12 of Example 3. The light guide device 20 includes first and second surfaces S1 and S2 as the pair of planar surfaces 22a and 22b of the parallel light guide 22. The planar surface 22a or the first surface S1 corresponds to the light emission surface OS. The light guide device 20 includes a third surface S3 which is a planar surface, a fourth surface S4 which is a planar surface, and a fifth surface S5 which is a transmission surface common to the third surface S3, in the incident section 21. Here, the fifth surface S5 corresponds to the light incident surface IS.

The projecting lens 12 includes three lenses L1, L2 and L3. Both optical surfaces of these lenses L1, L2 and L3 are aspherical surfaces.

In order to prevent chromatic dispersion due to a wavelength on the incident and emission refraction surfaces, the optical axis AX of the incident section 21 and the optical axis AX of the emission section 23 tilt in the same direction in which the chromatic dispersion is cancelled.

FIGS. 12A to 12F and FIGS. 13A to 13F show an aberration of Example 3. In the respective aberration diagrams, a horizontal axis represents a position in the pupil, and a vertical axis represents an aberration amount. Specifically, FIGS. 12A and 12B represent aberrations in the Y and X directions at an azimuth of −12.48° in the X direction and 0.0° in the Y direction on a micron scale. FIGS. 12C and 12D represent aberrations in the Y and X directions at an azimuth of 0.0° in the X direction and 0.0° in the Y direction. FIGS. 12E and 12F represent aberrations in the Y and X directions at an azimuth of 12.48° in the X direction and 0.0° in the Y direction. FIGS. 13A and 13B represent aberrations in the Y and X directions at an azimuth of 12.48° in the X direction and 7.1° in the Y direction. FIGS. 13C and 13D represent aberrations in the Y and X directions at an azimuth of 0.0° in the X direction and 7.10° in the Y direction. FIGS. 13E and 13F represent aberrations in the Y and X directions at an azimuth of 12.48° in the X direction and 7.1° in the Y direction. The illustrated aberration amount is an aberration amount on the image surface of the image display device when the light rays are moved backward for the sake of convenience.

Example 4

Data of optical surfaces of Example 4 is represented in Table 11.

TABLE 11

| No | Name  | T      | Nd    | Vd    |
|----|-------|--------|-------|-------|
| 1  | STOP  | 20.00  |       |       |
| 2  | PLANE | 0.50   | 1.517 | 64.17 |
| 3  | MA    | −0.50  | 1.517 | 64.17 |
| 4  | PS1   | −5.00  | 1.525 | 55.95 |
| 5  | PS2   | 5.00   | 1.525 | 55.95 |
| 6  | PS1   | −11.00 | 1.525 | 55.95 |
| 7  | FFS1  | 11.00  | 1.525 | 55.95 |
| 8  | PS1   | 6.00   |       |       |
| 9  | FFS2  | 11.00  | 1.525 | 55.95 |
| 10 | FFS3  | 4.00   |       |       |
| 11 | FFS4  | 1.00   | 1.585 | 29.90 |
| 12 | FFS5  | 0.70   |       |       |
| 13 | FFS6  | 10.00  | 1.525 | 55.95 |
| 14 | FFS7  | 8.66   |       |       |
| 15 | PLANE | 1.10   | 1.458 | 67.82 |
| 16 | IMAGE |        |       |       |

As for the optical surfaces of the prism of Example 4, an optical axis deviation amount DCX and an optical axis tilt angle TLY on the cross section thereof are represented in Table 12.

TABLE 12

| No | Name  | TLY (front) | DCX (back) | TLY (back) |
|----|-------|-------------|------------|------------|
| 2  | PLANE | 15.00       | 0.0        | 0.00       |
| 6  | PS3   | 20.18       | 0.0        | −20.18     |
| 8  | PS1   | 0.00        | −22.8      | 23.56      |

A coefficient $Ak_{m,n}$ obtained by performing polynomial expansion on the free-form curved surface of the optical surfaces of Example 4 is represented in Table 13.

TABLE 13

| m | n | FFS1       | FFS2       | FFS3       | FFS4       |
|---|---|------------|------------|------------|------------|
| 2 | 0 | −1.001E−03 | 3.217E−02  | −5.088E−02 | −8.121E−02 |
| 0 | 2 | 4.459E−04  | 2.334E−02  | −4.626E−02 | −8.824E−02 |
| 3 | 0 | −6.021E−06 | −7.535E−04 | −2.173E−03 | −1.818E−03 |
| 1 | 2 | −2.438E−05 | 7.471E−05  | −1.249E−04 | 8.272E−04  |
| 4 | 0 | 5.245E−06  | 1.536E−05  | 4.219E−04  | 5.982E−04  |
| 2 | 2 | −3.484E−06 | 1.888E−04  | 6.465E−04  | 8.631E−04  |
| 0 | 4 | −1.471E−06 | 2.049E−05  | 2.157E−04  | 2.312E−04  |
| 5 | 0 | −3.135E−07 | 4.773E−06  | 1.213E−05  | 1.253E−05  |
| 3 | 2 | −3.589E−07 | 9.190E−06  | 1.529E−05  | −3.229E−06 |
| 1 | 4 | 2.209E−08  | −5.002E−06 | −7.891E−06 | −4.664E−06 |
| 6 | 0 | −2.665E−08 | −5.258E−07 | −1.878E−06 | −1.909E−06 |
| 4 | 2 | −3.263E−08 | −2.465E−09 | −2.628E−06 | −3.451E−06 |
| 2 | 4 | 4.590E−08  | −4.226E−07 | −2.623E−06 | −2.557E−06 |
| 0 | 6 | 2.520E−08  | 2.158E−07  | −3.016E−07 | −1.037E−07 |

| m | n | FFS5       | FFS6       | FFS7       |
|---|---|------------|------------|------------|
| 2 | 0 | 5.047E−02  | 5.947E−02  | −6.516E−02 |
| 0 | 2 | 3.508E−02  | 4.575E−02  | −7.168E−02 |
| 3 | 0 | 1.568E−05  | 3.386E−04  | −1.884E−04 |
| 1 | 2 | 7.011E−04  | 8.344E−05  | 2.050E−04  |
| 4 | 0 | −3.949E−04 | −2.512E−04 | 3.113E−04  |
| 2 | 2 | −1.770E−04 | −1.988E−04 | 5.372E−04  |
| 0 | 4 | −4.641E−04 | −2.057E−04 | 3.636E−04  |
| 5 | 0 | −6.777E−06 | 3.364E−06  | 9.382E−06  |
| 3 | 2 | −1.589E−05 | −7.256E−06 | −4.576E−06 |

TABLE 13-continued

| | | | | |
|---|---|---|---|---|
| 1 | 4 | 3.806E-06 | 1.650E-06 | -2.805E-06 |
| 6 | 0 | 5.946E-07 | 8.559E-07 | 1.296E-07 |
| 4 | 2 | 2.414E-06 | 2.436E-06 | -1.315E-06 |
| 2 | 4 | 1.224E-06 | 1.358E-06 | -7.629E-07 |
| 0 | 6 | 1.593E-06 | 5.668E-07 | -8.658E-07 |

FIG. 14 is a sectional view of a light guide device 20 and a projecting lens 12 of Example 4. The light guide device 20 includes first and second surfaces S1 and S2 as the pair of planar surfaces 22a and 22b of the parallel light guide 22. The planar surface 22a or the first surface S1 corresponds to the light emission section OS. The light guide device 20 includes a third surface S3 which is a planar surface, a fourth surface S4 which is a free-form curved surface and has a comparatively small negative refractive force on a section, and a fifth surface S5 which is a transmission surface common to the third surface S3, in the incident section 21. Here, the fifth surface S5 corresponds to the light incident surface IS.

In order to prevent chromatic dispersion due to a wavelength on the incident and emission refraction surfaces, the optical axis AX of the incident section 21 and the optical axis AX of the emission section 23 tilt in the same direction in which the chromatic dispersion is cancelled.

The projecting lens 12 includes three lenses L1, L2 and L3. Both optical surfaces of these lenses L1, L2 and L3 are aspherical surfaces.

FIGS. 15A to 15F and FIGS. 16A to 16F show an aberration of Example 4. In the respective aberration diagrams, a horizontal axis represents a position in the pupil, and a vertical axis represents an aberration amount. Specifically, FIGS. 15A and 15B represent aberrations in the Y and X directions at an azimuth of −12.48° in the X direction and 0.0° in the Y direction on a micron scale. FIGS. 15C and 15D represent aberrations in the Y and X directions at an azimuth of 0.0° in the X direction and 0.0° in the Y direction. FIGS. 15E and 15F represent aberrations in the Y and X directions at an azimuth of 12.48° in the X direction and 0.0° in the Y direction. FIGS. 16A and 16B represent aberrations in the Y and X directions at an azimuth of 12.48° in the X direction and 7.1° in the Y direction. FIGS. 16C and 16D represent aberrations in the Y and X directions at an azimuth of 0.0° in the X direction and 7.10° in the Y direction. FIGS. 16E and 16F represent aberrations in the Y and X directions at an azimuth of 12.48° in the X direction and 7.1° in the Y direction. The illustrated aberration amount is an aberration amount on the image surface of the image display device when the light rays are moved backward for the sake of convenience.

Example 5

Data of optical surfaces of Example 5 is represented in Table 14.

TABLE 14

| No | Name | T | Nd | Vd |
|---|---|---|---|---|
| 1 | STOP | 20.00 | | |
| 2 | PLANE | 0.50 | 1.517 | 64.17 |
| 3 | MA | -0.50 | 1.517 | 64.17 |
| 4 | PS1 | -6.00 | 1.525 | 55.95 |
| 5 | PS2 | 12.00 | 1.525 | 55.95 |
| 6 | FFS1 | 5.00 | 1.525 | 55.95 |
| 7 | ASP1 | 10.00 | 1.525 | 55.95 |
| 8 | ASP2 | 3.00 | | |
| 9 | ASP3 | 1.50 | 1.585 | 29.90 |
| 10 | ASP4 | 1.00 | | |
| 11 | ASP5 | 10.00 | 1.525 | 55.95 |
| 12 | ASP6 | 6.00 | | |
| 13 | PLANE | 1.10 | 1.458 | 67.82 |
| 14 | IMAGE | | | |

As for the optical surfaces of the prism of Example 5, an optical axis deviation amount DCX and an optical axis tilt angle TLY on the cross section thereof are represented in Table 15.

TABLE 15

| No | Name | TLY (front) | DCX (back) | TLY (back) |
|---|---|---|---|---|
| 2 | PLANE | 15.00 | 0.0 | 0.00 |
| 5 | PS2 | 0.00 | 16.8 | 68.93 |
| 6 | FFS1 | -20.29 | 0.0 | 31.99 |

A coefficient $Ak_{m,n}$ obtained by performing polynomial expansion on the free-form curved surface of the optical surfaces of Example 5 is represented in Table 16.

TABLE 16

| m | n | FFS1 |
|---|---|---|
| 2 | 0 | -2.090E-03 |
| 0 | 2 | -2.435E-03 |
| 3 | 0 | 3.217E-05 |
| 1 | 2 | 1.679E-05 |
| 4 | 0 | 2.794E-05 |
| 2 | 2 | 2.988E-05 |
| 0 | 4 | 2.551E-05 |
| 5 | 0 | -2.605E-07 |
| 3 | 2 | -2.269E-06 |
| 1 | 4 | -3.500E-07 |
| 6 | 0 | -5.325E-07 |
| 4 | 2 | 2.433E-07 |
| 2 | 4 | -9.748E-08 |
| 0 | 6 | -8.694E-08 |

As for the aspherical surface of the optical surfaces of Example 5, a coefficient Bi (i=2, 4, 6, . . . ) obtained by performing polynomial expansion on the sectional shape thereof is represented in Table 17.

TABLE 17

| | ASP1 | ASP2 | ASP3 |
|---|---|---|---|
| B2 | 2.824E-02 | -5.969E-02 | -6.451E-02 |
| B4 | -1.241E-05 | 4.250E-04 | 1.714E-04 |
| B6 | 9.445E-07 | -2.368E-06 | 1.280E-06 |
| B8 | -6.582E-09 | 4.155E-09 | -1.087E-08 |
| | ASP4 | ASP5 | ASP6 |
| B2 | 9.653E-02 | 7.941E-02 | -5.363E-02 |
| B4 | -1.293E-03 | -5.008E-04 | 2.358E-04 |
| B6 | 1.421E-05 | 4.050E-06 | 1.477E-06 |
| B8 | -6.560E-08 | -9.310E-09 | -9.397E-09 |

FIG. 17 is a sectional view of a light guide device 20 and a projecting lens 12 of Example 5. The light guide device 20 includes first and second surfaces S1 and S2 as the pair of planar surfaces 22a and 22b of the parallel light guide 22. The planar surface 22a or the first surface S1 corresponds to the light emission surface OS. The light guide device 20 includes a third surface S3 which is a free-form curved surface and has a comparatively small refractive force on a section in the incident section 21. Here, the third surface S3 corresponds to the light incident surface IS.

In order to prevent chromatic dispersion due to a wavelength on the incident and emission refraction surfaces, the optical axis AX of the incident section 21 and the optical axis AX of the emission section 23 tilt in the same direction in which the chromatic dispersion is cancelled.

The projecting lens 12 includes three lenses L1, L2 and L3. Both optical surfaces of these lenses L1, L2 and L3 are aspherical surfaces.

FIGS. 18A to 18F and FIGS. 19A to 19F show an aberration of Example 5. In the respective aberration diagrams, a horizontal axis represents a position in the pupil, and a vertical axis represents an aberration amount. Specifically, FIGS. 18A and 18B represent aberrations in the Y and X directions at an azimuth of −12.48° in the X direction and 0.0° in the Y direction on a micron scale. FIGS. 18C and 18D represent aberrations in the Y and X directions at an azimuth of 0.0° in the X direction and 0.0° in the Y direction. FIGS. 18E and 18F represent aberrations in the Y and X directions at an azimuth of 12.48° in the X direction and 0.0° in the Y direction. FIGS. 19A and 19B represent aberrations in the Y and X directions at an azimuth of 12.48° in the X direction and 7.1° in the Y direction. FIGS. 19C and 19D represent aberrations in the Y and X directions at an azimuth of 0.0° in the X direction and 7.10° in the Y direction. FIGS. 19E and 19F represent aberrations in the Y and X directions at an azimuth of 12.48° in the X direction and 7.1° in the Y direction. The illustrated aberration amount is an aberration amount on the image surface of the image display device when the light rays are moved backward for the sake of convenience.

Second Embodiment

Hereinafter, a virtual image display apparatus provided with a light guide device according to a second embodiment of the invention will be described. The light guide device according to the second embodiment is configured by partially changing the light guide device according to the first embodiment, and thus, the description of the common portions will be omitted.

2A. Structure of Light Guide Device and Virtual Image Display Apparatus

A virtual image display apparatus 100 shown in FIG. 20A is applied to a head-mounted display, and includes an image forming device 10, and a light guide device 20 which are paired. FIG. 20A corresponds to the A-A section of the light guide device 20 shown in FIG. 20B.

Similarly to the first embodiment, although the virtual image display apparatus 100 typically includes two pair of display units for the right eye and left eye of the observer with the image forming device 10 and the light guide device 20 as one display unit, only the pair for the left eye will be illustrated in this description, and the pair for the right eye will not be illustrated.

Similarly to the first embodiment, the image forming device 10 includes a liquid crystal device 11 which is an image device, and a projecting lens 12 for light coupling.

The light guide device 20 includes a plate-like portion extending in parallel with the xy plane in this drawing. The light guide device emits, as virtual image light, image light rays GL formed in the image forming device 10 toward an eye EY of an observer, and substantially transmits external light EL corresponding to an external image with not change. The light guide device 20 includes an incident section 21 that receives the image light rays, a parallel light guide 22 for guiding light, and an emission section 23 that outputs the image light rays. The main body of the parallel light guide 22 and the incident section 21 is an integrated body made of a resin material having high light transmission properties. In the second embodiment, the optical paths of the image light rays GL that transmit through the light guide device 20 include multiple types of optical paths in which the light rays are reflected different numbers of times, and are a type in which the multiple types of optical paths are combined.

The incident section 21 includes a light incident surface IS that receives the image light rays GL from the image forming device 10, and a reflection surface RS that reflects the received image light rays GL to guide the reflected light rays into the parallel light guide 22. The reflection surface RS is formed by performing film deposition such as aluminum vapor deposition on an inclined surface 21a, and reflects the incident image light rays GL to bend the optical path in a predetermined direction close to an orthogonal direction. That is, the reflection surface RS securely couples the image light rays GL within the parallel light guide 22 by bending the image light rays such that the image light rays GL which are incident from the light incident surface IS and are headed for the +z direction as a whole are headed for the +x direction as a whole. The incident section 21 has a triangular prism protruding in the z direction in order to ensure the size of the reflection surface RS. The width of the reflection surface RS in the z direction may be greater than the width or thickness in the +z direction of the parallel light guide 22, and the image light rays GL may be coupled to the parallel light guide 22 with no loss.

The parallel light guide 22 is a plate portion which extends in parallel with the xy plane in this drawing, and is also called a light guide. The parallel light guide (light guide) 22 is made of a light transmissive resin material, and includes a pair of planar surfaces 22a and 22b parallel to the xy plane. Since both the planar surfaces 22a and 22b are the planar surfaces, the external image is not enlarged or is not out of focus. Both of the planar surfaces 22a and 22b function as total reflection surfaces that totally reflect the image light rays bent by the reflection surface RS of the incident section 21, and serve to guide the image light rays to the emission section 23 with less loss. Here, the planar surface 22a on the +z side is disposed on an external side of the parallel light guide 22 to function as a first total reflection surface, and is also called an external-side surface in the present specification. The planar surface 22b on the −z side is disposed on an observer side of the parallel light guide 22 to function as a second total reflection surface, and is called an observer-side surface in the present specification. A portion of the rear-side planar surface (observer-side surface) 22b close to the image forming device 10 is common to the light incident surface IS. That is, a portion of the observer-side surface 22b functions as the light incident surface IS. The rear-side planar surface (observer-side surface) 22b extends up to one end of the emission section 23, and is disposed in the same plane with the light emission surface OS of the emission section 23. That is, a boundary surface IF between the parallel light guide 22 and the emission section 23 is disposed in a retraction position further inner than the rear-side planar surface 22b.

In the parallel light guide 22, the image light rays GL reflected from the reflection surface RS of the incident section 21 are initially incident on the planar surface 22b which is the second total reflection surface, and are totally reflected. Subsequently, the image light rays GL are incident on the planar surface 22a which is the first total reflection surface, and are totally reflected. The pair of total reflections described above is performed once or repeated multiple times, and thus, the image light rays GL are guided to the internal side of the light guide device 20, that is, the +x side where the emission section 23 is provided.

The emission section 23 is formed on the internal side (+x side) of the parallel light guide 22 in a laminar shape along the rear-side planar surface (second total reflection surface) 22b or the boundary surface IF. When the image light rays GL which are propagated while being totally reflected from the pair of planar surfaces 22a and 22b of the parallel light guide 22 and are totally reflected from the external-side planar surface (first total reflection surface) 22a are transmitted, the emission section 23 reflects the incident image light rays GL at a predetermined angle, and bends the reflected image light rays toward the light emission surface OS. Here, the image light rays GL which are initially incident on the emission section 23 are an output target as the virtual light. That is, even though there are light rays reflected from the inner surface of the light emission surface OS in the emission section 23, the reflected light rays are not used as the image light. The emission section 23 has the reflection unit 30 configured such that a plurality of mirrors (that is, a plurality of half mirrors) having transmission properties is arranged. The reflection unit 30 is formed to extend along the observer-side planar surface 22b of the parallel light guide 22. That is, both the portions of the emission section 23 or the reflection unit 30 which are close to the incident section 21 and are separated from the incident section 21 are arranged on the observer side of the parallel light guide 22.

Since the parallel light device 20 has the above configuration, the image light rays GL which are emitted from the image forming device 10 and are incident on the light guide device 20 from the light incident surface IS are uniformly reflected and bent by the incident section 21, are repeatedly totally reflected from the pair of planar surfaces 22a and 22b of the parallel light guide 22, and travel substantially along the optical axis AX. Specific light rays of the image light rays GL reflected from a predetermined surface region FR of the planar surface 22a on the +z side are incident on the incident section 23. In this case, in the xy plane, the width of the predetermined surface region FR in the longitudinal direction thereof is less than the width of the emission section 23 in the longitudinal direction thereof. That is, the incident width at which a pencil of image light rays GL is incident on the emission section 23 (or the reflection unit 30) is greater than the incident width at which the pencil of image light rays GL is incident on the predetermined surface region FR. As stated above, by setting the incident width at which the pencil of image light rays GL is incident on the predetermined surface region FR to be comparatively narrowed, since the light emission surface OS is not used to guide light (that is, the image light rays GL is not reflected from the light emission surface OS), it is easy to allow the image light rays GL from the predetermined surface region FR to be directly incident on the emission section 23 (or the reflection unit 30). The image light rays GL incident on the emission section 23 are output by being bent in the emission section 23 at an appropriate angle, and are ultimately emitted from the light emission surface OS. The image light rays GL emitted from the light emission surface OS are incident on the eye EY of the observer, as the virtual light. The virtual image light forms an image on the retina of the observer, and thus, the observer can recognize the image light rays GL due to the virtual image.

Here, the angle at which the image light rays GL used for image formation are incident on the emission section 23 is increased as the mirror becomes farther from the incident section 21 close to the light source, similarly to the first embodiment. That is, on the internal side of the emission section 23, the image light rays GL having a large inclination with respect to the z direction are incident and are bent at a comparatively large angle. On the front side of the emission section 23, the image light rays GL having a small inclination with respect to the z direction are incident and are bent at a comparatively small angle.

2B. Optical Path of Image Light

Hereinafter, the optical paths of the image light rays will be described in detail. As shown in FIG. 21, among the image light rays emitted from an emission surface 11a of the liquid crystal device 11, a component emitted from the central portion of the emission surface 11a indicated by a broken line is referred to as the image light ray GL0, a component emitted from the left side (−x side) on the paper in a peripheral region of the emission surface 11a indicated by a dashed dotted line in this drawing is referred to as an image light ray GL1, and a component emitted from the right side (+x side) on the paper in the peripheral region of the emission surface 11a indicated by a dashed double-dotted line in this drawing is referred to as an image light ray GL2.

The primary components of the respective image light rays GL0, GL1 and GL2 that transmit through the projecting lens 12 are respectively incident from the light incident surface IS of the light guide device 20, and are repeatedly totally reflected from the planar surfaces 22a and 22b corresponding to the first and second total reflection surfaces at different angles.

Specifically, among the image light rays GL0, GL1 and GL2, the image light ray GL0 emitted from the central portion of the emission surface 11a is reflected as a parallel pencil by the incident section 21, is incident on the observer-side planar surface 22b of the parallel light guide 22 at a standard reflection angle $\theta_0$, and is totally reflected. Subsequently, the image light ray GL0 is repeatedly totally reflected from the pair of the planar surfaces 22a and 22b while maintaining the standard reflection angle $\theta_0$. The image light rays GL0 is totally reflected from the planar surfaces 22a and 22b an even number of times, transmit through the boundary surface IF between the parallel light guide 22 and the emission section 23 or the reflection unit 30 without being reflected, and are incident on a central portion 23k of the emission section 23. The image light rays GL0 are reflected from the portion 23k at a predetermined angle, and are emitted from the light emission surface OS in the optical axis AX direction perpendicular to the xy plane including the light emission section OS, as the parallel pencil.

The image light ray GL1 emitted from one end side (−x side) of the emission surface 11a is reflected from the incident section 21, as a parallel pencil, is incident on the observer-side planar surface 22b of the parallel light guide 22 at a maximum reflection angle $\theta_1$, and is totally reflected. The image light ray GL1 is totally reflected from the planar surfaces 22a and 22b multiple times, transmits through the boundary surface IF between the parallel light guide 22 and the emission section 23 or the reflection unit 30 without being reflected, is reflected from an internal-side (+x side)

portion 23h of the emission section 23 at a predetermined angle, and is emitted from the light emission surface OS in a predetermined angle direction, as a parallel pencil. In this case, an emission angle $\gamma_1$ is formed such that the image light ray GL1 returns to the incident section 21 and has an acute angle with respect to the +x axis.

Meanwhile, the image light ray GL2 emitted from the other end side (+x side) of the emission surface 11a is reflected by the incident section 21, as a parallel pencil, is incident on the observer-side planar surface 22b of the parallel light guide 22 at a minimum reflection angle $\theta_2$, and is totally reflected. The image light rays GL2 are totally reflected from the planar surfaces 22a and 22b multiple times, transmit through the boundary surface IF between the parallel light guide 22 and the emission section 23 or the reflection unit 30 without being reflected, are reflected from an inlet-side (−x side) portion 23m of the emission section 23 at a predetermined angle, and are emitted from the light emission surface OS in a predetermined angle direction, as a parallel pencil. In this case, an emission angle $\gamma_2$ is formed such that the image light ray GL1 is separated from the incident section 21 and has an acute angle with respect to the +x axis.

The number of times of the image light rays GL0, GL1 and GL2 being totally reflected until the image light rays reach the emission section 23 is not necessarily the same. That is, in the example of this drawing, the number of times of the image light ray GL2 being totally reflected is greater than the number of times of the image light ray GL1 being totally reflected by one or more times, and the number of times of the image light ray GL0 being totally reflected is the same as the number of times of the image light rays GL1 and GL2 being totally reflected. Since light reflection efficiency due to the total reflection from the planar surfaces 22a and 22b is extremely high, even though there is a difference in the number of times of the image light rays GL0, GL1 and GL2 being totally reflected, luminance non-uniformity due to such a difference does not occur. It has been described that the image light rays GL0, GL1 and GL2 are representatively some of all of the image light rays GL. However, similarly to the image light ray GL0, since light ray components constituting other image light rays GL are guided and are emitted from the light emission surface OS, and thus, these light ray components will not be illustrated or described.

Here, as an example of the refractive index of a transparent resin material used for the incident section 21 and the parallel light guide 22, when n=1.4, the value of a critical angle $\theta_c$ thereof is $\theta_c = 45.6°$. By setting a reflection angle $\theta_2$ which is the minimum of reflection angles $\theta_0$, $\theta_1$ and $\theta_2$ of the respective image light rays GL0, GL1 and GL2 to be greater than the critical angle $\theta_c$, it is possible to satisfy a total reflection condition of necessary image light within the parallel light guide 22.

The image light ray GL0 heading for the central portion is incident on the portion 23k of the emission section 23 at an elevation angle $\varphi_0$ (=90°−$\theta_0$), the image light ray GL1 for the peripheral region is incident on the portion 23h of the emission section 23 at an elevation angle $\gamma_1$ (=90°−$\theta_{k1}$), and the image light ray GL2 for the peripheral region is incident on the portion 23m of the emission section 23 at an elevation angle $\varphi_2$ (=90°−$\theta_2$). Here, the relationship of $\varphi_2 > \varphi_0 > \varphi_1$ is satisfied between the elevation angles $\varphi_0$, $\varphi_1$ and $\varphi_2$ by reflecting the magnitude relationship between the reflection angles $\theta_0$, $\theta_1$ and $\theta_2$. That is, an incident angle t. (see FIG. 22) on the half mirror 31 of the reflection unit 30 is gradually decreased in the order of the portion 23m corresponding to the elevation angle $\varphi_2$, the portion 23k corresponding to the elevation angle $\varphi_0$ and the portion 23h corresponding to the elevation angle $\varphi_1$. In other words, the incident angle $\tau$ on the half mirror 31 or the reflection angle from the half mirror 31 is decreased as the mirror becomes farther from the incident section 21.

The entire movement of the pencil of image light rays GL which are reflected from the external-side planar surface 22a of the parallel light guide 22 and head for the emission section 23 will be described. The width of the pencil of image light rays GL is narrowed at any one of front and rear straight optical paths P1 and P2 reflected from the predetermined surface region FR on the external side of the parallel light guide 22 on a section including the optical axis AX. Specifically, the width of the pencil of image light rays GL is narrowed as a whole in the straight optical path P2 after the reflection from the predetermined surface region FR performed on the section including the optical axis AX, and thus, a beam width is narrowed. Accordingly, the pencil of image light rays GL is narrowed in front of the emission section 23, and thus, it is easy to comparatively widen a lateral view angle.

2C. Structure of Emission Section and Bending of Optical Path Due to Emission Section Hereinafter, the structure of the emission section 23 and the bending of the optical paths of the image light rays due to the emission section 23 will be described in detail with reference to FIGS. 21 and 22.

Initially, the structure of the emission section 23 will be described. The emission section 23 has the reflection unit 30 configured such that the plurality of half mirrors 31 that respectively reflects the image light rays GL is arranged. The reflection unit 30 is a rectangular plate-like member, and has a structure in which a plurality of narrow band-shaped half mirrors 31 is embedded in a stripe pattern. That is, the reflection unit 30 is configured such that a plurality of elongated half mirrors 31 extending in a y direction is arranged in a direction in which the parallel light guide 22 extends, that is, in the x direction, at a predetermined pitch PT. More specifically, the half mirrors 31 extend in a straight line with the vertical y direction, among directions which are parallel to the planar surfaces 22a and 22b of the parallel light guide 22 shown in FIG. 21 and are perpendicular to the x direction in which the half mirrors 31 are arranged, as the longitudinal direction. The half mirrors 31 are inclined to the incident section 21 toward the external side of the parallel light guide 22 rather than the observer. More specifically, the half mirrors 31 are inclined such that upper ends (+z side) rotate in a counterclockwise direction by using the longitudinal direction (y direction) as its axis and the yz plane orthogonal to the planar surfaces 22a and 22b as its reference. That is, the respective mirrors 31 extend in a direction between a −x direction and a +z direction when viewed on an xz section. All the half mirrors 31 are minutely arranged in parallel with each other.

The reflection unit 30 has the same structure as that of the first embodiment, and has a structure in which a plurality of block members 32 is bonded. The half mirror 31 has a thin-film shape interposed between a pair of neighboring block members 32.

Similarly to the first embodiment, the reflection unit 30 may be manufactured by a method shown in FIG. 4.

The reflection unit 30 is not limited to a reflection unit that is separately manufactured from the parallel light guide 22, and may be integrally formed with the parallel light guide 22.

For example, as shown in FIG. 23A, a base member 22*i* which becomes the parallel light guide 22 is prepared, and a saw-toothed sectional three-dimensional structure portion 22*k* in which a plurality of triangle sectional portions 22*j* is arranged in a position where the reflection unit 30 is formed is formed. Reflection layers 22*n* which become the half mirrors 31 are formed on inclined surfaces 22*m* of the structure portion 22*k*, and a liquid resin flows in grooves of the structure portion 22*k*. Thus, as shown in FIG. 23B, a plurality of triangle sectional portions 22*p* in which the respective grooves constituting the structure portion 22*k* are filled with the liquid resin is formed, and the laminar-shaped emission section 23, that is, the reflection unit 30 is completed. Here, it is assumed that a planar surface that connects the vertices of the triangle sectional portions 22*j* close to the observer is present on the boundary surface IF between the reflection unit 30 and the parallel light guide 22. The boundary surface IF refers to a functional boundary, and is not a bonded surface that is discontinued in view of material but a surface that is continued in view of material. As a result, the reflection of the image light rays GL from the boundary surface IF does not occur.

Although it has been described in FIG. 23A that the reflection unit 30 is formed on the base member 22*i* which becomes the parallel light guide 22, the reflection unit 30 may be formed on a base member separately formed from the parallel light guide 22 by the method shown in FIG. 23A, and the reflection unit 30 formed in this manner may be bonded to the parallel light guide 22.

The method of manufacturing the reflection unit 30 illustrated in FIGS. 23A and 23B is applicable to the method of manufacturing the reflection unit 30 according to the first example embodiment.

Similarly to the first embodiment, the pitch PT of the half mirrors 31 in the reflection unit 30 is set to be about 0.5 mm to 2.0 mm.

Similarly to the first embodiment, the pitch PT of the half mirrors 31 is not strictly an equal interval but a variable pitch. More specifically, the pitch PT of the half mirrors 31 in the reflection unit 30 is a random pitch that is randomly increased or decreased by using a reference interval as its center.

Here, similarly to the first embodiment, the thickness of the reflection unit 30, that is, a thickness TI of the half mirror 31 in the z-axis direction is set to be about 0.7 mm to 3.0 mm. Similarly to the first embodiment, the thickness of the parallel light guide 22 that supports the reflection unit 30 is set to be, for example, about several mm to 10 mm, preferably, about 4 mm to 6 mm.

In the example shown in FIGS. 21 and 22, all the half mirrors 31 can form an inclination angle δ of, for example, about 48° to 70° in a clockwise direction by using the observer-side surface 22*b* of the parallel light guide 22 as its reference, specifically, an inclination angle δ of 60° is formed. Here, it is assumed that the elevation angle $\varphi_0$ of the image light ray GL0 is set to be, for example, 30°, the elevation angle $\varphi_1$ of the image light ray GL1 is set to be, for example, 22°, and the elevation angle $\varphi_2$ of the image light ray GL2 is set to be, for example, 38°. In this case, the image light ray GL0 incident on the center of the reflection unit 30 is emitted in the −z direction perpendicular to the planar surface 22*b*, and is incident on the eye EY of the observer. The image light ray GL1 incident on the internal-side portion 23*h* separated from the incident section 21 of the reflection unit 30 forms an angle $\gamma_1$=12.5° with respect to the image light ray GL0, and is incident on the eye EY of the observer. The image light ray GL2 incident on the front-side portion 23*m* close to the incident section 21 of the reflection unit 30 forms an angle $\gamma_2$=12.5° with respect to the image light angle GL0, and is incident on the eye EY of the observer.

Thus, among the image light rays GL, the component (image light ray GL1) of which the total reflection angle is comparatively large is primarily incident on the portion 23*h* of the reflection unit 30 on the +x side, and the component (image light ray GL2) of which the total reflection angle is comparatively small is primarily incident on the portion 23*m* of the emission section 23 on the −x side. In so doing, it is possible to efficiently output the image light rays GL in the angle state capable of being collected in the eye EY of the observer as a whole. Since the image light rays GL are output with such an angle relationship, the light guide device 20 can allow the image light rays GL to pass through the reflection unit 30 only once without basically allowing the image light rays to pass through the reflection unit multiple times, and can output the image light rays GL as the virtual image light with less loss.

In the portions 23*k* and 23*h* on the central side or the internal side of the reflection unit 30, the image light rays GL are transmitted through the half mirrors 31 multiple times (specifically, passing including the reflection once and the transmission one or more times). In this case, the number of times of the image light rays passing through the half mirrors 31 is multiple times. However, since the reflection light rays from the plurality of half mirrors 31 are respectively incident on the eye EY of the observer, as the image light rays GL, the loss of the light amount is not large.

In the portions 23*k* and 23*h* on the central side or the internal side of the reflection unit 30, the components of the image light rays GL which are reflected from the rear side or the observer side (that is, the light emission surface OS) of the parallel light guide 22 are also likely to be generated. However, the image light rays GL are guided to the outside of the optical paths, as non-use light rays GX (see FIG. 22) reflected from the half mirrors 31, and are prevented from being incident on the eye EY of the observer. The non-use light rays that pass through the half mirrors 31 are likely to be re-incident on the external-side planar surface 22*a*. Here, when the non-use light rays are totally reflected from the external-side planar surface, most non-use light rays can be incident on the internal-side portion 23*h* of the reflection unit 30 or a region which is a further inner side than the internal-side portion and is outside of an effective region, and are less likely to be incident on the eye EY.

2D. Conclusion of Second Embodiment

According to the light guide device 20 of the second embodiment described above, since the light guide device is set such that the image light rays GL incident on the reflection unit 30 are reflected and are headed for the observer without reflecting the image light rays GL from the boundary surface IF between the parallel light guide 22 and the reflection unit 30, the image light rays GL only pass through the half mirrors 31 in the position where the image light rays are output from the reflection unit 30 of the emission section 23 or near this position without being reflected from the boundary surface IF. Thus, by reducing the number of times of the image light rays GL to be observed passing through the half mirrors 31, it is possible to prevent luminance non-uniformity or light reduction. As a result, it is possible to prevent ghost light rays from occurring.

From the other perspective, in the light guide device 20 according to the present embodiment, the reflection unit 30 has a thickness which is equal to or less than about half of the parallel light guide 22 in the optical path AX, the half mirrors 31 constituting the reflection unit 30 are inclined so as to be close to the incident section 21 on the external side of the parallel light guide 22 further from the observer, and a portion of the reflection unit 30 close to at least the incident section 21 is disposed on the portion of the parallel light guide 22 close to the observer. Thus, the inclinations of the image light rays GL to be observed with respect to the optical axis AX are comparatively increased on the internal side separated from the incident section 21 of the reflection unit 30, and it is easy to allow the image light rays GL from the incident section 21 to be directly incident on a target place of the reflection unit 30. That is, by reducing the number of times of the image light rays GL to be observed passing through the half mirrors 31, it is possible to prevent luminance non-uniformity or light reduction, and it is possible to suppress the occurrence of ghost light.

The number of times of the image light rays GL being totally reflected in the parallel light guide 22 is not limited to the example illustrated in FIG. 21. That is, it is possible to appropriately change the number of the image light rays GL being totally reflected until the image light rays reach the emission section 23 from the incident section 21 depending on the thickness of the parallel light guide 22 in the z direction or the length thereof in the x direction.

FIG. 24 is a diagram for describing an example in which the structure of the emission section 23 of the light guide device 20 is changed. In this case, the thickness of the reflection unit 30 is increased as the reflection unit becomes closer to the incident section 21, and the thickness thereof is decreased as the reflection unit becomes farther from the incident section 21. The elevation angle $\varphi_2$ of the image light rays GL2 is decreased at the portion of the reflection unit far away from the incident section 21, and it is possible to suppress the increase in the number of times of the image light rays passing through the half mirrors 31 by decreasing the thickness of the reflection unit 30.

The shape or structure of the reflection unit 30 illustrated in FIG. 24 is similarly applicable to the first embodiment.

FIG. 25A is a diagram for describing an example in which the arrangement of the emission section 23 is changed, and is an enlarged sectional view of a part of the light guide device 20 shown in FIG. 21. In this case, the parallel light guide 22 and the reflection unit 30 are separately provided, and the reflection unit 30 adheres to the observer-side surface 22b formed on the rear side of the parallel light guide 22.

FIG. 25B is a diagram for describing an example in which the structure of the emission section 23 or the reflection unit 30 is changed, and corresponds to FIG. 22. In this case, the pitch of the half mirrors 31 is slightly widened, and thus, it is possible to cause some of the external light EL to directly pass. That is, a gap through which the external light EL passes is present between the pair of neighboring half mirrors 31 when viewed from the front surface of the parallel light guide 22, and some of the external light EL pass through a plurality of gaps formed between the plurality of half mirrors 31, and are incident on the eye EY of the observer with comparatively less loss. As mentioned above, when the pitch of the half mirrors 31 is widened, even though simple mirrors that do not have light transmission properties are used in place of the half mirrors 31, it is possible to see through the external light EL over the reflection unit 30.

2. Examples of Second Embodiment

Hereinafter, examples of an optical system provided in the virtual image display apparatus according to the embodiment will be described. The signs or specifications used in Example 6 are the same as those of Examples 1 to 5.

Example 6

Data regarding the optical surfaces of Example 6 is represented in Table 18.

TABLE 18

| No | Name | T | Nd | Vd |
|---|---|---|---|---|
| 1 | STOP | 20.00 | | |
| 2 | PS1 | 0.50 | 1.525 | 55.95 |
| 3 | MA | −4.50 | 1.525 | 55.95 |
| 4 | PS2 | 5.00 | 1.525 | 55.95 |
| 5 | PS1 | −5.00 | 1.525 | 55.95 |
| 6 | PS2 | 5.00 | 1.525 | 55.95 |
| 7 | PS1 | −12.00 | 1.525 | 55.95 |
| 8 | PS3 | 12.00 | 1.525 | 55.95 |
| 9 | PS1 | 3.00 | | |
| 10 | ASP1 | 10.00 | 1.525 | 55.95 |
| 11 | ASP2 | 1.00 | | |
| 12 | ASP3 | 1.00 | 1.585 | 29.90 |
| 13 | ASP4 | 2.00 | | |
| 14 | ASP5 | 8.00 | 1.525 | 55.95 |
| 15 | ASP6 | 8.74 | | |
| 16 | PLANE | 1.10 | 1.458 | 67.82 |
| 17 | IMAGE | | | |

As for the optical surfaces of a prism of Example 6, an optical axis deviation amount DCX and an optical axis tilt angle TLY on the cross section thereof are represented in Table 19.

TABLE 19

| No | Type | TLY (front) | DC (back) | TLY (back) |
|---|---|---|---|---|
| 8 | PS3 | 32.00 | 0.0 | −32.00 |

As for the aspherical surface of the optical surfaces of Example 6, a coefficient $B_i$ (i=2, 4, 6, . . . ) obtained by performing polynomial expansion on the sectional shape thereof is represented in Table 20.

TABLE 20

| | ASP1 | ASP2 | ASP3 |
|---|---|---|---|
| B2 | 4.261E−02 | −9.425E−03 | 6.069E−03 |
| B4 | −4.971E−05 | −2.179E−04 | −4.037E−04 |
| B6 | 4.023E−07 | 1.745E−06 | 4.321E−06 |
| B8 | −4.222E−09 | −5.872E−09 | −1.277E−08 |
| | ASP4 | ASP5 | ASP6 |
| B2 | 9.219E−02 | 7.256E−02 | −1.695E−02 |
| B4 | −7.190E−04 | −3.935E−04 | 6.896E−06 |
| B6 | 9.852E−06 | 3.653E−06 | 4.050E−07 |
| B8 | −4.414E−08 | −1.601E−08 | −6.515E−09 |

FIGS. 26A and 26B are sectional views of a light guide device 20 and a projecting lens 12 of Example 6. The light guide device 20 includes first and second surfaces S1 and S2 as the pair of planar surfaces 22a and 22b of the parallel light guide 22. The planar surface 22a or the first surface S1 corresponds to the light emission section OS. The light guide device 20 includes a third surface S3 which is a planar surface, and a fourth surface S4 which is a planar surface in the incident section 21. Here, the fourth surface S4 corresponds to the light incident surface IS.

Example 6 includes multiple types of optical paths of which the reflection number of times is different, but has the substantially same shape as Example 2. FIG. 26A shows the image light rays GL which are primarily incident on the eye EY in the direction (direction tilted in the counterclockwise direction) tilted in the −x direction with the +z direction as its reference. FIG. 26B shows the image light rays GL which are primarily incident on the eye EY in the direction (direction tilted in the clockwise direction) tilted in the +x direction with the +z direction as its reference.

The projecting lens 12 includes three lenses L1, L2 and L3. Both optical surfaces of these lenses L1, L2 and L3 are aspherical surfaces.

FIGS. 27A to 27F and FIGS. 28A to 28F show an aberration of Example 6. In the respective aberration diagrams, a horizontal axis represents a position in the pupil, and a vertical axis represents an aberration amount. Specifically, FIGS. 27A and 27B represent aberrations in the Y and X directions at an azimuth of −12.48° in the X direction and 0.0° in the Y direction on a micron scale. FIGS. 27C and 27D represent aberrations in the Y and X directions at an azimuth of 0.0° in the X direction and 0.0° in the Y direction. FIGS. 27E and 27F represent aberrations in the Y and X directions at an azimuth of 12.48° in the X direction and 0.0° in the Y direction. FIGS. 28A and 28B represent aberrations in the Y and X directions at an azimuth of 12.48° in the X direction and 7.1° in the Y direction. FIGS. 28C and 28D represent aberrations in the Y and X directions at an azimuth of 0.0° in the X direction and 7.10° in the Y direction. FIGS. 28E and 28F represent aberrations in the Y and X directions at an azimuth of 12.48° in the X direction and 7.1° in the Y direction. The illustrated aberration amount is an aberration amount on the image surface of the image display device when the light rays are moved backward for the sake of convenience.

Third Embodiment

Hereinafter, a light guide device and a virtual image display apparatus according to a third embodiment will be described with reference to FIGS. 29 and 30. The light guide device and the virtual display apparatus according to the present embodiment are a modification example of the first and second embodiments shown in FIG. 1A and the like, and the description of the common matters will be omitted.

As shown in FIGS. 29 and 30, in a light guide device 20 according to the present embodiment, a reflection unit 30 provided in an emission section 23 is provided so as to be inclined. That is, the reflection unit 30 is inclined such that an internal-side portion 23h far away from an incident section 21 is closer to the external side than the front-side portion 23m close to the incident section 21. That is, an incident surface 30a and an emission surface 30b of the reflection unit 30 are appropriately inclined at an angle of less than 90° in a counterclockwise direction with the planar surface 22b of the parallel light guide 22 as its reference. The emission section 23 includes a prism member 23f coupled to the emission surface 30b of the reflection unit 30 on a side opposite to the parallel light guide 22 with the reflection unit 30 interposed therebetween. Accordingly, the external-side planar surface 22b of the parallel light guide 22 and the light emission surface OS facing the planar surface 22b are parallel, and thus, it is possible to naturally observe the external light EL.

As shown in FIG. 30, even though the reflection unit 30 is disposed so as to be inclined, since the angle conditions of the first and second embodiments are the same (for example, see FIG. 22), the image light rays GL reflected from the external-side planar surface 22a of the parallel light guide 22 can be reflected from the plurality of half mirrors 31, and can path through the observer-side planar surface 22b. The image light rays GL0, GL1 and GL2 emitted from the emission section 23 form a virtual image as in the case of FIG. 21 and the like. Here, the pencil of image light rays GL is narrowed in width at a straight optical path P1 of a predetermined surface region FR before the reflection as a whole on a section including an optical AX, and a beam width is narrowed. Accordingly, the pencil of image light rays GL is narrowed in front of the emission section 23, and thus, it is easy to comparatively widen a lateral view angle.

In the first and second embodiments, it is not necessary to connect an internal-side end 23p far away from the incident section 21 of the reflection unit 30 to the external-side planar surface 22a, and the end 23p may be separated from the planar surface 22a. The reflection unit 30 does not need to extend in a planar shape or a straight line in a sectional view within the parallel light guide 22. For example, the reflection unit may have a concave shape on the +z side when viewed on the section of FIG. 29, or may have a shape including a plurality of line segments. However, the reflection unit needs to have a consecutive shape.

Others

While the invention has been described in conjunction with the respective embodiments, the invention is not limited to the above embodiments, and may be implemented in various forms without departing from the gist thereof. For example, the invention may be modified as follows.

Although the reflectances of the plurality of half mirrors 31 provided in the reflection unit 30 basically coincide with each other, the reflectances of the half mirrors 31 may be gradually changed from the incident section 21 to the emission section 23.

For example, although it has been described in the second embodiment that the incident section 21 reflects the image light rays GL and causes the image light rays to be incident on one planar surface 22b of the parallel light guide 22, it is possible to cause the image light rays GL to be incident on the other planar surface 22a of the parallel light guide 22 by changing the shape (inclination of the reflection surface RS or the light incident surface IS, or distance therebetween) of the incident section 21.

For example, in the second embodiment, the light incident surface IS of the incident section 21 need not be common to any one of the pair of the planar surfaces 22a and 22b constituting the parallel light guide 22, and may be a separate surface from the planar surfaces.

For example, as shown in FIG. 31A, an incident section 121 provided on a light incident side of the parallel light guide 22 may have protrude from the rear-side planar surface 22b. In this case, the light incident surface IS is separately provided from the observer-side surface 22b, but it is easy to cause the image light rays GL to be obliquely incident on the parallel light guide 22.

As shown in FIG. 31B, when the incident section 121 protruding from the observer-side surface 22b is formed, the image light rays may be reflected from an inclined surface 21f once. In this case, it is possible to increase the degree of freedom in designing such as the arrangement of the image forming device 10.

It has been described that the transmission type liquid crystal device 11 is used as the image device. However, the image device is not limited to the transmission type liquid crystal device, and various devices may be used. For example, a device using a reflective liquid crystal panel may be used as the image device, or a digital micro-mirror device may be used in place of the liquid crystal device 11. A self-luminous device represented by an organic EL, LED array or an organic LED may be used. A laser scanner in which a laser light source, a polygon mirror, and other scanners are provided may be used.

Although it has been described that the two pairs of the image forming devices 10 and the light guide devices 20 so as to correspond to the right eye and left eye are provided as the virtual image display apparatus 100, the image forming device 10 and the light guide device 20 may be provided for only any one of the right eye and the left eye, and the image may be seen by one eye.

Although the see-through type virtual image display apparatus has been described, the emission section 23 is applicable to a virtual image display apparatus other than the see-through type. When it is not necessary to observer the external image, the planar surface 22*a* can have a light reflectance of approximately 100%.

Although it has been specifically described that the virtual image display apparatus 100 according to the embodiment is the head-mounted display, the virtual image display apparatus 100 may be applied to a head-up display and a binocular type handheld display.

It has been described that the image light rays are totally reflected from a boundary surface with air, and are guided instead of providing the mirror or the half mirror on the surface 21*b* or the planar surfaces 22*a* and 22*b* of the parallel light guide 22. However, the total reflection in the invention may include reflection performed by forming a mirror coating or a half mirror film on the entire planar surfaces 22*a* and 22*b* or a part thereof. For example, the total reflection may include a case where a mirror coating is performed on the entire planar surfaces 22*a* and 22*b* or a part thereof and substantially all of the image light rays are reflected when the incident angle of the image light rays GL satisfies the total reflection condition.

It has been described in the second embodiment that the parallel light guide 22 has a lateral length in the x direction and the light incident surface IS is formed so as to be positioned outside of the left and right sides of the eye on the plane parallel to the xy plane. However, the position of the light incident surface IS is not limited to the aforementioned position as long as the image light rays GL can be appropriately guided to the inside of the light guide device 20. For example, the light incident surface may be formed on a part of the upper end surface TP or the lower end surface BP which are present on the top and bottom of the light guide device 20.

Although not described, the upper end surface TP or the lower end surface BP of the outer periphery that defines the external appearance of the parallel light guide 22 may be a black-paint coated surface or a sand-blasted surface. A black-paint coating process or a sand blasting process may be performed in a place other than the upper end surface TP or the lower end surface BP. The black-paint coating process or the sand blasting process may be performed in only a part of the upper end surface TP or the lower end surface BP.

The half mirrors 31 constituting the reflection unit 30 are not limited to a mirror that appropriately decreases the reflectance, and a hologram mirror may be used. In this case, the hologram mirror may be a multilayer type that processes the RGB colors all at once, or may be a single layer film for each color.

REFERENCE SIGNS LIST

10: Image forming device 11: Liquid crystal device 11*a*: Emission surface 12: Projecting lens 14: Light source 20: Light guide device 21: Incident section 22: Parallel light guide 22*a*, 22*b*: Planner surface (Total reflection surface) 23: Emission section 23*h*, 23*k*, 23*m*: Portion 30: Reflection unit 31: Half mirror 32: Block member 100: Virtual image display apparatus AX Optical axis EY: Eye GL: Image light ray GL0, GL1, GL2: Image light ray GX: Non-use light ray IS: Light incident surface OS: Light emission surface RS: Reflection surface IF: Boundary surface FR: Predetermined surface region

The invention claimed is:

1. A light guide device comprising:
a light guide that includes a pair of surfaces, which faces each other so as to correspond to an observer and an external side, the pair of surfaces extending in substantially parallel with each other;
an incident section that is provided at one end of the light guide; and
an emission section that is provided at the other end of the light guide, the emission section including a reflection unit having:
a first surface disposed between the light guide and the reflection unit, the first surface of the reflection unit not reflecting first image light rays that pass through the first surface,
a second surface opposite to the first surface, the second surface of the reflection unit reflecting second image light rays depending on an angle of incidence on the second surface, and
a plurality of mirrors configured to reflect the first image light rays and the second image light rays, the plurality of mirrors being inclined toward the incident section toward the external side, and the plurality of mirrors reflecting the first image light rays toward the observer.

2. The light guide device according to claim 1, wherein a thickness of the reflection unit is less than a thickness of the light guide.

3. The light guide device according to claim 1, wherein the plurality of mirrors is arranged in parallel.

4. The light guide device according to claim 1, wherein the plurality of mirrors is arranged at a pitch of 0.5 mm to 2.0 mm.

5. The light guide device according to claim 1, wherein among the first image light rays, an angle at which a light ray used for image formation is incident on the mirror of the reflection unit is decreased as the mirror becomes farther from the incident section.

6. The light guide device according to claim 1, wherein the plurality of mirrors is a half mirror.

7. The light guide device according to claim 1, wherein the reflection unit is disposed along a surface of the light guide close to the observer.

8. The light guide device according to claim 1, wherein the reflection unit is disposed so as to be inclined such that a portion far away from the incident section is relatively close to the external side.

9. The light guide device according to claim 1, wherein the light guide includes first and second total reflection surfaces that extend in parallel with each other as the pair of facing surfaces, and guides the first image light rays received by the incident section through total reflection from the first and second total surfaces.

10. The light guide device according to claim 1, wherein a surface present at the incident section is a non-axisymmetric curved surface.

11. A virtual image display apparatus comprising:
an image device that generates image light rays; and
the light guide device according to claim 1.

12. The light guide device according to claim 1, wherein the reflection unit is disposed on an external surface of the light guide.

13. The light guide device according to claim 1, wherein the plurality of mirrors is arranged at a variable pitch.

14. The light guide device according to claim 13, wherein the plurality of mirrors is arranged at a random pitch.

15. The light guide device according to claim 1, wherein a pencil of light rays used for image formation is reflected from a predetermined surface region of the light guide on the external side, is incident on the reflection unit, and is narrowed in width at any one of front and rear straight optical paths reflected from the predetermined surface region on a section including an optical axis.

16. The light guide device according to claim 15, wherein on the section including the optical axis, an incident width at which the pencil of light rays used for image formation is incident on the reflection unit is greater than an incident width at which the pencil of light rays used for image formation is incident on the predetermined surface region.

17. The light guide device according to claim 1, wherein the first image light rays in all angles of view are reflected the same number of times within the light guide, are reflected from the plurality of mirrors, and reach an eye of the observer.

18. The light guide device according to claim 17, wherein the incident section includes at least one of an incident surface and a reflection surface of a curved surface.

* * * * *